United States Patent
Gupta et al.

(10) Patent No.: US 9,821,220 B2
(45) Date of Patent: Nov. 21, 2017

(54) SPORT AND GAME SIMULATION SYSTEMS WITH USER-SPECIFIC GUIDANCE AND TRAINING USING DYNAMIC PLAYING SURFACE

(71) Applicant: Golfstream Inc., Los Angeles, CA (US)

(72) Inventors: Sameer M. Gupta, Pasadena, CA (US); Darren W. Dummit, Los Angeles, CA (US); Michael P. Brenner, La Cresenta, CA (US)

(73) Assignee: GOLFSTREAM INC., Los Angeles, CA (US)

( * ) Notice: Subject to any disclaimer, the term of this patent is extended or adjusted under 35 U.S.C. 154(b) by 41 days.

(21) Appl. No.: 14/880,114

(22) Filed: Oct. 9, 2015

(65) Prior Publication Data
US 2016/0158640 A1    Jun. 9, 2016

Related U.S. Application Data

(60) Provisional application No. 62/062,111, filed on Oct. 9, 2014.

(51) Int. Cl.
*A63B 69/36* (2006.01)
*A63F 13/213* (2014.01)
(Continued)

(52) U.S. Cl.
CPC ............ *A63F 13/213* (2014.09); *A63B 69/36* (2013.01); *A63B 69/3676* (2013.01); *A63F 9/24* (2013.01);
(Continued)

(58) Field of Classification Search
CPC .......... A63F 13/213; A63F 9/24; A63B 69/36; A63B 69/3676; G09B 9/006; G09B 19/0038
See application file for complete search history.

(56) References Cited

U.S. PATENT DOCUMENTS 4,005,870 A * 2/1977 Grace .................... A63B 69/36
  434/252
5,527,041 A * 6/1996 Terry, III ........... A63B 69/3676
  473/150
(Continued)

FOREIGN PATENT DOCUMENTS

KR         100864641 B1    10/2008

OTHER PUBLICATIONS

Fusion Golf, International Search Report and Written Opinion, PCTUS2016/023842, dated May 27, 2016, 16 pgs.
(Continued)

*Primary Examiner* — Corbett B Coburn
(74) *Attorney, Agent, or Firm* — Morgan, Lewis & Bockius LLP

(57) ABSTRACT

Disclosed herein are sport and game simulation systems, and methods of use thereof. One exemplary method is performed at an electronic device and includes: identifying a current topography of a putting green and a current position of a first user's ball on the putting green. The method also includes: determining, based on the current topography, a best path from the current position of the first user's ball to a target on the putting green. The method additionally includes: sending, to a projecting device that is distinct from the electronic device, instructions to render a representation of the best path on the putting green. In some embodiments, the method further includes: determining a backswing distance and/or speed and a corresponding follow-through distance and/or speed that allows the first user to hit the ball along the best path and providing instructions to render the backswing and follow-through distances on the putting green.

17 Claims, 28 Drawing Sheets

(51) Int. Cl.
  *G09B 9/00*  (2006.01)
  *G09B 19/00* (2006.01)
  *A63F 9/24*  (2006.01)
  *A63B 67/02* (2006.01)

(52) U.S. Cl.
  CPC ......... *G09B 9/006* (2013.01); *G09B 19/0038* (2013.01); *A63B 2067/025* (2013.01); *A63F 2009/245* (2013.01); *A63F 2009/247* (2013.01)

(56) References Cited

U.S. PATENT DOCUMENTS

| | | | |
|---|---|---|---|
| 6,071,202 A * | 6/2000 | Densberger | A63B 69/3614 362/259 |
| 6,213,887 B1 * | 4/2001 | Carney | A63B 69/3614 473/183 |
| 6,774,932 B1 * | 8/2004 | Ewing | A63B 69/36 348/157 |
| 7,614,748 B2 | 11/2009 | Nayar et al. | |
| 8,202,148 B2 * | 6/2012 | Young | A63B 24/0003 463/3 |
| 8,388,146 B2 | 3/2013 | Goran | |
| 8,616,988 B1 | 12/2013 | Coffman | |
| 2002/0049101 A1 | 4/2002 | Robinson | |
| 2004/0005934 A1 * | 1/2004 | Battaglia | A63B 69/3614 473/219 |
| 2004/0132555 A1 * | 7/2004 | Forrest | A63B 57/00 473/404 |
| 2004/0169836 A1 | 9/2004 | Wegmann | |
| 2005/0101415 A1 * | 5/2005 | Sweeney | A63B 24/0021 473/407 |
| 2006/0258473 A1 * | 11/2006 | Khananayev | A63B 69/3676 473/220 |
| 2008/0021651 A1 | 1/2008 | Seeley et al. | |
| 2010/0081520 A1 * | 4/2010 | Peterson | A63B 24/0021 473/409 |
| 2010/0177403 A1 | 7/2010 | Dolgoff | |
| 2010/0184496 A1 * | 7/2010 | Nicora | A63B 24/0021 463/5 |
| 2012/0214590 A1 | 8/2012 | Newhouse et al. | |
| 2013/0085018 A1 * | 4/2013 | Jensen | A63B 57/00 473/404 |
| 2014/0004969 A1 | 1/2014 | Jang et al. | |
| 2014/0073445 A1 | 3/2014 | Flammer | |
| 2014/0313190 A1 | 10/2014 | Vesely et al. | |
| 2017/0161561 A1 * | 6/2017 | Marty | G06K 9/00724 |

OTHER PUBLICATIONS

Fusion Golf, International Search Report and Written Opinion, PCTUS2015/055018, dated Jan. 8, 2016, 10 pgs.

Golfstream Inc., International Preliminary Report on Patentability, PCTUS2015/055018, dated Apr. 11, 2017, 7 pgs.

Golfstream_Communication Pursuant to Rules 161(1) and 162, EP15784534.8, dated May 29, 2017, 2 pgs.

\* cited by examiner

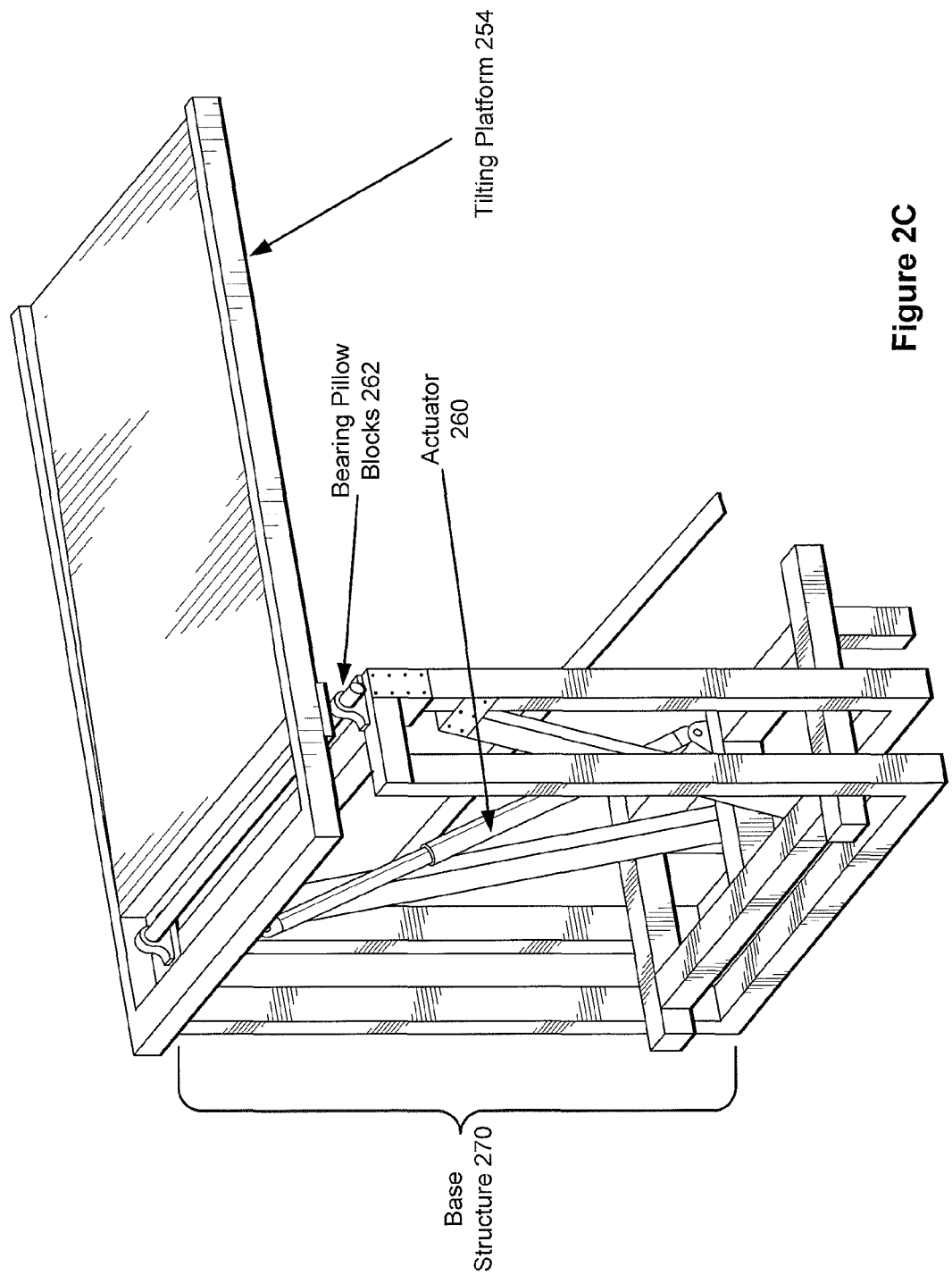

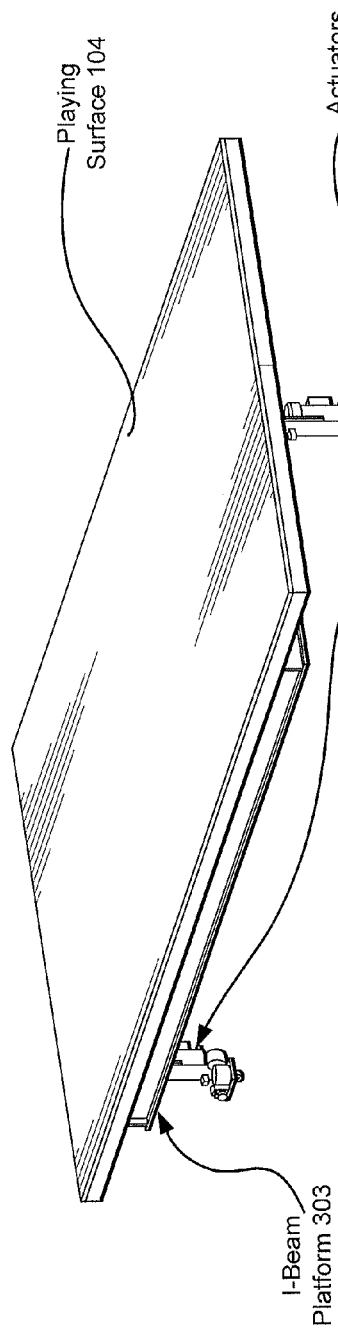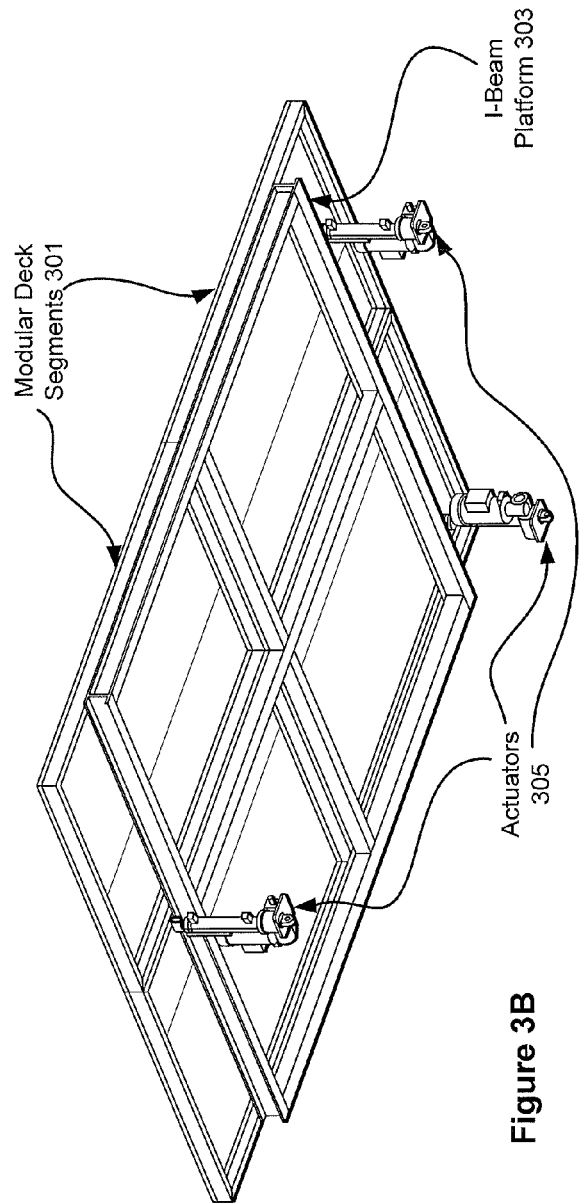
Figure 3A
Figure 3B

SPORT AND GAME SIMULATION SYSTEMS WITH USER-SPECIFIC GUIDANCE AND TRAINING USING DYNAMIC PLAYING SURFACE

CROSS REFERENCE TO RELATED APPLICATIONS

This application claims priority to U.S. Provisional Patent Application No. 62/062,111, "Sport Simulation and Training Using Dynamic Playing Surface" filed Oct. 9, 2014, which is hereby incorporated by reference in its entirety.

TECHNICAL FIELD

The embodiments described herein relate to sport and game simulation systems with user-specific guidance and training. In particular, the embodiments described herein relate to sport and game simulation systems with user-specific guidance and training using a dynamic playing surface. For example, a golf embodiment simulates a game of golf using a changing topography for a dynamic playing surface (e.g., a putting green surface), while training the user to improve their putting skills.

BACKGROUND

Many of today's sports and games, like golf, are extremely resource intensive. They require significant real estate for constructing and maintaining golf courses, which are often located in affluent areas. They also require expensive membership dues, greens fees, training lessons, equipment, etc. Due to the size of a typical 18-hole golf course, the elderly, very young children, and/or individuals with medical issues are often unable to play an entire 18-hole golf course.

Additionally, conventional sport and game venues, such as golf courses and pool tables, do not provide active feedback that instructs players how to improve their game (e.g., lower their score for a golf round, improve their putting accuracy, etc.) as they are playing a particular game. For example, when putting on a putting green, players are given a single attempt and are provided with limited guides or instruction on how to putt, where to putt, or how hard to putt given the location of the ball with respect to the hole and the contour of the putting surface. Typical golf course practice greens often have a limited number of surface contours, such that players wanting to improve their game must visit multiple courses to find sufficient variation of putting greens on which to practice.

SUMMARY

Accordingly, there is a need for sport and game simulation systems that address the above drawbacks. Some embodiments provide systems and methods for simulating various sports environments, such as different golf courses, different putting greens, different pool tables, different archery ranges, different shooting ranges, and the like. Some embodiments also provide systems and methods for guiding and training users to improve their game. Yet other embodiments provide systems and methods for playing games on a dynamic playing surface that has customizable topographic contours, holes, pockets, goals, bumpers, or the like.

While the sport of golf is used as the primary example herein, it should be appreciated that the sport and game simulation systems (and methods of use thereof) may be adapted and used for any other sport or game—particularly those that use a ball, such as golf, pool, billiards, etc.

By using guides (e.g., audio and visual guides), players can be provided with information to better understand/instruct the player as to both the topographic surface's contours and the players' putting stroke. This includes, but is not limited to, seeing the slopes and topography changes of the greens, what factors cause the ball to break, and what factors affect the speed the ball will travel. Also, by showing a "best-fit line", "length of pendulum stroke", and "surface gradient grids", players can follow simple directions to make difficult putts and improve their overall golf game.

Moreover, by providing a surface that can change contours or shape as well as change the location of a hole, players can experience many different green surfaces without having to move to different green locations. Players can stay in one location and experience many different green topographies. This provides two major advantages over conventional systems: (i) it provides users with audio and visual instruction and feedback; and (ii) allows users to experience an unlimited multitude of topographies and shot options with the capability of replicating actual greens from courses around the world, or creating complex contours of fictitious greens.

By combining the guidance with the variance of topographies, users can learn how to putt in a manner never before possible, allowing them to increase their skill while gamifying the training process (i.e., making the training process more enjoyable, easy-to-understand, providing feedback loops-both positive and negative, and including competition with leaderboards and rewards). At the same time, users can experience putting on contours replicating real-world golf course greens around the world, users can train for any specific type of putt, and users can adjust to non-traditional types of golf games.

In some embodiments, the audio and visual instruction and feedback includes: a square grid reflecting all contours of the green surface; water or other object movement over a playing surface; color gradients, a "best-fit-line indicating the suggested line/break of the putt at optimal speed; a "pendulum stroke strength line;" a target point to aim at while putting; and a target point at which to aim while putting. This all allows users to visualize, hear and feel where to putt and how hard to putt, while also creating references to learn why the ball moved in the manner it did. No conventional system provides this real-life guidance to assist users in the putting process.

Moreover, the changing topography system allows for an unlimited multitude of putting circumstances which are informed by the user's situation, desires, or needs. While standing at one location, this system allows for all variations of putts, including but not limited to: downhill, uphill, downhill-and-uphill, left-to-right, right-to-left, double break, peak-and-valley, and any other current or future real-life topography. These options may be played in any format, including but not limited to: traditional golf, mini-golf, hack-golf, video-game golf, and any new type of game that can be played on the surface of the system.

Conventional putting greens, including but not limited to actual golf courses and practice greens, lack guidance for users. Video game and virtual reality systems, while becoming more realistic every day, do not reflect the real-life variables and circumstances that users experience when playing golf, nor have they been applied to actual contoured putting surfaces.

(A1) In accordance with some embodiments, a method is performed at an electronic device (e.g., system controller

114, FIG. 1A). The method includes: retrieving information identifying putting characteristics associated with a first user. The method further includes: identifying a current topography of a putting green and a current position of the first user's ball on the putting green. The method also includes: determining, based on the putting characteristics associated with the first user and based on the current topography of the putting green, (i) a best path from the current position of the first user's ball on the putting green to a target on the putting green and (ii) a backswing distance and/or speed and a corresponding follow-through distance and/or speed that will allow the first user to hit the ball along the best path. The method additionally includes: sending, to a projecting device that is distinct from the electronic device, instructions to (i) render a representation of the best path on the putting green and (ii) render a first graphic at a first position on the putting green that corresponds to the backswing distance and/or speed relative to the current position of the golf ball, and (iii) render a second graphic at a second position distinct from the first position on the putting green that corresponds to the follow-through distance and/or speed relative to the current position of the golf ball. In some embodiments, an animated graphic is used to show a participant how fast the putter should move in order to strike a ball with appropriate force to make it to the hole from its current location.

(A2) In some embodiments of the method of A1, the current topography and the current position are determined based on information received from at least one visual sensor that is communicably coupled with the electronic device.

(A3) In some embodiments of the method of any one of A1-A2, the method further comprises: sending, to the projecting device, instructions to render an animation that appears between the first position and the second position.

(A4) In some embodiments of the method of any one of A3, the animation moves between the first position and the second position at a speed that is based on the putting characteristics associated with the first user.

(A5) In some embodiments of the method of A4, the animation is a representation of a putter that is shown swinging between the first and the second positions at the speed.

(A6) In some embodiments of the method of any one of A1-A5, the method further comprises: before retrieving the putting characteristic associated with the first user, determining that a second ball, distinct from the first user's ball, is present on the putting green and is closer to the target than the first user's ball.

(A7) In some embodiments of the method of A6, the method further includes: receiving an indication that the first user's ball has moved to a different position on the putting green, distinct from the current position. In accordance with a determination the first user's ball is now closer to the target than the second ball, the method includes: retrieving information identifying putting characteristics associated with a second user that is associated with the second ball; identifying a current position of the second ball on the putting green; determining, based on the putting characteristics associated with the second user and based on the current topography of the putting green, (i) a best path from the current position of the second ball on the putting green to the target on the putting green and (ii) a backswing distance and/or speed and a corresponding follow-through distance and/or speed that will allow the first user to hit the second ball along the best path; and sending, to a projecting device that is distinct from the electronic device, instructions to (i) render a representation of the best path on the putting green and (ii) render the first graphic at a third position on the putting green that corresponds to the backswing distance and/or speed relative to the current position of the golf ball, and (iii) render the second graphic at a fourth position distinct from the first position on the putting green that corresponds to the follow-through distance and/or speed relative to the current position of the golf ball.

(A8) In some embodiments of the method of any one of A1-A7, the first graphic and the second graphic are the same. In some embodiments, the electronic device also sends, to the projecting device, instructions to render additional graphics that are each associated with predetermined point values. In some embodiments, each of the additional graphics is a concentric circle centered on a hole of a playing surface (e.g., a putting green). In some embodiments, one or more visual sensors send information to the electronic device indicating whether a golf ball putted by a user is within one or the concentric circles and point values are awarded accordingly (e.g., more point values are given if the user is within a respective concentric circle that is closest to the hole (i.e., has the smallest diameter relative to other concentric circles displayed on the putting green surface)).

(A9) In some embodiments of the method of any one of A1-A8, the first graphic and the second graphic intersect the representation of the best path at substantially right angles.

(A10) In another aspect, a sport simulation system (e.g., system 100, FIG. 1A) is provided. In some embodiments, the sport simulation system includes: one or more processors and memory storing one or more programs, which when executed by the one or more processors cause the sport simulation system to perform the method described in any one of A1-A9.

(A11) In yet another aspect, a sport simulation system is provided and the sport simulation system includes: means for performing the method described in any one of A1-A9.

(A12) In another aspect, an electronic device (e.g., system controller 114, FIG. 1A) is provided. In some embodiments, the electronic device includes: one or more processors and memory storing one or more programs, which when executed by the one or more processors cause the electronic device to perform the method described in any one of A1-A9.

(A13) In yet another aspect, an electronic device is provided and the electronic device includes: means for performing the method described in any one of A1-A9.

(A14) In still another aspect, a non-transitory computer-readable storage medium is provided. The non-transitory computer-readable storage medium stores executable instructions that, when executed by an electronic device, cause the electronic device to perform the method described in any one of A1-A9.

(A15) In accordance with some embodiments, a method is performed at an electronic device (e.g., system controller 114, FIG. 1A). The method includes: identifying a current topography of a putting green and a current position of a first user's ball on the putting green. The method also includes: determining, based on the current topography of the putting green, a best path from the current position of the first user's ball on the putting green to a target on the putting green. The method additionally includes: sending, to a projecting device that is distinct from the electronic device, instructions to render a representation of the best path on the putting green.

(A16) In some embodiments of the method of A15, the method further includes: retrieving information identifying putting characteristics associated with the first user. In these embodiments, the best path is further based on the putting characteristics associated with the first user. For example, the putting characteristics include how hard the first user typically strikes the ball, how consistently the first user strikes the ball, etc., in order to determine whether additional modifications to the best path are necessary to account for known putting tendencies of the first user. FIGS. 15A and 15B illustrate an exemplary best path graphic (e.g., best path graphic 1504) projected on to a putting green surface (e.g., playing surface 104, FIG. 1A).

(A17) In some embodiments of the method of any one of A15-A16, the method further includes determining a backswing distance and/or speed and a corresponding follow-through distance and/or speed that will allow the first user to hit the ball along the best path. In some embodiments the backswing distance and/or speed and the corresponding follow-through distance and/or speed are based on the current topography and on the retrieved putting characteristics. The method also includes: sending, to the projecting device, instructions to render a first graphic at a first position on the putting green that corresponds to the backswing distance and/or speed relative to the current position of the golf ball, and render a second graphic at a second position distinct from the first position on the putting green that corresponds to the follow-through distance and/or speed relative to the current position of the golf ball. FIGS. 15A and 15B illustrate an exemplary first graphic (e.g., backswing graphic 1508) and an exemplary second graphic (e.g., follow-through graphic 1506) projected on to a putting green surface (e.g., playing surface 104, FIG. 1A). In some embodiments the electronic device also sends, to the projecting device, instructions to render a target alignment graphic (e.g., target alignment graphic 1502, FIG. 15B) and a ball alignment graphic (e.g., ball alignment graphic 1510, FIG. 15A).

In some embodiments, a statistical analysis of a participant's swing characteristics is determined over time (e.g., by storing information in a database that identifies swing characteristics, such as impact speed, impact angle, shot result, and any characteristics affecting swing quality). As number of samples of participant's swings increases, the standard deviation over $W_{player}$ also decreases ($W_{player}$ is discussed below in reference to FIG. 15I). There are circumstances in which $W_{player}$ will increase due to events that are not related to the game itself. As an example, when the participant consumes alcohol while playing games at a sport simulation system, their swing characteristics may change in certain measurable ways (e.g., swing alignment accuracy decreases). If consumption of alcohol is monitored and determined (e.g., by system controller 114, FIG. 1A), in some embodiments, $W_{player}$ is widened to take into account an expected reduction in performance, and the putts affected by the condition are not used to update the statistics of the player. In some embodiments, the statistical analysis of the participant's game provides a summary of performance of the participant determined primarily by quality of the player's putting skill, and secondarily by effects such as intoxication, concentration, nervousness, fatigue, and many others.

(A18) In another aspect, a sport simulation system (e.g., system 100, FIG. 1A) is provided. In some embodiments, the sport simulation system includes: one or more processors and memory storing one or more programs, which when executed by the one or more processors cause the sport simulation system to perform the method described in any one of A15-A17.

(A19) In yet another aspect, a sport simulation system is provided and the sport simulation system includes: means for performing the method described in any one of A15-A17.

(A20) In another aspect, an electronic device (e.g., system controller 114, FIG. 1A) is provided. In some embodiments, the electronic device includes: one or more processors and memory storing one or more programs, which when executed by the one or more processors cause the electronic device to perform the method described in any one of A15-A17.

(A21) In yet another aspect, an electronic device is provided and the electronic device includes: means for performing the method described in any one of A15-A17.

(A22) In still another aspect, a non-transitory computer-readable storage medium is provided. The non-transitory computer-readable storage medium stores executable instructions that, when executed by an electronic device, cause the electronic device to perform the method described in any one of A15-A17.

(B1) In accordance with some embodiments, a method of managing a game of hand golf is provided and is performed by an electronic device (e.g., system controller 114, FIG. 1A). The method includes: providing a plurality of golf balls, each visually identifiable as belonging to either a first plurality of golf balls associated with a first participant or a second plurality of golf balls associated with a second participant. The method further includes: monitoring, using one or more sensors communicably coupled with the electronic device, continuous throws of golf balls in the plurality of golf balls towards a hole extending through a surface of a playing surface. The method also includes: detecting, by at least one detection sensor communicably coupled with the electronic device, whenever a golf ball of the plurality of golf balls has passed into the hole. The method additionally includes: determining whether each golf ball of the plurality of golf balls that has passed into the hole is associated with the first plurality of golf balls or the second plurality of golf balls. The method also includes: assigning a first predetermined point value to the first game participant for any golf balls that passed into the hole that are associated with the first plurality of golf balls; and assigning the first predetermined point value to the second game participant for any golf balls that passed into the hole that are associated with the second plurality of golf balls. The method further includes: assigning a second predetermined point value to the first game participant for any golf balls that: (i) are associated with the first plurality of golf balls, and (ii) are determined, based on the monitoring of the continuous throws, to have passed into the hole without first bouncing on the playing surface; and assigning the second predetermined point value to the second game participant for any golf balls that: (i) are associated with the second plurality of golf balls, and (ii) are determined, based on the monitoring of the continuous throws, to have passed into the hole without first bouncing on the playing surface. In some embodiments, one or more cameras are utilized to monitor the playing surface and the one or more cameras are positioned above and below the playing surface.

(B2) In some embodiments of the method of B1, the second predetermined point value is larger than the first predetermined value. In other embodiments, the second predetermined point value is a bonus point to award a respective participant for throwing a golf ball into the hole without having to bounce or roll the golf ball on the playing surface. In some embodiments, a number of predetermined point values are assigned to a respective participant based on number of bounces before the golf ball passed into the hole, based on whether the golf ball rolled into or bounced directly into the hole, and the like.

In some embodiments, targets used during a game of hand golf are dynamically configured by one or more projectors 105 such that any suitable graphic can be shown on the playing surface 104 and can be used during the game of hand golf. For example, a gopher can be projected on the playing surface 104 during a game in which participants attempt to hit the gopher by throwing balls at the gopher as it moves around the playing surface 104.

(B3) In some embodiments of the method of any one of B1-B2, the first plurality of golf balls are each visually identifiable as having a first color and the second plurality of golf balls are each visually identifiable as having a second color.

(B4) In another aspect, an electronic device (e.g., system controller 114, FIG. 1A) is provided. In some embodiments, the electronic device includes: one or more processors and memory storing one or more programs, which when executed by the one or more processors cause the electronic device to perform the method described in any one of B1-B3.

(B5) In yet another aspect, an electronic device is provided and the electronic device includes: means for performing the method described in any one of B1-B3.

(B6) In still another aspect, a non-transitory computer-readable storage medium is provided. The non-transitory computer-readable storage medium stores executable instructions that, when executed by an electronic device, cause the electronic device to perform the method described in any one of B1-B3.

(B7) In accordance with some embodiments, a system for managing a game of hand golf is provided (e.g., sport simulation system 100, FIG. 1A). The system includes: a first and a second plurality of golf balls, each golf ball in the first plurality of golf balls having a first color and each golf ball in the second plurality of golf balls having a second color. The system also includes: a putting green surface with at least one hole extending therethrough, the at least one hole including one or more color detection sensors configured to detect a color associated with a golf ball passing through the at least one hole. In some embodiments, the hole is any suitable target shown on the putting green surface, such as a moving target like a gopher that appears to be running across the putting green surface. The system further includes an electronic device communicably coupled with the one or more color detection sensors. The electronic device is configured to: (i) associate the first color with a first game participant of a plurality of game participants and associating the second color with a second game participant of the plurality of game participants; (ii) receive, from the one or more color detection sensors, information about the color associated with the golf ball passing through the at least one hole; (iii) in accordance with a determination that the information about the color indicates that the golf ball has the first color, assign a predetermined point value to the first game participant; and (iv) in accordance with a determination that the information about the color indicates that the golf ball has the second color, assign the predetermined point value to the second game participant.

Although color is the primary example use for explanatory purposes in B7-B23, in some embodiments, some other distinguishing feature of each golf ball may be used instead of color. For example, size of the golf balls, hash-shading on each golf ball, a graphic on a surface of each golf ball, RFID or NFC sensors included in the golf balls, and the like. In some embodiments, color is used in order to associate golf balls with a respective game participant and RFID, NFC, or other short-range communication technology is utilized to determine whether a respective ball has passed through a hole on a putting green surface.

Additionally, although a hole is described as a target for thrown golf balls, in some embodiments, any suitable target may be utilized. In some embodiments, the target is a moving target such as a graphic that appears to be moving across a playing surface (e.g., playing surface 104, FIG. 1A). In some embodiments, the one or more color detections sensors are not required, as the system is configured to identify and track throws by a particular player (e.g., using a number of cameras 103 of a tracking system 102, FIG. 1A) and use the tracked information to identify landing positions, ball flight path, and ball final resting location for each throw by the particular player. In some embodiments, the system tracks players by tracking kinetic movement and full ball flight from the particular player and to the current target for a particular game of hand golf. In some embodiments, points are awarded to players based on how close each of their thrown balls lands to the current target.

(B8) In some embodiments of the system of B7, the system further includes: at least one visual sensor communicably coupled with the electronic device, the at least one visual sensor configured to monitor the putting green surface. In these embodiments, the electronic device is further configured to: receive, from the at least one visual sensor, information about a path followed by the golf ball to the at least one hole; and in accordance with a determination that the information about the path followed by the golf ball indicates that the golf ball did not touch the putting green surface before travelling through the at least one hole, assigning bonus points in addition to the predetermined point value.

(B9) In some embodiments of the system of any one of B7-B8, the predetermined point value is further assigned based on a skill level associated with the respective game participant.

(B10) In some embodiments of the system of any one of B7-B9, the putting green surface includes one or more surface modification elements that are configured to deform the putting green surface during the game of hand golf.

(B11) In accordance with some embodiments, a method of managing a game of hand golf is provided and is performed by an electronic device (e.g., system controller 114, FIG. 1A). The method includes: providing a first and a second plurality of golf balls, each golf ball in the first plurality of golf balls having a first color and each golf ball in the second plurality of golf balls having a second color. As noted above, in some embodiments, any suitable tracking of player positions and kinetic movement is used instead of color detection. The method also includes: providing a putting green surface with at least one hole extending therethrough, the at least one hole including one or more color detection sensors configured to detect a color associated with a golf ball passing through the at least one hole. The method further includes providing an electronic device communicably coupled with the one or more color detection sensors. The electronic device is configured to: (i) associate the first color with a first game participant of a plurality of game participants and associating the second color with a second game participant of the plurality of game participants; (ii) receive, from the one or more color detection sensors, information about the color associated with the golf ball passing through the at least one hole; (iii) in accordance with a determination that the information about the color indicates that the golf ball has the first color, assign a predetermined point value to the first game participant; and (iv) in accordance with a determination that the information about the color indicates that the golf ball has the second color, assign the predetermined point value to the second game participant.

(B12) In some embodiments of the method of B11, the method further includes: providing at least one visual sensor communicably coupled with the electronic device, the at least one visual sensor configured to monitor the putting green surface. In these embodiments, the electronic device is further configured to: receive, from the at least one visual sensor, information about a path followed by the golf ball to the at least one hole; and in accordance with a determination that the information about the path followed by the golf ball indicates that the golf ball did not touch the putting green surface before travelling through the at least one hole, assigning bonus points in addition to the predetermined point value.

(B13) In some embodiments of the method of any one of B11-B12, the predetermined point value is further assigned based on a skill level associated with the respective game participant.

(B14) In some embodiments of the method of any one of B11-B13, the putting green surface includes one or more surface modification elements that are configured to deform the putting green surface during the game of hand golf.

(B15) In another aspect, an electronic device (e.g., system controller 114, FIG. 1A) is provided. In some embodiments, the electronic device includes: one or more processors and memory storing one or more programs, which when executed by the one or more processors cause the electronic device to perform the method described in any one of B11-B14.

(B16) In yet another aspect, an electronic device is provided and the electronic device includes: means for performing the method described in any one of B11-B14.

(B17) In still another aspect, a non-transitory computer-readable storage medium is provided. The non-transitory computer-readable storage medium stores executable instructions that, when executed by an electronic device, cause the electronic device to perform the method described in any one of B5-B8.

(B18) In accordance with some embodiments, a method of managing a game of hand golf is provided and is performed by an electronic device (e.g., system controller 114, FIG. 1A). The method includes: providing a first and a second plurality of golf balls, each golf ball in the first plurality of golf balls having a first color that is associated with a first game participant and each golf ball in the second plurality of golf balls having a second color that is associated with a second game participant. The method further includes: monitoring continuous throws by the first game participant and the second game participant, using one or more visual sensors communicably coupled with the electronic device, of golf balls in the first and second plurality of golf balls towards a hole extending through a surface of a putting green. The method also includes: receiving an indication, from one or more color detection sensors coupled with the hole and communicably coupled with the electronic device, that a first golf ball has passed through the hole, the indication including information identifying color of the first golf ball. In accordance with a determination that the information identifying color of the first golf ball indicates that the first golf ball has the first color, the method includes: assigning a predetermined point value to the first game participant. In accordance with a determination that the information identifying color of the first golf ball indicates that the first golf ball has the second color, the method includes: assigning a predetermined point value to the second game participant.

(B19) In some embodiments of the method of B18, the method further includes: receiving an additional indication, from one or more color detection sensors coupled with the hole and communicably coupled with the electronic device, that a second golf ball has passed through the hole at substantially the same time as the first golf, the additional indication including new information identifying color of the second golf ball. In accordance with a determination that the new information identifying color of the second golf ball indicates that the second golf ball has the first color, the method includes: assigning a predetermined point value to the first game participant. In accordance with a determination that the new information identifying color of the second golf ball indicates that the second golf ball has the second color, the method includes: assigning a predetermined point value to the second game participant.

(B20) In some embodiments of the method of any one of B18-B19, the method further includes: receiving, from the at least one visual sensor, information about a path followed by the first golf ball to the hole. In accordance with a determination that the information about the path followed by the golf ball indicates that the golf ball did not touch the putting green surface before travelling through the hole, the method includes: assigning bonus points in addition to the predetermined point value.

(B21) In another aspect, an electronic device (e.g., system controller 114, FIG. 1A) is provided. In some embodiments, the electronic device includes: one or more processors and memory storing one or more programs, which when executed by the one or more processors cause the electronic device to perform the method described in any one of B18-B20.

(B22) In yet another aspect, an electronic device is provided and the electronic device includes: means for performing the method described in any one of B18-B20.

(B23) In still another aspect, a non-transitory computer-readable storage medium is provided. The non-transitory computer-readable storage medium stores executable instructions that, when executed by an electronic device, cause the electronic device to perform the method described in any one of B18-B20.

(C1) In accordance with some embodiments, a method of managing a game at a sport simulation system (e.g., sport simulation system 100, FIG. 1A) and is performed by an electronic device (e.g., system controller 114, FIG. 1A). The method includes: delivering, to a putting green surface, a first plurality of golf balls having a first color. The method also includes: configuring the putting green surface to have a first topography. For each respective golf ball of the plurality of golf balls, the method includes: (i) determining that a first game participant is addressing a respective golf ball of the first plurality of golf balls; (ii) determining, based on the first topography of the putting green surface, a best path from the respective golf ball to a target on the putting green surface; (iii) sending, to a projecting device that is distinct from the electronic device, instructions to (a) render a representation of the best path on the putting green surface and (b) render a substantially circular graphic around the target, the substantially circular graphic having a size that is determined based on a skill level associated with the first game participant; (iv) monitoring a path of the respective golf ball after the first game participant putts the respective golf ball; (v) in accordance with a determination that the first game participant's putt causes the respective golf ball to fall through the at least one hole, assigning a first point value to the first game participant; and (vi) in accordance with a determination that the first game participant's putt causes the respective golf ball to come to a stop within the substantially circular graphic, assigning a second point value to the first game participant.

In some embodiments, instead of substantially circular graphics, any graphic of a predetermined shape is utilized. For example, country-shaped graphics, substantially square graphics, and the like.

(C2) In some embodiments of the method of C1, the method further includes: in accordance with a determination that the first game participant's putt causes the respective golf ball to come to a stop outside of the substantially circular graphic, assigning no point values to the first game participant.

(C3) In some embodiments of the method of any one of C1-C2, delivering the first plurality of golf balls comprises delivering each golf ball of the plurality to a predetermined location on the putting green surface.

(C4) In some embodiments of the method of any one of C1-C3, determining the best path includes determining a backswing distance and/or speed and a corresponding follow-through distance and/or speed that will allow the first game participant to hit the first golf ball along the best path.

(C5) In some embodiments of the method of C4, sending the instructions includes sending instructions to (a) render a first graphic at a first position on the putting green that corresponds to the backswing distance and/or speed relative to the current position of the respective golf ball, and (b) render a second graphic at a second position distinct from the first position on the putting green that corresponds to the follow-through distance and/or speed relative to the current position of the respective golf ball.

(C6) In some embodiments of the method of any one of C1-05, the method further includes: after the first game participant has putted each golf ball of the first plurality of golf balls, delivering, to the putting green surface, a second plurality of golf balls having a second color; and configuring the putting green surface to have a second topography. The method then includes performing operations i-vi of C1 based on the second topography and the second plurality of golf balls (instead of the first topography and the first plurality, respectively). In some embodiments, the substantially circular graphic is also replaced by a smaller graphic, so that the game becomes more challenging.

(C7) In another aspect, an electronic device (e.g., system controller 114, FIG. 1A) is provided. In some embodiments, the electronic device includes: one or more processors and memory storing one or more programs, which when executed by the one or more processors cause the electronic device to perform the method described in any one of C1-C6.

(C8) In yet another aspect, an electronic device is provided and the electronic device includes: means for performing the method described in any one of C1-C6.

(C9) In still another aspect, a non-transitory computer-readable storage medium is provided. The non-transitory computer-readable storage medium stores executable instructions that, when executed by an electronic device, cause the electronic device to perform the method described in any one of C1-C6.

(D1) In accordance with some embodiments, a sport simulation system (e.g., sport simulation system 100, FIG. 1A) is provided. The system includes: a dynamic playing surface; at least one camera focused on the playing surface; a guidance system for projecting guidance information onto the dynamic playing surface; and a controller having one or more processors and memory and configured to: (i) change the topography of the dynamic playing surface, and (ii) overlay guidance information onto the playing surface based at least on the current topography of the dynamic playing surface.

(D2) In accordance with some embodiments, a method of simulating a ball sport on a dynamic playing surface is provided (e.g., playing surface 104 of sport simulation system 100, FIG. 1A) and is performed by an electronic device (e.g., system controller 114, FIG. 1A). The method includes: changing the topography of the dynamic playing surface based on a mode of operation; determining the topography of the dynamic playing surface; and projecting guidance information onto the dynamic playing surface at least based on the determined topography of the surface.

(D3) In some embodiments of the method of D2, the method further includes: determining the location of a ball on the dynamic playing surface, wherein the projecting of the guidance information onto the dynamic playing surface is also based on the location of the ball.

(D4) In some embodiments of the method of D3, the method further includes: determining the location of a hole the dynamic playing surface, wherein the projecting of the guidance information onto the dynamic playing surface is also based on the location of the hole.

(D5) In some embodiments of the method of D4, the method further includes: determining a player's historic swing force from prior putts, wherein the projecting of the guidance information onto the dynamic playing surface is also based on the player's historic swing force.

(D6) In another aspect, an electronic device (e.g., system controller 114, FIG. 1A) is provided. In some embodiments, the electronic device includes: one or more processors and memory storing one or more programs, which when executed by the one or more processors cause the electronic device to perform the method described in any one of D2-D5.

(D7) In yet another aspect, an electronic device is provided and the electronic device includes: means for performing the method described in any one of D2-D5.

(D8) In still another aspect, a non-transitory computer-readable storage medium is provided. The non-transitory computer-readable storage medium stores executable instructions that, when executed by an electronic device, cause the electronic device to perform the method described in any one of D2-D5.

(D9) In accordance with some embodiments, a method of simulating a ball sport on a dynamic playing surface is provided (e.g., playing surface 104 of sport simulation system 100, FIG. 1A) and is performed by an electronic device (e.g., system controller 114, FIG. 1A). The method includes: displaying, on a screen in a sport simulation system, a visual representation of a simulated golf hole; receiving an indication that a first user has hit a golf ball towards the screen; determining a location at which the golf ball came to rest on a virtual putting green associated with the simulated golf hole; adjusting a topography of a physical green within the sport simulation system to match characteristics of the virtual putting green relative to the location at which the golf ball came to rest.

(D10) In some embodiments of the method of D9, adjusting the topography includes tilting physical green (e.g., using a predefined number, such as 1-3 linear actuators).

(D11) In some embodiments of the method of D10, adjusting the topography includes contouring the physical green (e.g., using a plurality of linear actuators).

(D12) In another aspect, an electronic device (e.g., system controller 114, FIG. 1A) is provided. In some embodiments, the electronic device includes: one or more processors and memory storing one or more programs, which when executed by the one or more processors cause the electronic device to perform the method described in any one of D9-D11.

(D13) In yet another aspect, an electronic device is provided and the electronic device includes: means for performing the method described in any one of D9-D11.

(D14) In still another aspect, a non-transitory computer-readable storage medium is provided. The non-transitory computer-readable storage medium stores executable instructions that, when executed by an electronic device, cause the electronic device to perform the method described in any one of D9-D11.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 2A-2C are schematic diagrams of hitting maps used in a sport simulation system, in accordance with some embodiments.

FIGS. 3A-3B are schematic diagrams of a first embodiment of a dynamic playing surface used in a sport simulation system, in accordance with some embodiments.

DESCRIPTION OF EMBODIMENTS

As discussed above and in more detail below, there is a need for sport simulation systems that provide user-specific guidance and training using a dynamic playing surface. Disclosed herein are novel systems, games played using the systems, methods, and interfaces to address these needs.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1A:
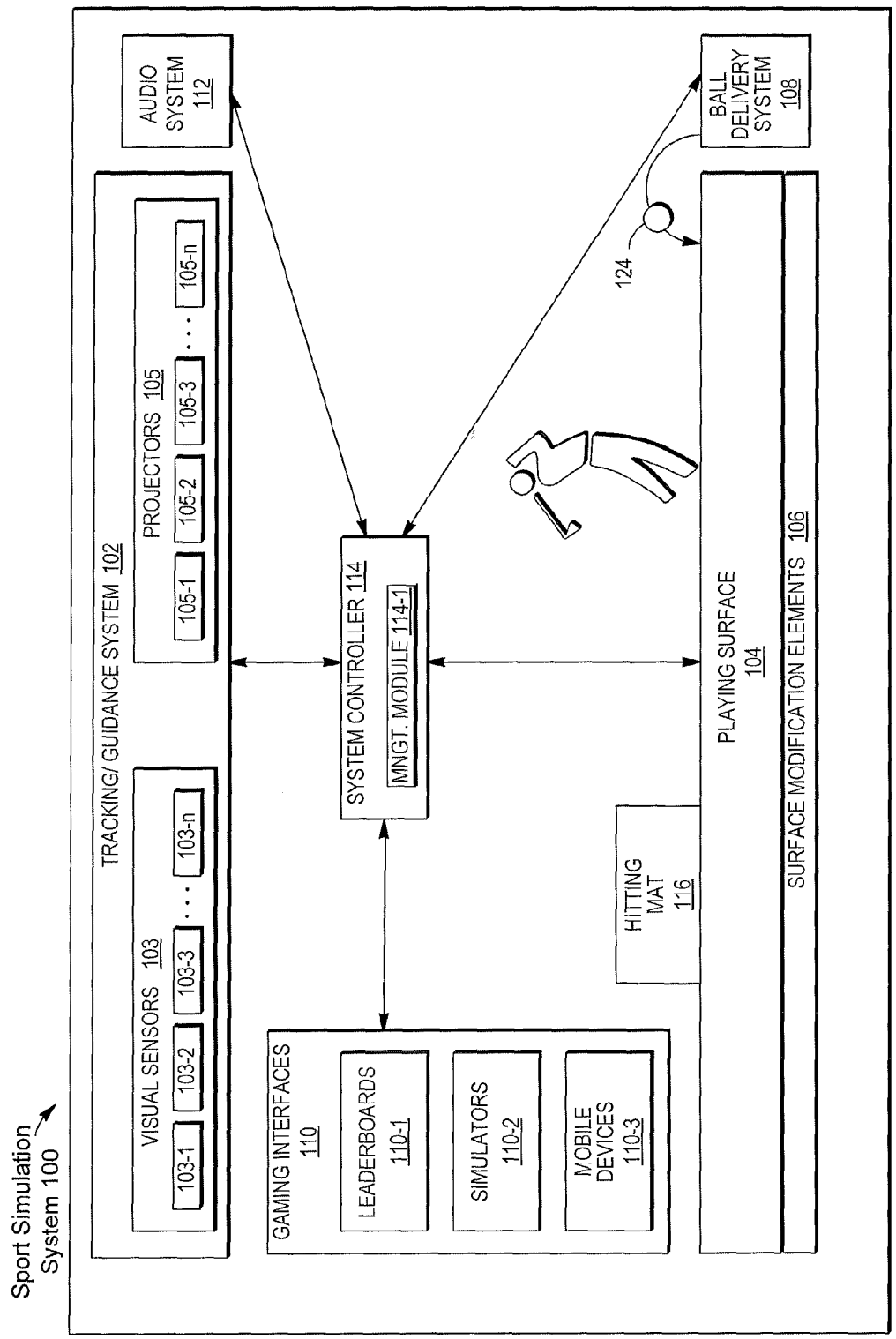
FIG. 1A is a block diagram of a sport simulation system, in accordance with some embodiments.

Attention is now directed to FIG. 1A, showing a block diagram of a sport simulation system, in accordance with some embodiments. As shown in FIG. 1A, a sport simulation system 100 includes a tracking system 102, audio system 112, gaming interfaces 110, a playing surface 116, a ball delivery system 108, and a system controller 114 that is coupled with each of the aforementioned components.

In some embodiments, the tracking/guidance system 102 includes visual sensors 103 (e.g., visual sensors 103-1, 103-2, 103-3 . . . 103-n) and projectors 105 (e.g., projectors 105-1, 105-2, 105-3 . . . 105-n). In some embodiments, the tracking/guidance system 102 is integrated, while in other embodiments, a separate tracking system and a separate guidance system is provided. For ease of explanation, references herein to tracking/guidance system 102 encompass embodiments in which the tracking and the guidance system are separate.

In some embodiments the visual sensors 103 and the projectors 105 are connected at various locations within the sports simulation system 100 (e.g., to the ceiling, to walls within the system, etc.) in order to provide enough angles to view all activities within the sports simulation system 100 and to project images at all angles within the sports simulation system 100. In some embodiments, the tracking system 102 includes one or more high resolution digital cameras connected to a network of computers that perform complex computer-vision tracking of ball location, velocity, and associates each ball with a unique player. In some embodiments, the tracking system maintains a model of the playing field and state of each ball (e.g., locations of each ball on the playing surface 104) during game play. This allows for virtual or augmented reality features (see "Laser Crunch" game description below). In some embodiments, multiple cameras are used to attempt to keep the ball in a field of view at all times. Many players being on the green at the same time may occlude the view of one camera. In some embodiments, the tracking data from vision system is sent to a master system that will coordinate the data. In some embodiments, this master system will also have information about the topography of the green, location of the holes and the locations of virtual targets that are "drawn" by the master system.

In some embodiments, guidance system software is provided as a part of the tracking/guidance system 102, and this guidance system software uses classical mechanics (i.e. physics) to provide models for gravity, ballistics, and friction. As mentioned above, in some embodiments, the guidance system 102 has a model of the green topography. In some embodiments, using an optimizer/solver system allows the guidance system 102 to determine an optimal path, strike vector, and pendulum swing to help sink a putt on the playing surface 104. In some embodiments, guidance system software to determine these quantities solves numerous differential equations in near real-time to compute proper forces and trajectory for each putt. In some embodiments, a participant's progress (e.g., their skill level and improvement as they use the sport simulation system 100) is scored using the ball's trajectory and resting place relative to the hole and virtual targets (e.g., a more difficult made putt can be assigned more points than a simple or close-range made putt).

In some embodiments, the guidance system 102 also provides audio and visual aids that help guide and teach each participant how to putt. In some embodiments, the visual aids are provided using both digital projectors and 7-color (RGB) digital laser projectors that are programmed dynamically by the system controller 114 using a standard laser projector interface. In some embodiments, the audio component is supplied using a high fidelity public address system using digital audio samples that are stored and sequenced on a local server relative to the system controller 114. In some embodiments, the purpose of the visual aids is to provide a high contrast, easily visible, precise best fit line, ball target point (point to aim for on the playing surface 104, given a current topography of the playing surface 104), a putter back and forth motion required ("pendulum"), and a grid that identifies the contour of the green, which each depends on position of the ball with respect to the hole and the topography in between. In some embodiments, the visual component is established per putt/per player based upon image from camera imaging devices (e.g., cameras 103) that scan the entire green surface and those images are then used by the system controller 114 to determine how to render each of the aforementioned visual aids. In some embodiments, the visual system will also place concentric circles (e.g., concentric targets 310, FIG. 3C) that will have different points scale as you get closer to the hole and point values and locations/sizes of the concentric circles are determined based upon data from the cameras 103.

Figure 1B:
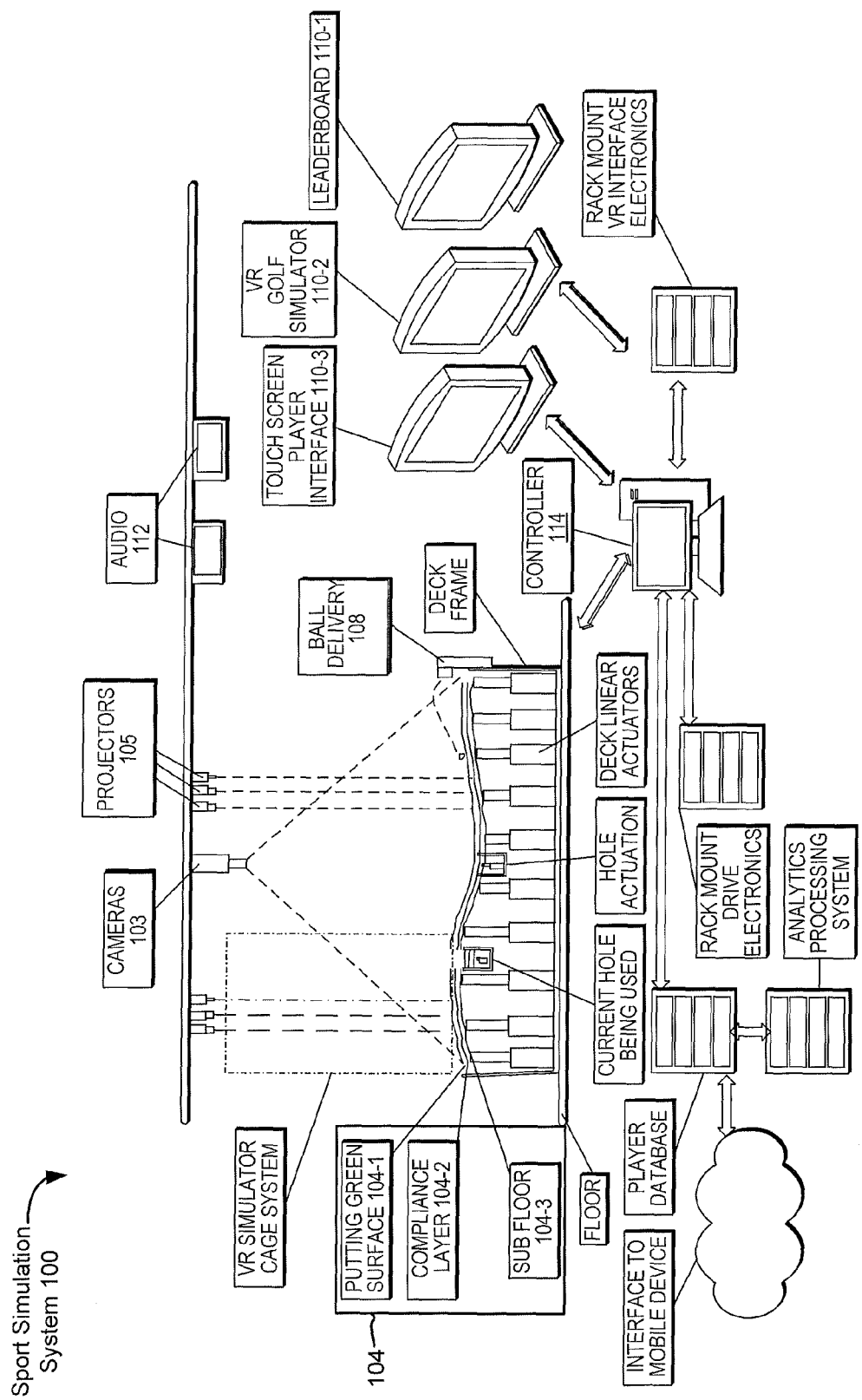
FIG. 1B is a schematic diagram of a dynamic playing surface system, in accordance with some embodiments.
Figure 1C:
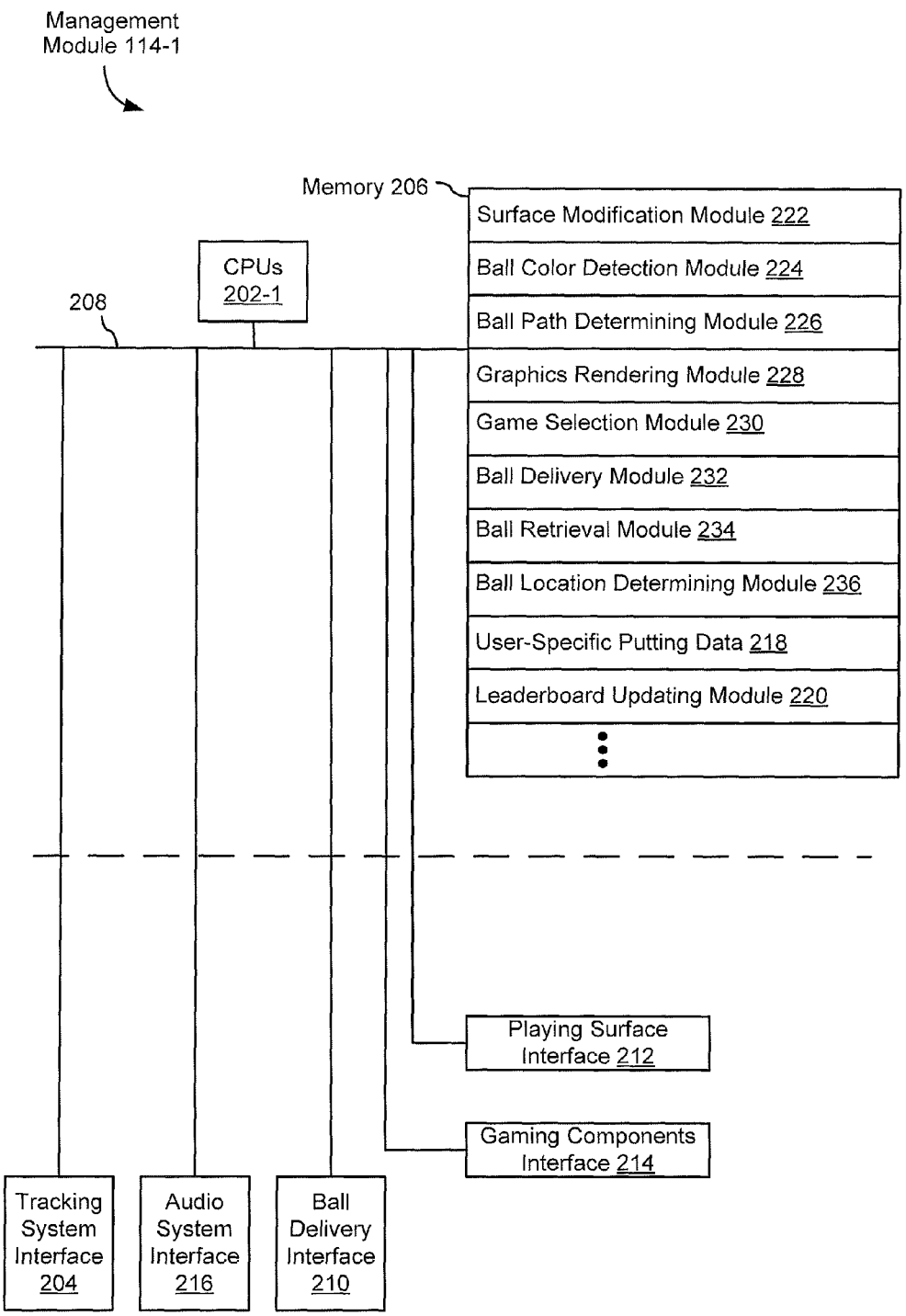
FIG. 1C is a block diagram of a system controller for a sport simulation system, in accordance with some embodiments.

In some embodiments, the visual sensors 103 are configured to track and monitor participants within the sports simulation system 100, to associate participants with sports balls (e.g., golf balls), track paths followed by the sports balls, and to send information regarding the aforementioned to the system controller 114 (or one of its components, such as ball path determining module 226, ball color detection module 224, ball location determining module 236, FIG. 1C).

In some embodiments, the one or more projectors 105 are configured to render images onto a playing surface (e.g., playing surface 104) of the sport simulation system 100. Exemplary images that the projectors 105 are capable of projecting onto the playing surface 104 are described below in reference to FIGS. 15A-15B (an ideal ball path for a golf ball travelling towards a hole on a putting green surface), 17

(a robotic assistant that is used to follow a ball path travelled after a user putted a ball), and 18A-18B (a dynamic graphic that presents a visualization of actuators moving beneath the playing surface 104 while the playing surface 104 is changing its shape (e.g., either by tilting or by contouring the surface)). In some embodiments, the one or more projectors 105 are configured to adaptively present graphics so that the graphics render properly even while the playing surface 104 is changing shape.

In some embodiments, the audio system 112 receives instructions from the system controller 114 to provide audio feedback to participants in games conducted at the sport simulation system 100. For example, in response to a respective participant sinks a challenging putt, the system controller 114 sends instructions to the audio system 112 to provide encouraging feedback to the participant (such as cheering noise). As another example, in response to a respective participant missing a putt, the system controller 114 sends instructions to the audio system 112 to provide instructional feedback to the participant (e.g., instructions on how to improve their putting stroke, align their feet properly, or other ways to improve their putting skills). In some embodiments and also in response to a respective participant missing a putt, the system controller 114 sends instructions to the projectors 105 to render video feedback (in conjunction with the instructional feedback) that supplements the auditory feedback (e.g., a video showing the participant's missed putting stroke and information about what aspects of the missed putting stroke caused the participant to miss the putt (such as their feet were improperly aligned or their struck the ball with too much force)). In some embodiments, guidance information (such as a best fit line or best path for a golf ball) is projected onto the surface by the projectors 105 and this guidance information also helps to improve participant's chances of making a shot (additional information regarding projecting best path graphics is presented below in references to FIGS. 15A-15K).

In some embodiments, the gaming interfaces 110 include leaderboards 110-1, simulators 110-2, and mobile devices 110-3. In some embodiments, the leaderboards 110-1 present scoring information for each player of a respective game being played at the sports simulation system 100 (e.g., points allocated to each player of a game of hand golf, as discussed below in reference to FIG. 16. In some embodiments, the leaderboards 110-1 are displayed on large display in front of the participants and may also be accessible through mobile devices 110-3 (e.g., by the mobile phones held by the individual participants). In some embodiments, the simulations 110-2 include golf simulators (or other ball tracking technology) that allows participants to simulate a round of 18-hole golf. In some embodiments, the simulators 110-2 provide, to the system controller 114, information about a location of a respective participant's last shot (e.g., an approach shot to a virtual putting green of a simulated golf hole). In response to receiving the provided information, the system controller 114 determines an appropriate topography for the playing surface 104 (in order to simulate a topography of the virtual putting green based on the respective participant's approach shot and its landing location on the virtual green).

In some embodiments, the mobile devices 110-3 include touch-sensitive displays that allow users to interact with and control the sports simulation system 114 (e.g., to select new games or view other data available through the system 100, as discussed below in reference to FIGS. 13A-13C).

In some embodiments, the playing surface 104 is a dynamic playing surface 104 that is capable of simulating a variety of various putting shots (as discussed below). In some embodiments, the dynamic playing surface 104 is capable of contouring to match topographies of real-life greens (e.g., by configuring one or more surface modification elements 106 to produce a desired topography at the playing surface 104, discussed below in reference to FIG. 3C). In other embodiments, the dynamic playing surface 104 is rigid and incapable of contouring, but is capable of tilting to simulate a variety of putting shots (e.g., as discussed below in reference to FIGS. 3A-3B). In some embodiments, the playing surface 104 is a fully actuated assembly controlled by the system controller 114 to be shaped into many different topographies. In some embodiments, the playing surface 114 is configured to be tipped, tilted, and/or contoured to replicate any putting green. In some embodiments, the playing surface 114 is rigid and is only capable of being tilted (as explained below in reference to FIGS. 3A-3C). In some embodiments, the playing surface 104 is controlled by many surface modification elements 106 (e.g., linear actuators) that push and pull on a sub-floor to make peaks and valleys on the playing surface 104. In some embodiments, the playing surface 104 includes a compliance layer (e.g., compliance layer 304, FIG. 3C) that moves with the contouring and provides compliance and density that a real green would have. In some embodiments, above the compliance layer there, a green surface (e.g., top surface 302, FIG. 3C) is provided that has surface roughness and properties of a real green to establish proper response of a golf ball rolling over it. In some embodiments, there are multiple holes that can be used independently depending upon the putting green configuration requested. In some embodiments, there can be an oversized hole to make it fun and a little easier for beginner golfers or children.

In some embodiments, the playing surface 104 is coupled with a hitting mat 116 that deploys over the playing surface 104 at an appropriate time (e.g., when the user is hitting an iron shot, a chip shot, or a drive) and goes to a storage position when the user is putting. Hitting mat 116 is discussed in more detail below in reference to FIGS. 2A-2C. In some embodiments, one or more of hitting mats 116 include a portion (e.g., a sub-component) of a ball delivery system 108, so that balls are quickly and easily delivered to the one or more hitting mats 116.

In some embodiments, the ball delivery system 108 is configured to send balls onto the playing surface 104. In some embodiments, the ball delivery system 108 sends the balls to predetermined locations on the playing surface 104. The predetermined locations are based on practice spot locations, game-specific putting locations, and the like. In some embodiments, the predetermined locations are based on where each respective participant hit their golf ball while using the simulators 110-2 and the ball delivery system 108 sends balls to predetermined locations corresponding to where each participant hit their golf ball in the simulator. In some embodiments, the ball delivery system 108 is configured to change ball delivery settings in order to achieve controlled ball delivery (such as speed, spin, launch angle) and, in some embodiments, the system controller 114 communicates with the visual sensors 103 in order to verify that balls have reached the predetermined locations. In accordance with a determination that a ball has not reached its corresponding predetermined location, the controller 114 instructs the surface modification elements 106 so that tilting or contouring the playing surface 104 will move the ball to the corresponding predetermined location.

In some embodiments, the ball delivery system 108 ensures that participants are not running all over to fetch golf balls on the playing surface 104. In some embodiments, the ball delivery system 108 is configured to place balls on the playing surface 104 based upon final shots on a VR simulator. In some embodiments, the ball delivery system 104 accounts for interaction of balls at edges of the playing surface 104.

In some embodiments, the ball delivery system 108 also delivers balls to a predetermined location for each participant to make multiple shots from the predetermined location (e.g., a difficult putt location from which a respective participant has missed many previous putts) while in a practice mode for the sport simulation system 100. In some embodiments, the ball management system that will funnel a ball to the hole for beginner players or kids to make it a positive experience. In some embodiments, bumpers are provided on the playing surface 104 in a children's practice mode to add an extra challenge. In these embodiments, cameras 103 and the guidance system 102 as a whole accommodates for the presence of the bumpers, while determining how to render visual aids on the playing surface 104.

In some embodiments, the system controller 114 includes a management module 114-1 that includes a number of modules that are responsible for exchanging information with each of the components of the sports simulation system (additional details are provided below in reference to FIG. 1C).

Figure 13C:
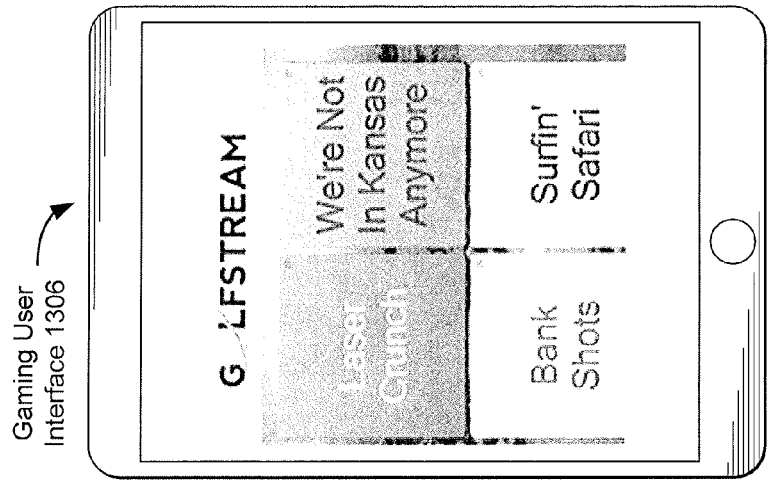
FIGS. 13A-13C are schematics of a mobile device used to illustrate exemplary user interfaces for selecting various games or modes, in accordance with some embodiments.
Figure 13B:
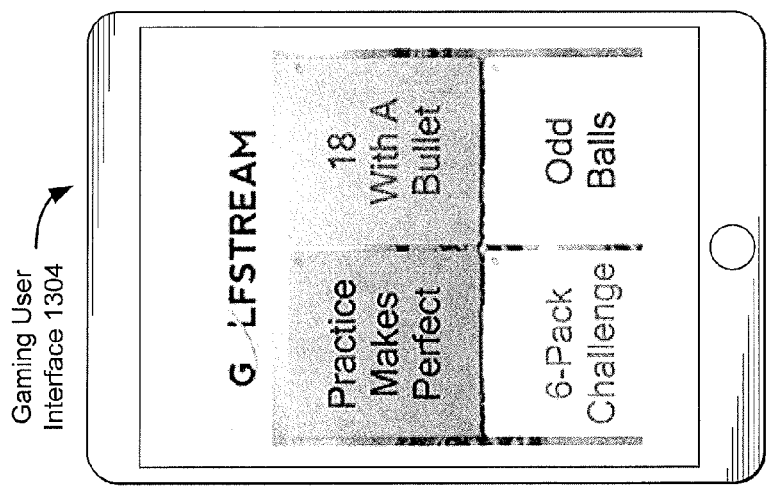
Figure 13A:
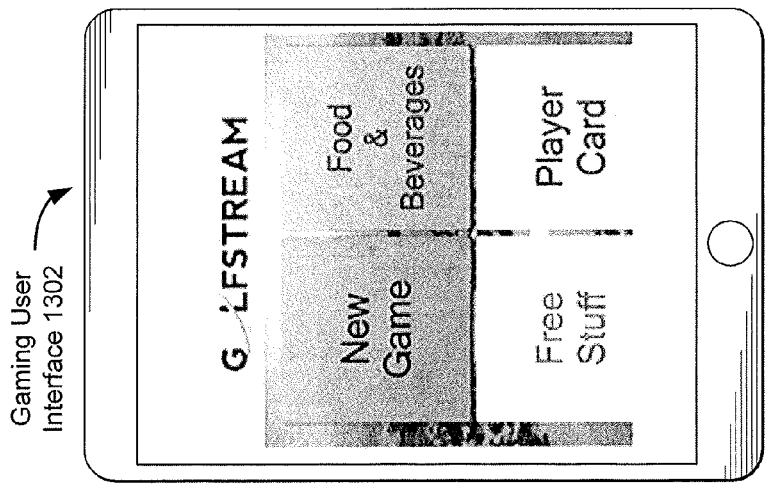

In some embodiments, the system controller 114 interfaces (e.g., using gaming components interface 214, FIG. 1C) with a mobile device that is provided to a participant and includes user interfaces that allow participants to get established, system mode to be selected, and selection of a type of game to be played at the sport simulation system 100 (e.g., using one or more of the gaming user interfaces shown in FIGS. 13A-13C). In some embodiments, there is provided a touch display that the game and guidance systems can use to display video capture of putts from each participant, video display of a proper putting motion, scores from either games or putting evaluations after a putt from a respective participant. In some embodiments, a tablet system is provided that any participant can use to command different features of each mode at the sport simulation system 100.

In some embodiments, the system controller 114 interfaces with a Virtual Reality Golf Simulator (e.g., one of the simulators 110-2, FIG. 1A) that identifies a topography of specific putting green the players are on for an 18-hole course that is being played. In some embodiments, the system controller 114 also interfaces (e.g., using one or more playing surface interfaces 212, FIG. 1C) with one or more surface modification elements 106 (e.g., one or more linear actuators) below the playing surface 104 to push and pull to create the identified topography for the specific putting green.

In some embodiments, the system controller 114 additionally interfaces with hole actuators (e.g., one or the surface modification elements 106 that is coupled with a removable, substantially circular portion of the playing surface 104) to enable correct hole position for the specific putting green being played. Any putting green can be simulated with the surface modification elements 106 (e.g., surface and hole control actuators). Once a respective simulator 110-2 indicates that that a shot made it to a putting green of a simulated golf course hole, the system controller 104 instructs a ball delivery system 108 to delivers a golf ball to a position on the playing surface 104 that matches the location reached by the shot. In some embodiments, the ball delivery system 108 is instructed to deliver balls to the playing surface 104 for all participants in a current 18-hole simulated golf round. In some embodiments, system controller 114, takes images using the visual sensors 103 (e.g., one or more cameras) to determine positions for each player's putt.

In some embodiments, the sport simulation system is configured to operate in multiple modes based on experience levels for the game participants. In accordance with a determination that a current mode of operation for the sport simulation system 100 is a training mode, the projectors 105 (also used to control a guidance system) is controlled (by the system controller 114) to show a best fit line (also referred to interchangeably herein as a best fit curve, best path, best putting path, and ideal putting line) from the ball to a hole on the playing surface 104. While in training mode, the projectors 105 are also instructed, in some embodiments, to render a ball target on the playing surface 104 (e.g., target alignment graphic 1502, FIG. 15B), a putter back-and-forth distance and speed required (e.g., backswing graphic 1508 and follow-through graphic 1506, FIG. 15B), and a grid showing the lay of the green or sloping gradient of the green. In some embodiments, colors or water movement graphics are projected onto the playing surface 104 in order to show topography of the playing surface 104. In some embodiments, the grid is utilized in combination with colors or water movement while, in other embodiments, only one graphic is utilized to show the topography of the playing surface 104. In some embodiments, the aforementioned graphics are provided for each participant in the game. In this way, a guidance system is provided that teaches or trains a non-golfer or even an experienced golfer how to play or better their short games and read greens.

In some embodiments, the guidance system further includes micro-chips located in each golf ball utilized with sport simulation system 100 to interface with the system controller 114 and inform each player what went wrong during a putt and to advise on possible corrective actions. In some embodiments, the golf balls do not include micro-chips.

In some embodiments, system controller 114 also interfaces with an audio system (e.g., using audio system interface 216, FIG. 1C) to give feedback to each participant on their training progress and tips for subsequent shots, if required. In some embodiments, the audio system 112 is controlled by the system controller 114 and is instructed to output various phrases as the ball travels to the hole. For example, there can be audio for "looks like a good putt at the start," to cheers as the ball gets close, to "Aws" if the putt is missed, and the like.

Attention is now directed to FIG. 1B, presenting a schematic diagram of the sport simulation system 100 described above in reference to FIG. 1A. In some embodiments, a base and frame is provided that houses numerous surface modification elements 106 (e.g., numerous linear actuators 106) that change the topography of a playing surface 104 (also referred to as a dynamic surface 104) that is moved by the surface modification elements 106. In some embodiments, the playing surface 104 includes a putting green surface 104-1, a compliance layer 104-2, and a sub-floor structure 104-3. The components and make-up of the playing surface 104 is described in more detail below in reference to FIGS. 3A-3B (embodiment in which the playing surface 104 is rigid, not contour-able, but still tilt-able) and FIG. 3C (embodiment in which the playing surface 104 is contour-able).

In some embodiments, the base system of the playing surface 104 is constructed from steel or aluminum and welded or otherwise fastened together. In some embodiments, the surface modification elements (e.g., deck linear actuators shown in FIG. 1B, such as hydraulic or pneumatic linear actuators). In these embodiments, the actuators interface to the framing system and are bolted in place. In some embodiments, the surface modification elements are below three layers of the playing surface 104 (e.g., a first layer such as a putting green, a second layer such as a compliance layer, a third layer such as sub-floor structure). Additional information regarding the three layers is provided in reference to FIG. 3C.

In some embodiments, the number of actuators required below the three layers is dependent upon the structural support required and the contour needed to generate different green shapes and multiple configurations. In some embodiments, only three actuators are utilized to tilt a rigid playing surface 104 (as explained below in reference to FIGS. 3A-3B) while, in other embodiments, numerous actuators are utilized to contour a flexible playing surface 104 (as explained below in reference to FIG. 3C).

In some embodiments, the playing surface 104 is positioned over a movable underlying layer (including but not limited to the actuators, bearings, compliance layer, sub floor structure, and/or any other materials and mechanisms which allow the overlying surface to change topography while bearing weight of up to 12 players). Additional information regarding layers of the playing surface 104 is provided in reference to FIG. 3C.

In some embodiments, the movable underlying layer is coupled to each actuator to allow the actuators to push and pull the floor to distort the surface topography. In some embodiments, a compliance layer (e.g., compliance layer 304, FIG. 3C) made of foam that is of an appropriate density and is laminated to the subfloor (e.g., sub-floor structure 306, FIG. 3C). In some embodiments, the density of the compliance layer will replicate the density of an actual putting green. In some embodiments, the final layer is the green layer or the top surface (e.g., top surface 302, FIG. 3C) and that is laminated to the compliance layer. In some embodiments, the top green layer is selected to meet the surface properties of an actual green so that the golf ball motion is very similar to a real putting green.

In some embodiments, the controller or computer system (e.g., system controller 114, FIGS. 1A and 1B) is a commercial-off-the-shelf high speed rack mounted processing system. In some embodiments, the controller 114 has interfaces to all the peripherals (e.g., tracking system interface 204, audio system interface 216, ball delivery interface 210, playing surface interface 212, and gaming components interface 214, FIG. 1C), memory for image processing and control algorithms (e.g., modules included in memory 206, FIG. 1C), and houses the control software in non-volatile memory (e.g., memory 206, FIG. 1C) that can be reprogrammed during testing and integration.

In some embodiments, an audio and visual guidance system (e.g., tracking system 102, FIG. 1A, including cameras 103 and projectors 105 shown in both FIGS. 1A and 1B) is located above the playing surface 104. In some embodiments, a camera system is coupled to the ceiling (e.g., cameras 103). In some embodiments, a lighting system (e.g., as a component or additional piece of projectors 105) is coupled to the ceiling and the audio system. In some embodiments, the interfaces are RF or wireless to reduce cabling between the guidance system and the control computer.

Some embodiments include multiple hole locations under the different green configurations. For example, there may be a current hole being used and other holes not currently being used (as shown in FIG. 1B). These embodiments may include a ball management system; ball delivery system (e.g., ball delivery system 108); a ball funneling system (described in more detail in reference to FIG. 4); a ball retrieval system (described in more detail in reference to FIG. 5); ball bumpers; etc.

Figure 3C:
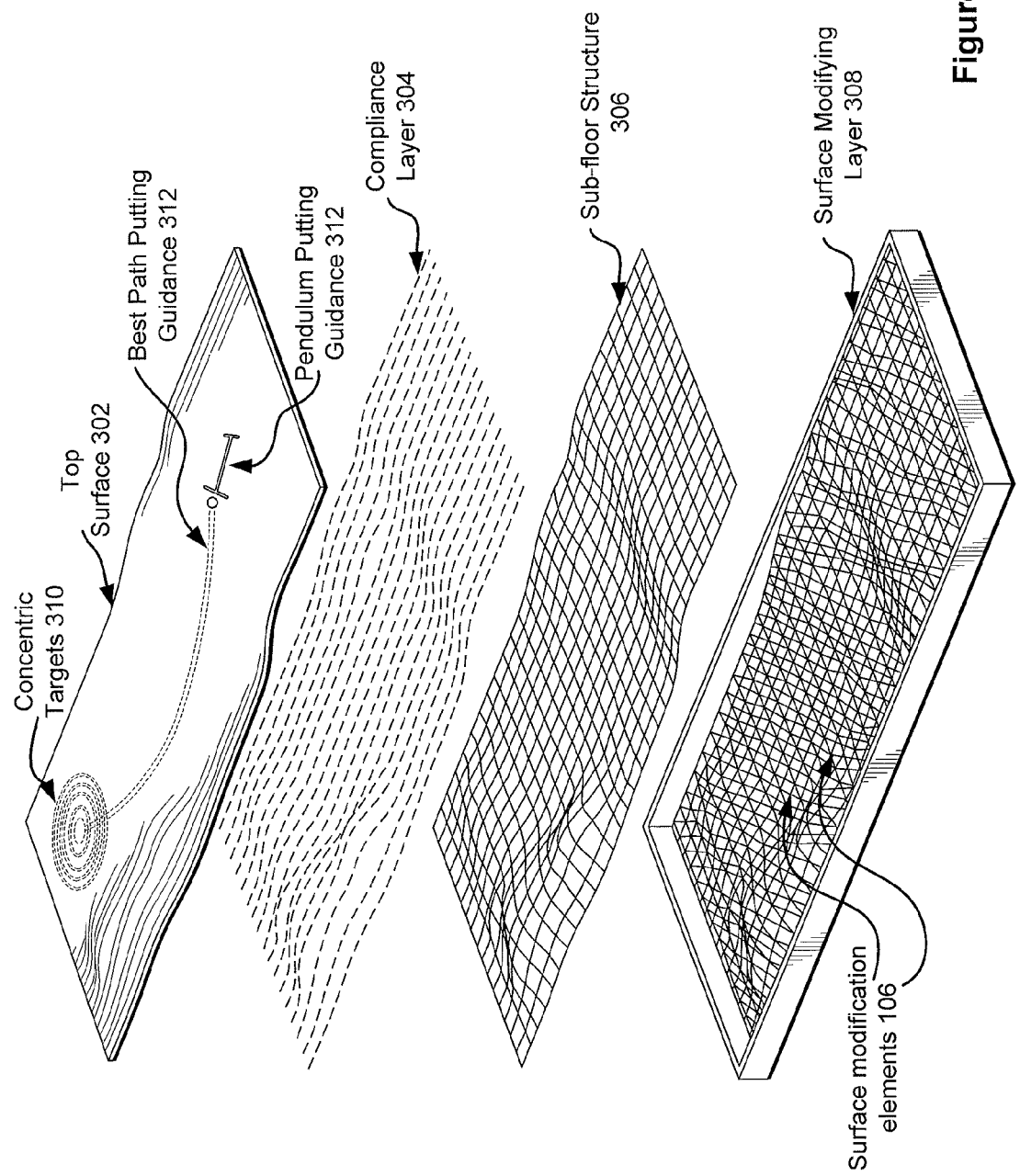
FIG. 3C is a schematic diagram showing a second embodiment (an alternative to the first embodiment) of a dynamic playing surface used in a sport simulation system, in accordance with some embodiments.

Also in some embodiments, the system controller 114 is configured to move the movable underlying layer (e.g., the surface modifying layer 308, FIG. 3C). This controller includes a processor and memory for executing instructions for controlling surface topography (shown in FIG. 1C). An interface, such as a touch screen interface, is provided for player input. The controller (or control computer) and its components are shown in FIG. 1C.

In some embodiments, a guidance system may also be provided (e.g., using projectors 105 of the tracking system 102, FIG. 1A). The guidance system may include a doppler system; a camera; one or more displays; and a visual guidance system for overlaying lines, circles, symbols, numbers, and annotations over the topography. In some embodiments, the lines include a grid, gradient/contour lines, a best fit line, a stroke length line-back; a stroke length line-front; an ideal ball path; a ball target point; a variable speed ball path; etc. all overlaid over the topography. The guidance system may also calculate and provide a distance-to-hole measurement; an elevation measurement; computer generated imagery for ball and surface technology for player feedback; etc. The guidance system may also include guidance system-audio; a controller; ball microchip technology for ball motion and for training; instructions for visual guidance based upon ball location from hole and surface properties; instructions for generating audio feedback based upon closed loop camera interface; instructions for mode control; a virtual reality simulator interface.

FIG. 1C is a block diagram illustrating a management module 114-1, in accordance with some embodiments of the sport and game simulation system shown in FIGS. 1A and 1B. Management module 114-1 typically includes one or more processing units (sometimes called CPUs or processors) 202-1 for executing modules, programs, and/or instructions stored in memory 206 (and thereby performing processing operations), memory 206 (sometimes called controller memory), and one or more communication buses 208 for interconnecting these components. The one or more communication buses 208 optionally include circuitry (sometimes called a chipset) that interconnects and controls communications between system components. Management module 114-1 is coupled to tracking system interface 204 (to allow the system controller 114 to exchange information and provide instructions to the tracking/guidance system 102), audio system interface 216 (to allow the system controller 114 to exchange information and provide instructions to the audio system 112), ball delivery interface 210 (to allow the system controller 114 to exchange information and provide instructions to the ball delivery system 108), playing surface interface 212 (to allow the system controller 114 to provide instructions to the playing surface 104 and the surface modification elements 106), and gaming components interface 214 (to allow the system controller 114 to exchange information and provide instructions to the leaderboards 110-1, simulators 110-2, and the mobile devices 110-3).

Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 202-1. Memory 206, or alternatively the non-volatile memory device(s) within memory 206, comprises a non-transitory computer readable storage medium.

In some embodiments, memory 206, or the non-transitory computer-readable storage medium of memory 206 stores the following programs, modules, and data structures, or a subset or superset thereof:

- surface modification module 222 for providing instructions to one or more surface modification elements (e.g., surface modification elements 106, FIG. 1A) in order to contour or tilt a playing surface (e.g., playing surface 104);
- ball color detection module 224 for detecting colors of balls on a playing surface (e.g., playing surface 104, FIG. 1A) and for detecting colors of balls as they pass through a hole on the playing surface;
- ball path determining module 226 for determining an ideal path from a position on a playing surface (e.g., playing surface 104, FIG. 1A) at which a ball is currently located and to a hole on the playing surface;
- graphics rendering module 228 for providing instructions to one or more projecting devices (e.g., one or more projectors 105, FIG. 1A) in order to render graphics on a playing surface (e.g., playing surface 104, FIG. 1A);
- game selection module 230 for providing user interfaces (e.g., gaming user interfaces shown in FIGS. 13A-13C) that allow participants to control operations and gaming modes at a sport simulation system (e.g., sport simulation system 100, FIG. 1A);
- ball delivery module 232 for determining an appropriate location on a playing surface at which to deliver a ball and sending instructions to a ball delivery system (e.g., ball delivery system 108) so that the ball delivery system is able to deliver the ball to the appropriate location (e.g., sending information about speed, launch angle, spin, etc. to send the ball to the appropriate location);
- ball retrieval module 234 for retrieving balls from a playing surface (e.g., playing surface 104, FIG. 1A);
- ball location determining module 236 for identifying locations of balls on a playing surface (e.g., playing surface 104, FIG. 1A);
- user-specific putting data 218 for storing information about putting characteristics and historical putts for each respective participant at a sport simulation system (e.g., sport simulation system 100, FIG. 1A) so that the stored information is available for future processing and use by the sport simulation system (e.g., to provide more accurate and user-tailored best fit lines);
- leaderboard updating module 220 for updating a leaderboard (e.g., one of the leaderboards 110-1) to include point data for each participant in a particular game at a sport simulation system (e.g., sport simulation system 100, FIG. 1A);

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 1C shows management module 114-1 in accordance with some embodiments, FIG. 1C is intended more as a functional description of the various features which may be present in management module 114-1 than as a structural schematic of the embodiments described herein. In practice, and as recognized by those of ordinary skill in the art, the programs, modules, and data structures shown separately could be combined and some programs, modules, and data structures could be separated.

Figure 2A:
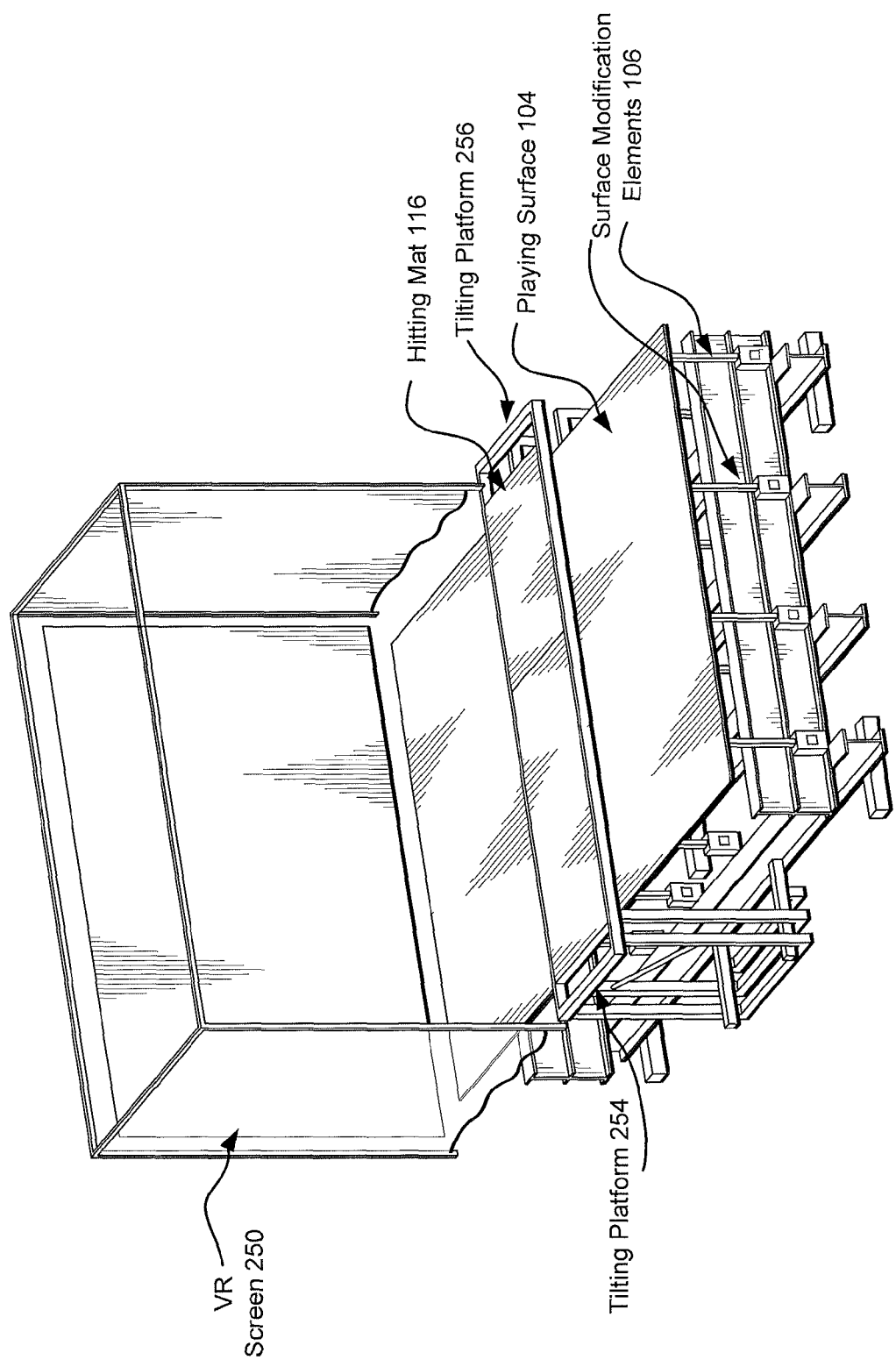
Figure 2B:
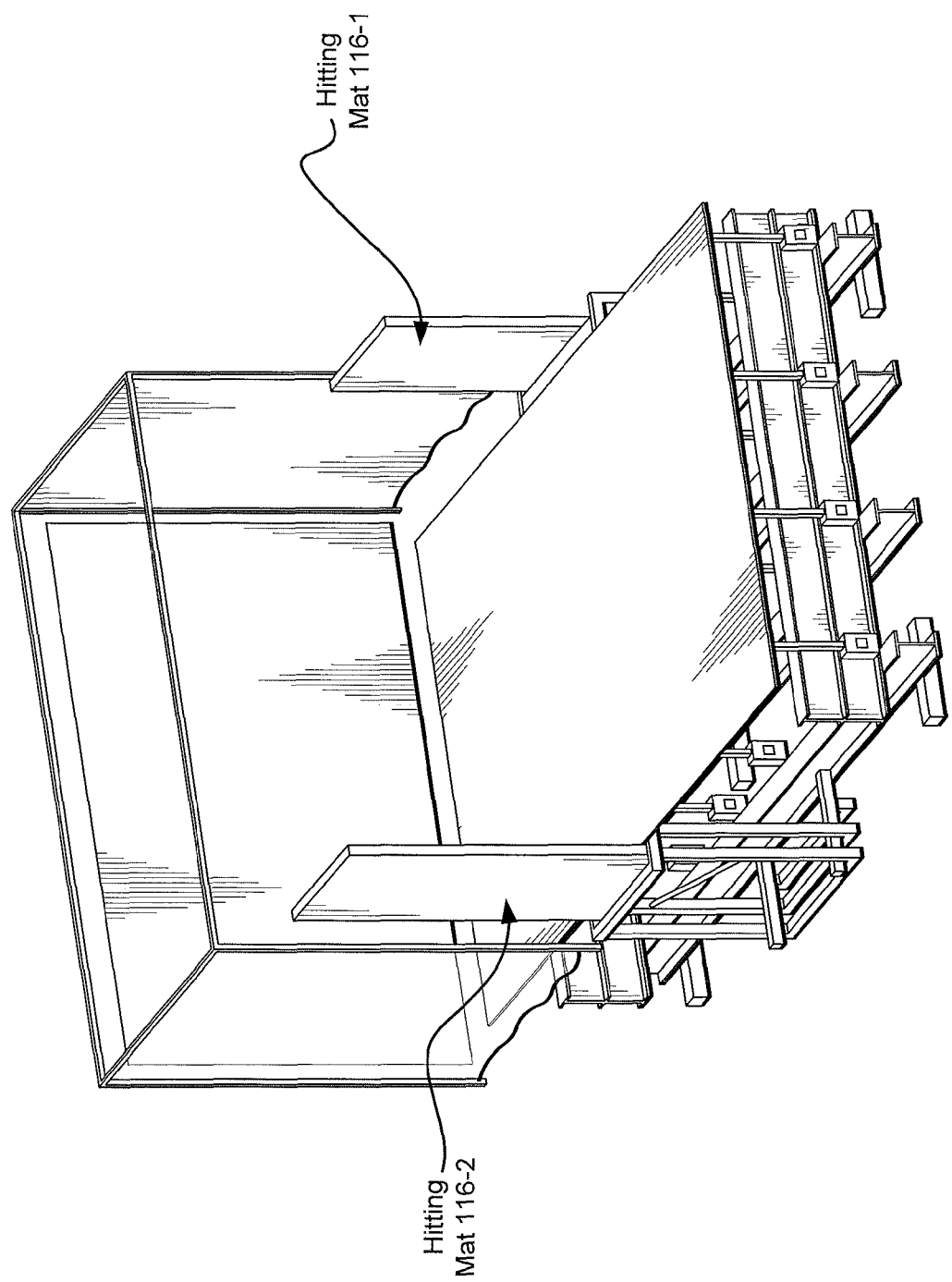

Attention is now directed to FIGS. 2A-2C, showing schematic diagrams of hitting maps used in a sport simulation system, in accordance with some embodiments. As shown in FIG. 2A, a hitting mat 116 is coupled with a playing surface 104. In some embodiments, the hitting mat 116 includes two tilting platforms (e.g., including tilting platforms 254 and 256) that have fairway-like surfaces from which a golf ball can be driven off of. In some embodiments, the fairway-like surface can be tailored to have thick grass, thin grass, sand, marsh, rock, shallow water, and/or wood chips in order to simulate various conditions found on real-life golf courses. In some embodiments, the hitting mat 116 can support a tee for driving, or a ball can be hit directly off a surface of the hitting mat 116. In some embodiments, each of the two tilting platforms of hitting mat 116 tilt against the playing surface 104 from either side to allow left-hand and right-hand golfers. In some embodiments, the tilting action can be initiated with a manual push-button switch, or automatically via software that is streamlined with the operations of a sport simulation system 100 (FIGS. 1A and 1B).

In some embodiments, the platforms also have provisions for surface-mounted or top-mounted commercial virtual reality sensor heads such that it can be used with a variety of existing virtual reality systems. When in use, the platforms are horizontal, resting on the green, and the golfer stands on them to strike the ball against a VR Screen (e.g., VR screen 250 FIG. 2A) in a sport simulation system (as shown in FIG. 2A). When not in use, the platforms are stowed vertically along the sides of the green (as shown in FIG. 2B the hitting mats 116-1 and 116-2 and stowed in a vertical position).

In some embodiments, systems including the hitting mats 106 have built-in safety features such as ultrasonic distance measuring sensors, proximity sensors, and limit switches that prevent the tilting platforms 254 and 256 (FIG. 2A) from tilting onto foreign objects or bystanders.

As shown in FIG. 2C, in some embodiments, the mechanisms used to deploy the hitting mats 116 include a base structure (e.g., base structure 270), a platform, a pivot shaft, and an actuator (e.g., actuator 260). In some embodiments, the base structure 270 is a solid rigid platform that attaches to the main structure of the playing surface or the surrounding concrete floor. Atop the base structure 270 is a pair of bearing pillow-blocks (e.g., bearing pillow blocks 262) through which the platform attaches via a precision shaft. The platform is allowed to pivot through the bearing pillow-blocks. The platform overhangs the bearing pillow blocks at the rear to allow for attachment to the actuator, to form a Class-1 lever. In some embodiments, the actuator 260 is a linear actuator 260, which extends and retracts to pivot the platform through a range of motion of approximately 90 degrees.

Attention is now directed to FIGS. 3A-3B and 3C, showing alternative embodiments, respectively, of a playing surface used in a sport simulation system, in accordance with some embodiments.

As shown in FIGS. 3A-3B, a playing surface 104 is a rigid playing surface 104 (i.e., a surface that is incapable of contouring) that is tilt-able using one or more actuators 305. In some embodiments rigid playing surface 104 includes a top surface (e.g., including a surface texture or material that simulates a putting green), floor panels (e.g., ¼ inch aluminum floor panels that are beneath the top surface, one or more module deck segments (e.g., modular deck segments 301, FIG. 3B, that may be welded aluminum C-channel with cross-bracing), an i-beam platform (e.g., i-beam platform 303 that is bolted together to provide floor strength and a stiff/rigid support unit). In some embodiments, each i-beam is bolted together to form the i-beam platform.

In some embodiments, rigid playing surface 104 further includes one or more actuators (e.g., actuators 305) that are located at specific positions relative to the i-beam platform 303 in order to tilt the playing surface 104. In embodiments in which the rigid playing surface 104 is included in a golf simulation system, by tilting the playing surface 104, many various breaking putts are possible. Moreover, by requiring only a limited number of actuators 305 to produce sufficient tilt, cost-savings is also achieved over embodiments in which numerous actuators are utilized (e.g., as discussed below in reference to FIG. 3C).

FIG. 3C illustrates an alternative embodiment to the playing surface 104 discussed above with respect to FIGS. 3A-3B, in which playing surface 104 is contour-able. In these alternative embodiments, the playing surface 104 includes four distinct layers. A first layer is a surface modifying layer 308 that includes a plurality of surface modification elements 106. A second layer is a sub-floor structure 306. A third layer is a compliance layer 304 that is used to ensure that the playing surface 104 feels like a real-life green while a participant is walking on the playing surface 104. A fourth layer is a top surface 302. In some embodiments, by modifying positions (e.g., a first lowered position and a second raised position for each of the elements 106) of the surface modification elements 106, the top surface 302 is contoured to match topographies of real-life greens (as discussed throughout). In some embodiments, the elements 106 are actuators that are configured to raise or lower to one or more predefined positions. In some embodiments, each actuator 106 is configured to position at a lowered position and a raised position. In other embodiments, each actuator 106 is configured to position at a lowered position and at a number of raised positions (e.g., 10 inches, 14 inches, 16 inches, etc.).

In some embodiments, a tracking/guidance system (e.g., tracking/guidance system 102) projects images/graphics onto the top surface 302. For example, the system 102 receives instructions from a system controller (e.g., system controller 114) to render representations of concentric targets 310 (could be of any predetermined shape and these are used to provide scores to participants during a game), best path putting guidance 312 (discussed in more detail below in reference to FIGS. 15A-15K), and pendulum putting guidance 312 (discussed in more detail below in reference to FIGS. 15A-15K).

Figure 4:
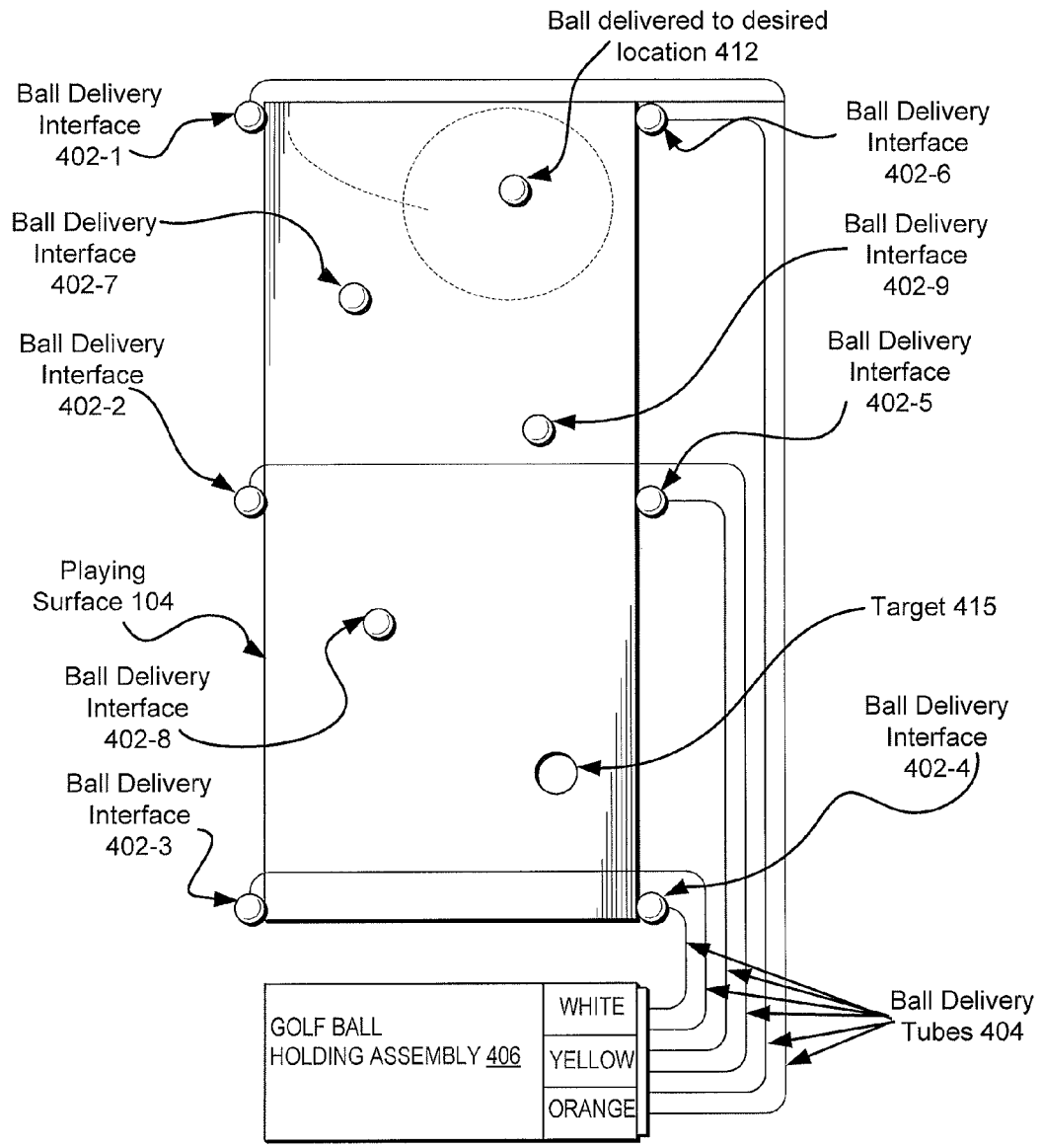
FIG. 4 is a side cross-sectional view of a dynamic target used in a sport simulation system, in accordance with some embodiments.

FIG. 4 is a functional block diagram of a ball delivery system (e.g., ball delivery system 108, FIG. 1A), in accordance with some embodiments. In some embodiments, the ball management system is important so players are not continuously fetching golf balls on a playing surface (e.g., playing surface 104). In some embodiments, the ball delivery system is integral to (i.e., coupled with) the playing surface 104 (or one or more components thereof, such as a deck assembly supporting the playing surface 104) and interfaces with the playing surface 104 at many locations (e.g., ball delivery interface 402-1, ball delivery interface 402-2, ball delivery interface 402-3, ball delivery interface 402-4, ball delivery interface 402-5, ball delivery interface 402-6, ball delivery interface 402-7, ball delivery interface 402-8, and ball delivery interface 402-9). In some embodiments, the camera system supports the ball management system by providing images during play to the control system. In some embodiments, the control system interfaces with the ball management system over the various modes of the game. In some embodiments, ball delivery mechanisms are integrated with the deck assembly and some embodiments have them located at 9 locations around the deck (e.g., ball delivery interfaces 402-1 to 402-9). In some embodiments, the ball delivery mechanisms deliver golf balls to the deck surface at predefined locations location. For example, the ball delivery system has the capability to place the balls on the green surface based upon a final shot (e.g., an approach shot) on a VR simulator. In some embodiments, the ball delivery mechanisms are configured to deliver multiple balls for multiple putts during a practice putting mode at a sport simulation system. During the practice putting mode, system controller 114 (FIG. 1A) collects camera images (e.g., as sent to the system controller 114 by the cameras 103, FIG. 1A) during practice putts and determines when to deliver a next ball to the player on the playing surface 104 at the same location as a previous practice putt.

In some embodiments, rotating wheels are configured to operate at various calibrated speeds and will deliver balls to the playing surface 104 over varying distances required for the balls to reach their intended locations. In some embodiments, the ball delivery mechanism is mounted to a rotating stage to enable various angles of trajectory. In some embodiments, the system controller 114 determines what mechanism is used based upon the gaming mode, and a required ball location on the green.

In some embodiments, a calibrated spring delivery device is utilized in which spring compression is adjusted based upon distance of delivery required for a respective ball. This type of mechanism also interfaces with a rotation stage to cover various angles required over the playing surface 104. In some embodiments, balls are delivered to the mechanism via a vacuum tubing system (e.g., ball delivery tubes 404). For example, during a 6-pack challenge game, the delivery system delivers different color balls to the playing surface 104 (e.g., the different color balls are held in a golf ball holding assembly 406).

In some embodiments, the holding assembly 406 is divided into three different holding areas for each ball color. In some embodiments, the system controller 114 releases a ball of a desired color (e.g., based on a particular round of a 6-pack challenge game) via a simple mechanism so that the vacuum tubing system can deliver it to the appropriate delivery mechanism. In some embodiments, the simple mechanism for releasing balls from holding assembly 406 and for selecting the proper vacuum tubing for the correct delivery mechanism channel is all done via shutter actuators at specific locations. In some embodiments, the actuations are controlled by system controller 114. In some embodiments, the system controller 114 controls ball management and delivery processes by using cameras to track current ball locations (e.g., cameras 103, FIG. 1A) and identifying a mode of a game being played.

In some embodiments, the playing surface 104 includes multiple hole locations (or targets) depending upon green configuration or mode of a game being played (e.g., target 415). In some embodiments, there are two aspects of ball retrieval from the playing surface 104. The first includes using a hole (e.g., target 415) to deliver balls back to the golf ball holding assembly 406. The second is using actuators (e.g., surface modification elements (FIG. 1A) to change the playing surface 104 so that balls are funneled into the hole or to a back edge of the playing surface 104 to channel golf balls through vacuum tubing to the holding assembly 406 (e.g., using one or more of the ball delivery tubes 404).

Figure 5:
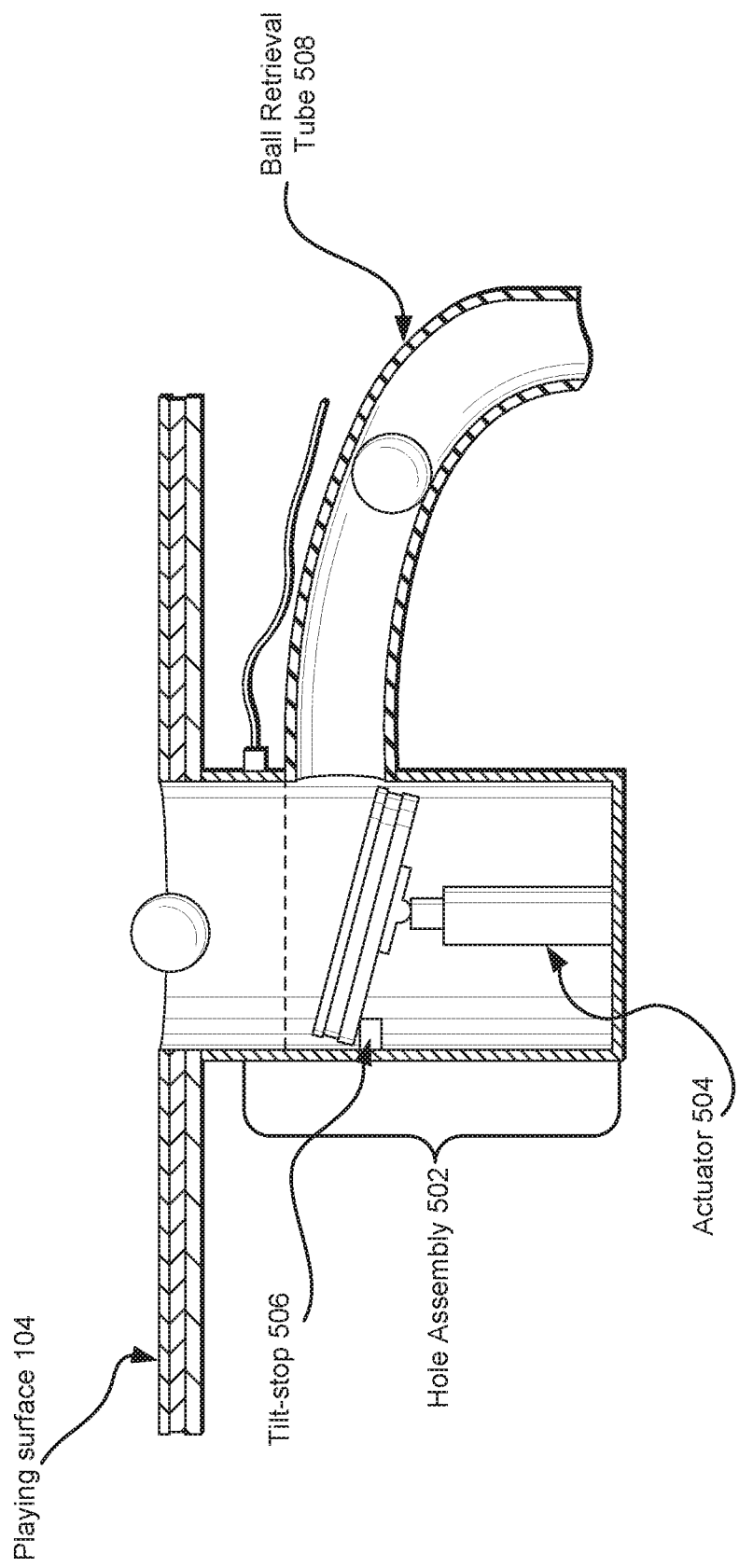
FIG. 5 is a functional block diagram of a ball delivery system, in accordance with some embodiments.

FIG. 5 is a side cross-sectional view of a dynamic target used in a sport simulation system, in accordance with some embodiments. As shown in FIG. 5, an exemplary hole assembly 502 is integral to a playing surface 104 (or a constituent component thereof, such as deck assembly supporting the playing surface 104). In some embodiments, 5 holes are provided on the deck assembly. In some embodiments, one of the holes is larger for use during some of the kid's games. In some embodiments, the hole assembly 502 is first made of a hole can assembly that provides structure and interfaces with other components of the hole assembly 502. In some embodiments, the hole can interfaces structurally to a subfloor structure (FIG. 3C) and holes are allowed to move up and down with a deck assembly that supports the playing surface 104. Depending upon the gaming mode of the sport simulation system, only have one hole will be used at a time and a system controller (e.g., system controller 114, FIG. 1C) identifies a proper hole location and controls system components for retrieving balls from the playing surface 104. In some embodiments, a linear actuator (e.g., actuator 504) is mounted in the hole can. The linear actuator controls the height of the hole.

In some embodiments, each hole is configured to have two or more height positions. A first position is higher and is used for 18 hole traditional golf game, e.g., with 18 with a Bullet Mode (this height position is shown with dotted lines in FIG. 5). This allows the players the ability to take their ball out of the hole after making their putt prior to moving off the green and onto the next fairway on a VR simulator. A second position is a lower linear actuator position. This position is to allow the ball retrieval aspect to be used via vacuum tubing to a golf ball holding assembly (discussed above in reference to FIG. 4). The second position is also used for Practice Makes Perfect mode, where multiple putts are made from the same spot. Based upon the mode of the system, the system controller 114 controls the actuator 504 and sets height of the hole. In some embodiments, modules of system controller 114 drive actuator 504 to a desired height based upon feedback from a position sensor that is integral to an assembly for the actuator 504. In some embodiments, a tilt stop (e.g., tilt-stop 506, FIG. 5) is provided that allows the hole to tip balls towards ball retrieval tubing access points (discussed above in reference to FIG. 4). This tilt is required to use gravity to help keep multiple balls heading towards the direction of ball retrieval tubing (e.g., ball retrieval tube 508).

In some embodiments, a bottom of the hole is constructed from the same material as the deck assembly. In some embodiments, the system has a subfloor, compliance layer, and green surface (discussed above in reference to FIG. 3C). Some embodiments require the material that comprises the hole to be the same as the playing surface 104, so that it is uniform on the playing surface 104 when that specific hole is not being used for a particular game. In some embodiments, a ball joint is required at the top of the actuator 504 that interfaces with the subfloor to enable the tipping action required to deliver balls. In some embodiments, a ball trigger sensor that is mounted to the hole assembly 502. In some embodiments, the ball trigger sensor is read by the system controller 114 and it sends a signal every time a ball passes by, a player makes a putt, or the playing surface 104 is funneling balls into the hole. The sensor enables the system controller 114 to turn on the vacuum capability, so that balls reliably get returned to a holding assembly (e.g., holding assembly 406, FIG. 4) and do not get trapped in the tubing. In an 18-hole traditional golf mode, the sensor is used to confirm a made putt and to update the scoreboard and trigger audio feedback. In some embodiments, the ball retrieval tube 508 is used to deliver balls from the holes to the golf ball holding assembly (5). The vacuum system ensures that a golf ball does not get stuck in the system so a game does not get halted or delayed.

In some embodiments, one way to retrieve golf balls off of playing surface 104 is to use surface modification elements (e.g., actuators 106, FIG. 1A) to funnel them into the hole being used. In some embodiments, the system is designed to use the hole to retrieve the balls and to have a channel at one end of the deck assembly at the edge to be used to deliver the balls back to the holding assembly. In some embodiments, the end channel is at the end of the deck that will typically have the holes being used for the various modes the most often. The following example is in the practice makes perfect mode where a player will have 5, 10, or 15 putts from the same location on the green. With the use of the cameras 103 (FIG. 1A), the system controller 114 determines when a player is done putting the allocated number of balls. The cameras 103 also update scores as putting occurs and will confirm putts that were made with the hole sensor. When all putts are completed, the system controller 114 utilizes surface modification elements 106 of playing surface 104 so that balls are funneled into the hole being used. In some embodiments, one or more surface modification elements 106 (e.g., one or more linear actuators) are configured to lower the playing surface 104 to provide this funnel.

Figure 6A:
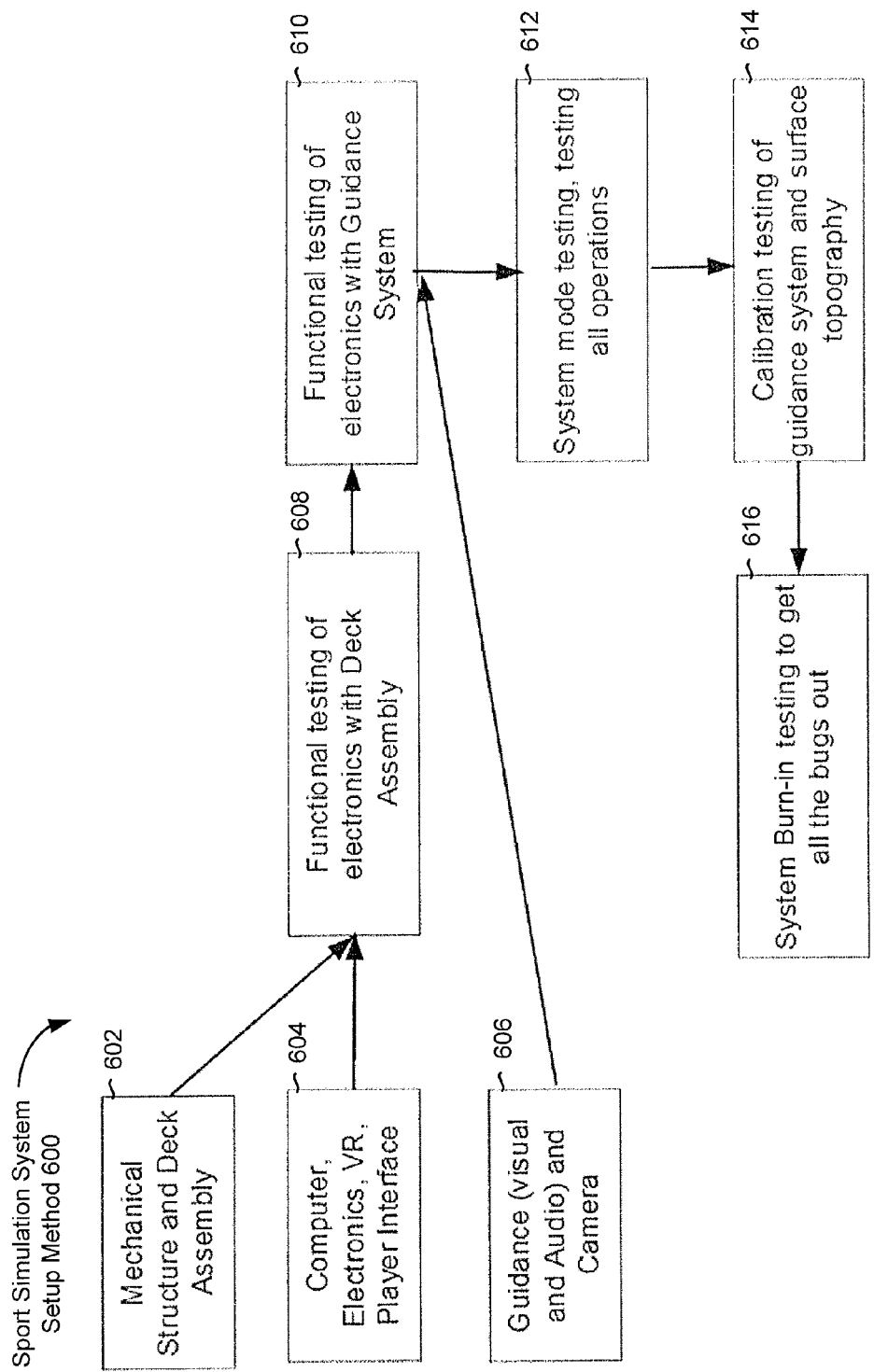
FIGS. 6A and 6B are flowcharts showing assembly, testing, and calibration of a sport simulation system, in accordance with some embodiments.
Figure 6B:
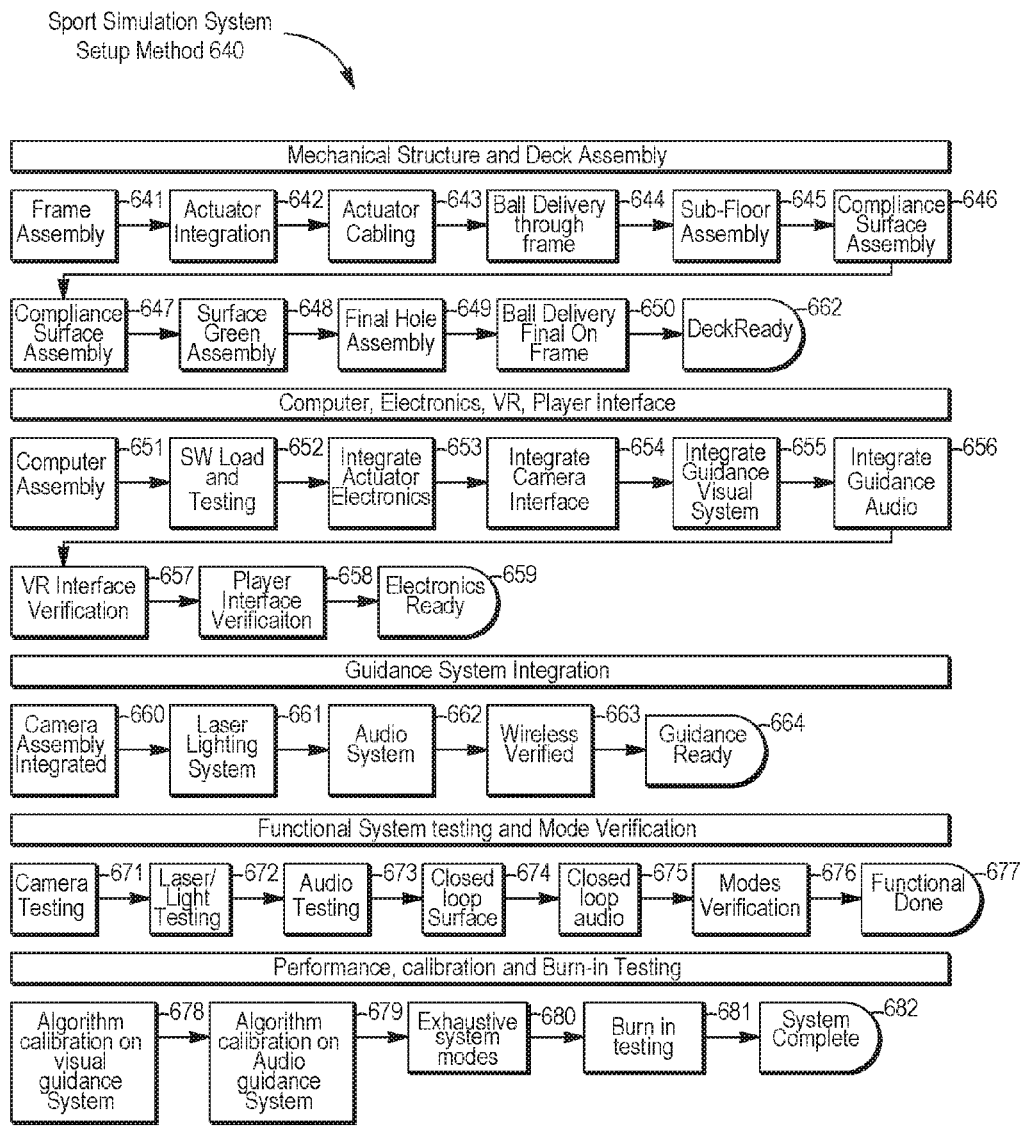

FIGS. 6A and 6B are flowcharts showing assembly, testing, and calibration of a sport simulation system, in accordance with some embodiments. In some embodiments, the system includes three primary sub-systems, including the mechanical structure and deck assembly (as shown and described in relation to FIGS. 1B, 2A-3B above), the computer, electronics, virtual-reality, and player interface systems (as shown and described above in relation to FIGS. 1A-1C above, and 6B onward, below), and the guidance and camera systems (as shown and described in relation to FIGS. 1A-1C above, and 6B onward, below). The setup method 600 initially includes manufacturing, assembling, and/or setting-up and connecting the mechanical structure and deck assembly at 602, the computer, electronics, virtual-reality, and player interface systems at 604, and the and the guidance and camera systems at 606. The mechanical structure and deck assembly, and the computer, electronics, virtual-reality, and player interface system sub-systems are then tested to confirm that they are operating and interacting correctly at 608. The guidance and camera systems are then tested to confirm that they are operating and interacting correctly at 610. The various different operational modes and games, as well as all other operations are then tested at 612. In other embodiments, the testing is conducted in a different order.

In some embodiments, each time that the system is initiated, such as once a day or before each paying session or game, the system is calibrated at 614. In some embodiments, calibration includes calibration of the guidance system and/or the surface topography of the playing surface. In some embodiments, surface topography calibration is achieved by optically scanning the playing surface using a laser or infrared scanner and if the playing surface is not level, sending commands to the actuators to flatten the playing surface or otherwise position it in an initial state. In some embodiments, guidance system calibration is achieved by illuminating the playing surface using a calibration template (e.g., a grid or one or more straight lines) and then detecting (e.g., using the video camera system and appropriate identification software) whether the illuminated calibration template is properly aligned and/or displayed on the surface.

In some embodiments, the system then goes through a burn-in test at 616 to ensure that all bugs in the operation are identified and addressed. In some embodiments, the burn-in test comprises running the software through all possible operations, in all possible sequences, repeating such testing multiple times, and/or logging any faults or errors detected.

FIG. 6B is a more detailed flow chart of a sport simulation system setup method 640. Initially, the mechanical structure and deck is provided by: manufacturing or providing the frame assembly (described above) at 641; integrating one or more actuators (described above) to the frame assembly at 642; connecting cabling (in the case of electrically powered actuators) or pipes/tubing (in the case of hydraulic or pneumatic actuators) at 643; the ball delivery system (e.g., as described in FIGS. 4 and 5) is connected to the frame assembly at 644; an optional sub-floor (see FIG. 1B) assembly is connected above of the actuators at 645; the optional compliance surface or layer (see FIG. 1B) is then provided above the sub-floor (if one exists) at 646/647; the playing surface or green (see FIG. 1B) (if one exists) is then connected above the compliance surface or layer (if one exists) at 648; the hole assembly is finalized if necessary at 649 (e.g., by ensuring that the hole cup is aligned with the top of the playing surface); the ball delivery system is finalized if necessary at 650; and after which the deck assembly is ready at 662.

The computer, electronics, virtual reality, and player interface systems are provided by: manufacturing or providing the computer assembly (described above) at 651; loading and testing the requisite software at 652; integrating, connecting, and/or testing or verifying the actuator electronics (e.g., any required relays, transformers; valves etc.) at 653; integrating, connecting, and/or testing or verifying the camera interface at 654; integrating, connecting, and/or testing or verifying the guidance and visual systems at 655; integrating, connecting, and/or testing or verifying the guidance audio system at 656; integrating, connecting, and/or testing or verifying the virtual reality interface at 657; integrating, connecting, and/or testing or verifying the payer interface at 658; and after which the computer, electronics, virtual reality, and player interface systems are ready at 659.

The computer, electronics, virtual reality, and player interface systems are provided by: manufacturing or providing the computer assembly (described above) at 651; loading and testing the requisite software at 652; integrating, connecting, and/or testing or verifying the actuator electronics (e.g., any required relays, transformers; valves etc.) at 653; integrating, connecting, and/or testing or verifying the camera interface at 654; integrating, connecting, and/or testing or verifying the guidance and visual systems at 655; integrating, connecting, and/or testing or verifying the guidance audio system at 656; integrating, connecting, and/or testing or verifying the virtual reality interface at 657; integrating, connecting, and/or testing or verifying the payer interface at 658; and after which the computer, electronics, virtual reality, and player interface systems are ready at 659.

The guidance system integration is provided by: integrating, connecting, and/or testing or verifying the camera assembly with the other systems, like the deck assembly, at 650; integrating, connecting, and/or testing or verifying the light and/or laser system at 661; integrating, connecting, and/or testing or verifying the audio system at 662; integrating, connecting, and/or testing or verifying the wireless communications systems (e.g., wifi routers, RFID chips in balls and accompanying sensors, etc.) at 663; and after which the guidance system is ready at 664.

The system is then tested to ensure that it is functional and all modes of operation are verified by: testing and/or verifying that the computer system works with and can control the deck assembly at 665; testing and/or verifying that all cabling is connected at 666; testing and/or verifying that all actuators are functional at 667; testing and/or verifying that the hole actuator functions at 668; testing and/or verifying that the ball delivery system functions at 669; aligning the camera system at 670; aligning, testing and/or verifying the camera system at 671; testing and/or verifying the lighting and/or laser systems at 672; testing and/or verifying audio system at 673; testing and/or verifying the feedback (or loop) system for the variable topography surface at 674; testing, verifying, and/or eliminating the feedback (or loop) system for the audio system at 675; testing and/or verifying all operational modes of the system at 676; and after which the functions of the system are ready at 677.

Finally, the system's performance is determined, calibration is performed, and burn-in testing is performed by: calibrating the algorithm for the visual guidance system at 678; calibrating the algorithm for the audio guidance system at 679; performing exhaustive mode testing of the system at 680; performing burin-in testing at 681; and after which the entire system is ready for operation at 682.

It should be appreciated that any of the above steps described in relation to FIG. 6B may be eliminated, or replaced by other steps. Also, any of these steps may be performed in any appropriate order.

In some embodiments, a sport simulation system (e.g., sport simulation system 100) recreates putting greens from actual golf courses. Other than the putting part of the game, a traditional virtual reality simulator golf game is provided. Unlike, traditional virtual reality simulator golf games, identical (or similar) topography is provided for the greens. In some embodiments, traditional scoring is used: to par or match play against others (in-person or online). In other embodiments, skills challenges/big break situational games can be played on the system 100. In other embodiments, only par 3s or approach shots from a variety of different/famous holes may be played. In yet other embodiments, duck hunt/darts using punch shots may be played. In other embodiments, long and straight drive contests; accuracy with iron contests may be played, or even putting-only "legends" games. Some embodiments, allow for the recreation of the top famous putts of all time (Jack at 17 Augusta, Tiger at 18 Torrey, Leonard at Brookline). In yet other embodiments, six-ball challenge, with "skeeball" scoring may be played. Some embodiments allow for a kids-friendly mode where the topography changes to funnel the ball towards the hole. Other embodiments, allow for simultaneous candy crush and miniature golf to be played. Even other embodiments allow for 15-inch or other predetermined sizes of holes for easier scoring.

In some embodiments, these games provide positive feedback loops to drive engagement; allow players to level up their games, i.e., tracks long-term improvement; provide modern-handicapping (e.g., using artificial intelligence to adjust game play to each user's skill sets, allowing players of varying skill levels to play together competitively and at same time/rate).

In addition to game play, other modes of operation may be played, e.g., 18 hole multiple players—70-80 different courses; regular golf with putting assistance; regular golf without putting assistance; non-golfer challenge game (using concentric circles); 9 hole multiple players—70-80 different courses; regular golf with putting assistance; regular golf without putting assistance; non-golfer challenge game (using concentric circles); 9 hole practice putting—multiple tries from one spot with ball return.

One exemplary game is "practice makes perfect" and can be played using the systems and methods described herein.

Figure 7:
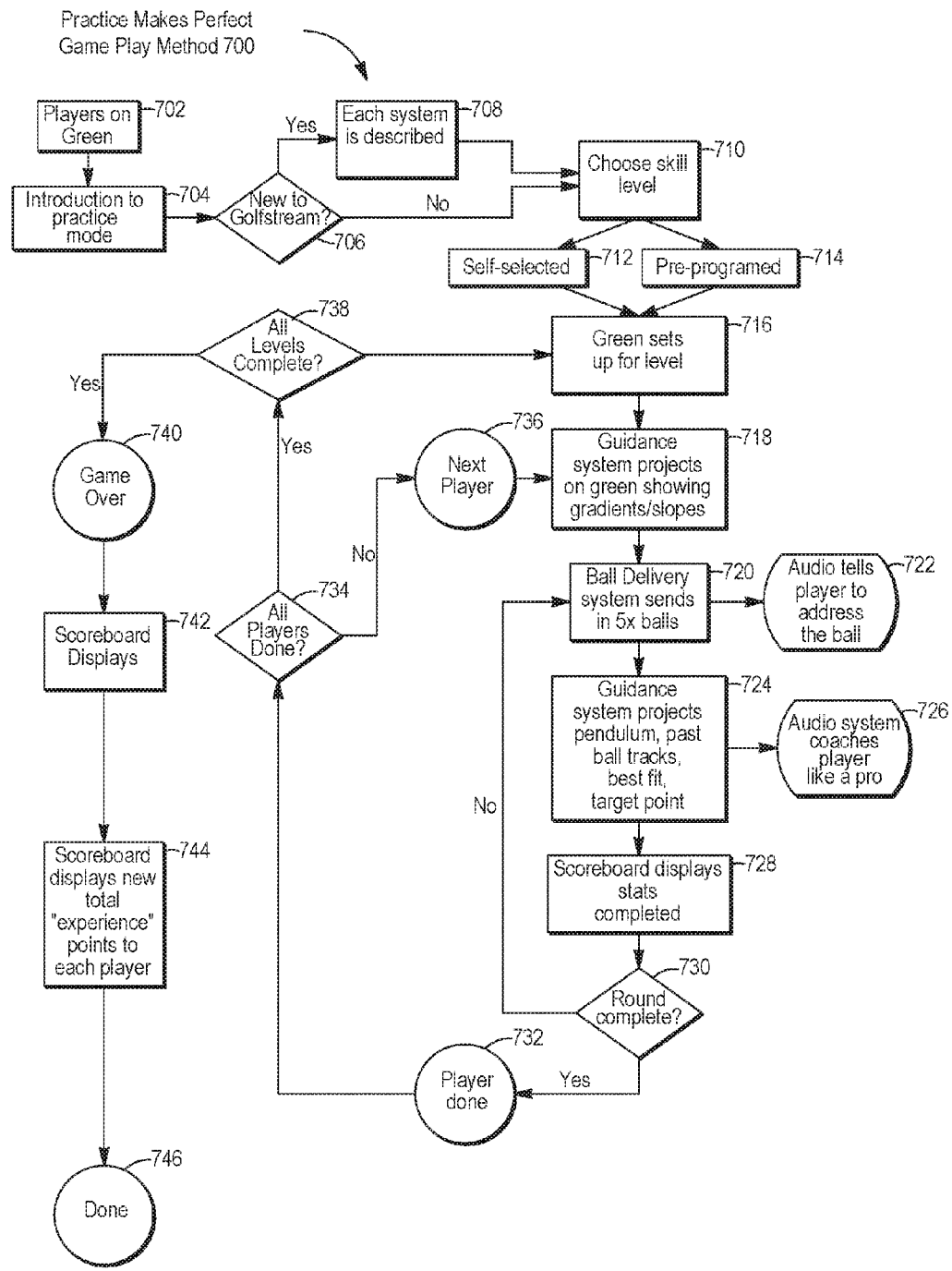
FIG. 7 is a flowchart of a method of managing a "practice makes perfect" game at a sport simulation system, in accordance with some embodiments.

FIG. 7 is a flowchart of a method of managing a "practice makes perfect" game at a sport simulation system, in accordance with some embodiments. Practice Makes Perfect is a game that allows players to (i) get accustomed to the system, and (ii) continuously increase their skill level at putting in general using the system's guidance and teaching abilities. The new combination of technologies include the guidance system, the undulating green, the scoring, game-flow, and sound enhancements. The players skill at putting will increase due to the coaching the system will do, which includes displaying and reviewing gradients of the green, planning the direction of the putt to maximize the likelihood that the putt is made, guidance on how far back to swing the putter for optimal velocity towards the hole, and continuous feedback of how the player is doing, including instant replay and commentaries on what the player did right or wrong during each putt. Players may use Practice Makes Perfect on their own, but ideally will play with a group to enhance team spirit and positive reinforcement.

In some embodiments, a method 700 is performed by an electronic device (e.g., system controller 114, FIG. 1A) and/or one or more components of the electronic device (e.g., an I/O subsystem, an operating system, etc.). In some embodiments, the method 700 is governed by instructions that are stored in a non-transitory computer-readable storage medium and that are executed by one or more processors of a device, such as the one or more processors 202-1 of a management module 114-1 (FIG. 1C). For ease of explanation, the following description of method 700 is performed by the system controller 114 (also referred to simply as the device). In some embodiments, with reference to FIG. 1C, the operations of method 700 are performed by or use, at least in part, a surface modification module (e.g., surface modification module 222), a ball color detection module (e.g., ball color detection module 224), a ball path determining module (e.g., ball path determining module 226), a graphics rendering module (e.g., graphics rendering module 228), a game selection module (e.g., game selection module 230), a ball delivery module (e.g., ball delivery module 232), a ball retrieval module (e.g., ball retrieval module 234), user-specific putting data (e.g., user-specific putting data 218), and a leaderboard updating module (e.g., leaderboard updating module 220). Some operations in method 700 are, optionally, combined and/or the order of some operations is, optionally, changed.

In some embodiments, a practice makes perfect game play method 700 initiates when the players are on the green at 702. In some embodiments, the game can be played with anywhere from 1-10 players, while in preferred embodiments, the game can be played with 8 or fewer players. In some embodiments, once the players walk onto the dynamic green, they can touch a player interface control screen to initiate game play. In some embodiments, the first part of the game is designed to allow players new to the system to get comfortable with the variables of the game, including the physical undulating green, the laser guidance system, and the unique synthesis of the mechanical, electrical, and audio systems as applied to golf. In some embodiments, the players are first presented (visually and/or audibly) with an introduction to a practice mode at 704. If a player is new to the system and/or the game, i.e., has never played the game before, (706—Yes), the game and the system is described to the player (again, visually and/or audibly) at 708. If a player is not new to the system and/or the game, i.e., has played the game before, (706—No), or after the game and the system is described to the player at 708, the player chooses their skill level at 710. In some embodiments, if the players are all seasoned players, they may choose to skip this introduction.

In some embodiments, the player selects their skill level at 712, while in other embodiments, the player's skill level is stored on the system from prior games and is recalled at 714. For example, the player interface control screen allows the player to select their skill level, either manually or the game system can determine the skill level based on past performance by each player, according to the system's elaborate and extensive database of individual player's history and statistics. In some embodiment, the game is "progressive", which means that as the player's abilities improve, both during a game, and among multiple sessions, they are challenged with increasingly difficult putts so that their level of play improves overall.

In some embodiments, the green will set itself up for the game, according to the current level (see outline below for a detailed description of each level). In other words, the system sets up the green for the first level in the game at 716. In some embodiments, the green is also setup for a particular player's skill level. In some embodiments, this includes changing the topography of the playing surface, selecting the difficulty of the challenges in the game, etc.

In some embodiments, the guidance system then projects onto the playing surface or green the gradients or slopes to visually depict the topography of the green at 718. In some embodiments, this is based on the particular skill level of the particular player. In some embodiments, the guidance system is enabled with an emphasis on a pendulum guidance mechanism that displays on the green with a laser or projector gradients and past ball tracks. For example, the guidance system displays on the green using a laser or projector, the length and speed of the putting motion via a "pendulum" animation. In some embodiments, it also displays the best fit path to the hole and a target point where to hit the ball.

In some embodiments, the ball delivery system delivers to the player one or more balls 720. In other embodiments, the player or a caddy selects and places the balls manually on the green. In some embodiments, the player receives audible instructions of where and/or how to place and address the ball with their golf club (typically a putter). At 720. In some embodiments, the guidance system projects one or more visual guides onto the playing surface at 724. For example, displaying a moving pendulum to show the player the proposed putting stroke and speed; prior puts ball tracks (i.e., the lines or loci that prior balls took); a best fit line (i.e., an ideal line that the ball should follow to be sunk in the hole); a target of one or more concentric rings around the hole; a marker showing a line where the player should swing back their club to and another marker showing a line where they should follow the club through to; etc. In some embodiments, the audio system also coaches the player on how to sink the put. In some embodiments, the player does not receive any audio assistance if they have a high skill level.

Once the player has made their put towards the hole, a sensor registers whether the player's ball was received in the hole. In some embodiments, another sensor (e.g., a ceiling mounted camera and associated hardware and software) determines whether the ball stopped within one of the concentric circles surrounding the hole. In some embodiments, the highest point is awarded if the ball was sunk in the hole, the next highest points if it stops close to the hole; and lower points the further away from the hole that the ball stopped. The score board then (or constantly, i.e., in real time) displays the statistics including the player's score and skill level on a score- or leader-board at 728. In some embodiments, after each additional balls (e.g., 5 balls) are delivered up to the maximum for each skill level. For example for Level 1: Training mode to learn about "pendulum" putting; the green surface is flat and all putts are straight to the hole; a short putt is provided with 5 balls; a medium putt, 10 balls; and a long putt, 15 balls.

In some embodiments, the camera/tracking system tracks each shot; shows a replay, if desired; records statistics for each player; and stores them across multiple sessions. In some embodiments, the player then plays his next shot and repeats steps 720-728 until his round is complete (730—Yes) and the player is done at 732.

If all of the players are not done playing (734—No), the next player takes their turn at 736 and steps 718-734 are repeated until all players in that group have completed their puts (734—Yes).

For example, once the first player has completed all the putts for Level 1, play will proceed to the next player until all players have completed Level 1; after all players have completed Level 1, the game will proceed to the next level. In some embodiments, a Klaxxon (or "red alert siren") will sound for all players to exit the green at the end of a level, and once they have left the green, the green will change shape for the next level. In other embodiments, the green changes while the users are standing on it. Continuing with the example, the emphasis of Level 2 is to learn about the "Target Point," or the best place for the putter to strike the ball. The skill level is increased by having the level start with a medium-length shot, progressing to long shots, and finally a mild gradient is introduced to the green. In other words, Level 2: Training to learn about "Target Point"; a straight shot, medium length, 5 balls; a straight shot, long length, 10 balls; end of the green is raised or lowered to create a gradient, 15 balls. Continuing with the example, once Level 2 is complete, the play proceeds to Level 3. In Level 3 the green is banked and the emphasis is on the "Best Fit Line," which shows the path the ball should travel to the hole. In other words, for Level 3: Banked Surface, Training to learn how to use the "Best Fit Line"; short putt, 5 balls; medium putt, 10 balls; and long putt, 15 balls. In this example, Level 4 is the final level and concentrates on using all the skills learned on more advanced shots, which include multiple peaks and valleys on the green and putts of varying lengths. Here, Level 4: Peaks and Valleys, utilizing all skills learned; 5 balls; followed by 10 balls; followed by 15 balls.

If there are further levels in the game to play (738—No), then the green is set for that next level in the game at 716 (and in some embodiments the player's skill level), and steps 716-738 are completed until all levels have been completed by all players (738—Yes). Once the game has been completed at 740, the score- or leader-board displays the final scores (and in some embodiments other statistics, like time spent per put, etc.) at 742. In some embodiments, the score- or leader-board (with accompanying audio) displays the winner, e.g., displaying the winner's avatar, and everyone's final score. In some embodiments, the score- or leader-board displays the total "experience" points (and/or incentives like, for example, an incentive to play another round to get bonus points) that the player has accumulated while playing on the system at 744. In some embodiments, the "experience" score or points are used to handicap the user for future games, i.e., to set the user's skill level. In some embodiments, this "experience" score is similar to a handicap in regular golf. In some embodiments, the "experience" score also takes into account scores from games played on other remote similar systems (e.g., at other systems located in other cities etc.). The practice make perfect game is then complete at 746.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein.

Figure 8:
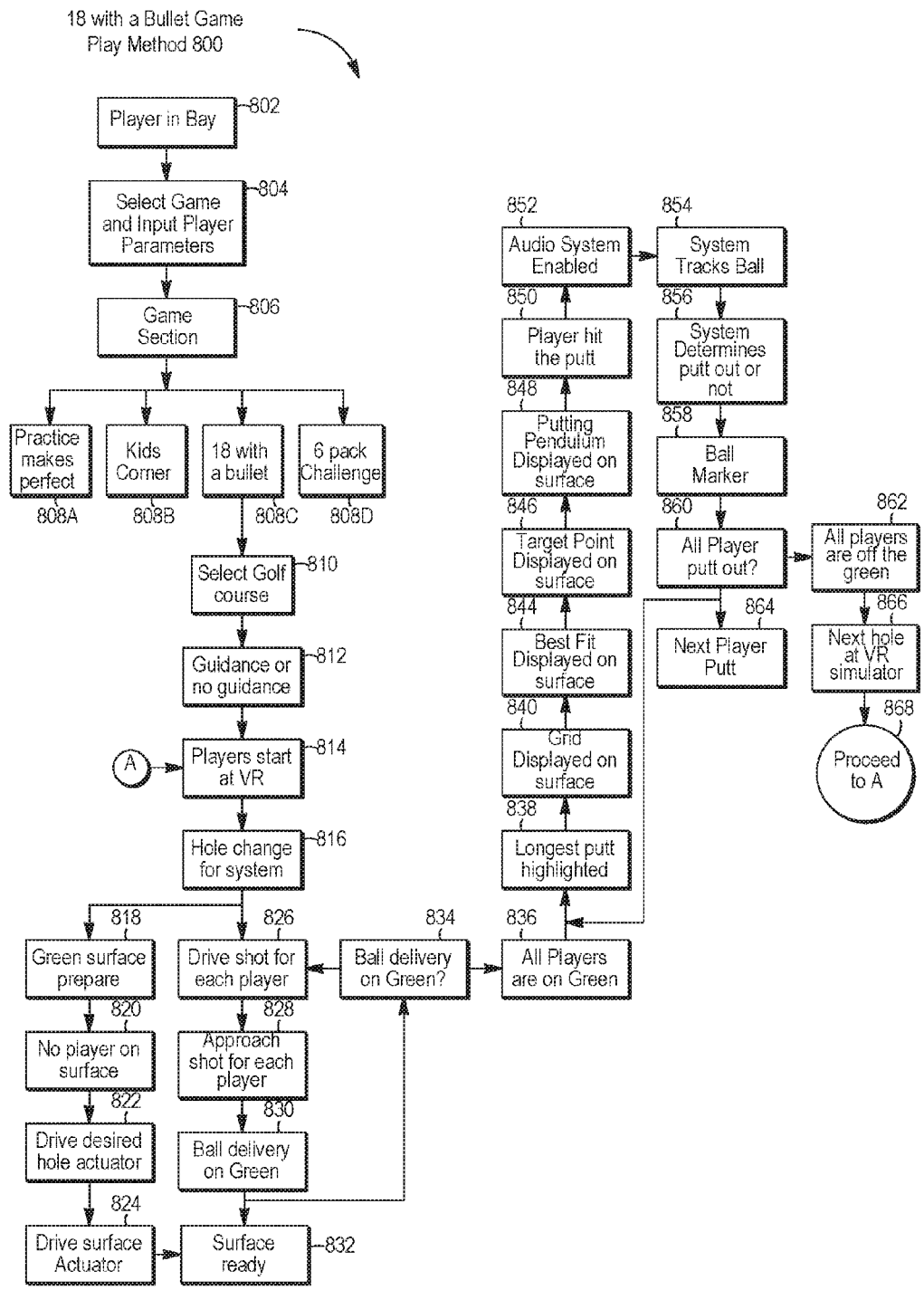
FIG. 8 is a flowchart of a method of managing a round of golf at a sport simulation system, in accordance with some embodiments.

Attention is now directed to FIG. 8, illustrating another game available at the sport simulation system 100. More specifically, FIG. 8 is a flowchart of a method of managing a round of golf at a sport simulation system, in accordance with some embodiments.

In some embodiments, an 18-with-a-bullet game play method 800 is performed by an electronic device (e.g., system controller 114, FIG. 1A) and/or one or more components of the electronic device (e.g., an I/O subsystem, an operating system, etc.). In some embodiments, the method 800 is governed by instructions that are stored in a non-transitory computer-readable storage medium and that are executed by one or more processors of a device, such as the one or more processors 202-1 of a management module 114-1 (FIG. 1C). For ease of explanation, the following description of method 800 is performed by the system controller 114 (also referred to simply as the device). In some embodiments, with reference to FIG. 1C, the operations of method 800 are performed by or use, at least in part, a surface modification module (e.g., surface modification module 222), a ball color detection module (e.g., ball color detection module 224), a ball path determining module (e.g., ball path determining module 226), a graphics rendering module (e.g., graphics rendering module 228), a game selection module (e.g., game selection module 230), a ball delivery module (e.g., ball delivery module 232), a ball retrieval module (e.g., ball retrieval module 234), user-specific putting data (e.g., user-specific putting data 218), and a leaderboard updating module (e.g., leaderboard updating module 220). Some operations in method 800 are, optionally, combined and/or the order of some operations is, optionally, changed.

In some embodiments, the method 800 beings when a set of players from 1-8 walk to game bay (e.g., to a sport simulation system 100, FIG. 1A) and touch a player interface control screen (802, 804). The player interface control screen allows players to select what type of game they would like to play, order beverages, evaluate their player statistics, or view the golf merchandise and get prizes (806, see exemplary user interfaces provided in FIGS. 13A-13C). In this example, input is received selecting a Traditional Virtual Reality Simulator golf game on an 18 hole course or "18 with a bullet" (808C). Selectable options are also provided for practice makes perfect (808A), kid's corner (808B), and 6-pack challenge (808D). The players are also able to select a course to be played of countless available courses (810) and if they would like putting guidance system enabled or disabled (812). Each player has their golf bag conveniently located in their respective bay and will start to drive at hole 1 on a Virtual Reality (VR) simulator (814).

Each player drives on the VR simulator on fairway number 1. While the players are driving and getting to their green approach shot, a playing surface 104 (FIG. 1A) has been controlled using surface actuators (e.g., surface modification elements 106, FIG. 1A) that are driven based on instructions from a system controller 114 (FIG. 1A) (816-818). In some embodiments, this step does not occur until the system determines there are no players on the green surface (820). Based upon the green surface for hole 1, a control computer (e.g., system controller 114) drives a correct hole actuator for that green and retracts a prior hole (822). In some embodiments, a database associated with the system controller 114 houses green configurations for every available green. Based upon a pre-calibrated position table for the system, the system controller 114 drives surface actuators to correct positions for the green surface using linear position sensors as feedback to confirm accurate location of each actuator (824). Once a player hits an approach shot on the green for the VR simulator, a ball delivery system "drops" a ball on the actual green ready for that player to play. The ball delivery system will deliver the ball where it landed from the approach shot on the VR simulator (as discussed above in reference to FIGS. 4 and 5. The ball is delivered from a possibility of a number of locations around the putting green deck. Based upon where the ball landed on the VR screen the control computer will select the ball delivery number, adjust the speed of rotation, allow a ball to proceed through the mechanism, and then confirm delivery and location with the camera system (830). The approach shot and ball delivery process will occur for all the players, until they all are on the green (834).

The players can now proceed to putt out on the green just as you do on a real golf course green. All the balls for each player are located on the green and the system controller 114 using cameras 103 to determine exactly what ball is associated with what player. The green can support all players on the putting green surface at once, e.g., up to 6, 7, 8, 9, 10, or other number of adults. The system knows the longest ball (838), and in training mode, guidance information is controlled to enable putting training features. The system shines on the first putter based upon the distance to the hole (836). The system controller 114 knows exact topography of the playing surface, ball location, and location of a hole on the playing surface 104 (or other target besides a hole). The target algorithms take this information into account and then control the guidance system. The visual guidance system is a combination of projected images and laser lights. The first "projection on the green is a grid that shows the contour or peaks and valleys of the green to help the player "read" the green to familiarize themselves with why the ball would go certain ways due to surface topography (840). Based upon that grid a guidance system then puts a best fit line on the playing surface 104 and shows a player where the ball would go under an accurate putt given the surface topography (844). The next image from the guidance system is to put an "X" on the surface to identify the target point the player should hit the ball to, taking into account the surface topography, that if hit, would follow the best fit line (846). The final image from the guidance system is to put the pendulum start and finish by the player to help them determine how hard to hit the putt to achieve the putting distance (848). The system will keep track of the results of the putt via ball tracking and keep results as to the success of the putt and provide feedback as to what might of went wrong under a missed putt. The system will calibrate per player the pendulum distance to enhance their ability to make putts based upon the player's typical force. The player will then hit the putt (850) and this will engage the audio system for player input and feedback and the ball tracking system to monitor the putt as it proceeds to the hole (854). Once the player hits the ball, the audio system will cheer and coach the approaching shot (852). All audio and visual putting guidance interaction is via closed loop image processing using the camera system above the green, the visual guidance system, and the audio guidance and feedback system. The system will provide putting tips via the camera system tracking through the entire putt. The control computer will determine on that putt if the player should putt out (856) or put a marker (858) so the next player can putt. The system will determine if that was the last player to putt or not or to move onto the next longest putt (860, 864). This is determined using the camera system and the control computer as the players proceed through the putting process.

When all of the players have putted out on that current green they will proceed off the green surface (862) and back to the VR simulator for the next hole drive and approach shots (866, 868). The system will keep track of each player's drives, approach, and putts and maintain keeping the score and displaying that at the bay display monitor. The VR simulator will transition to the next hole to be prepared for the players to start driving again.

It should be understood that the particular order in which the operations in FIG. 8 have been described is merely exemplary and is not intended to indicate that the described order is the only order in which the operations could be performed. One of ordinary skill in the art would recognize various ways to reorder the operations described herein.

Figure 9A:
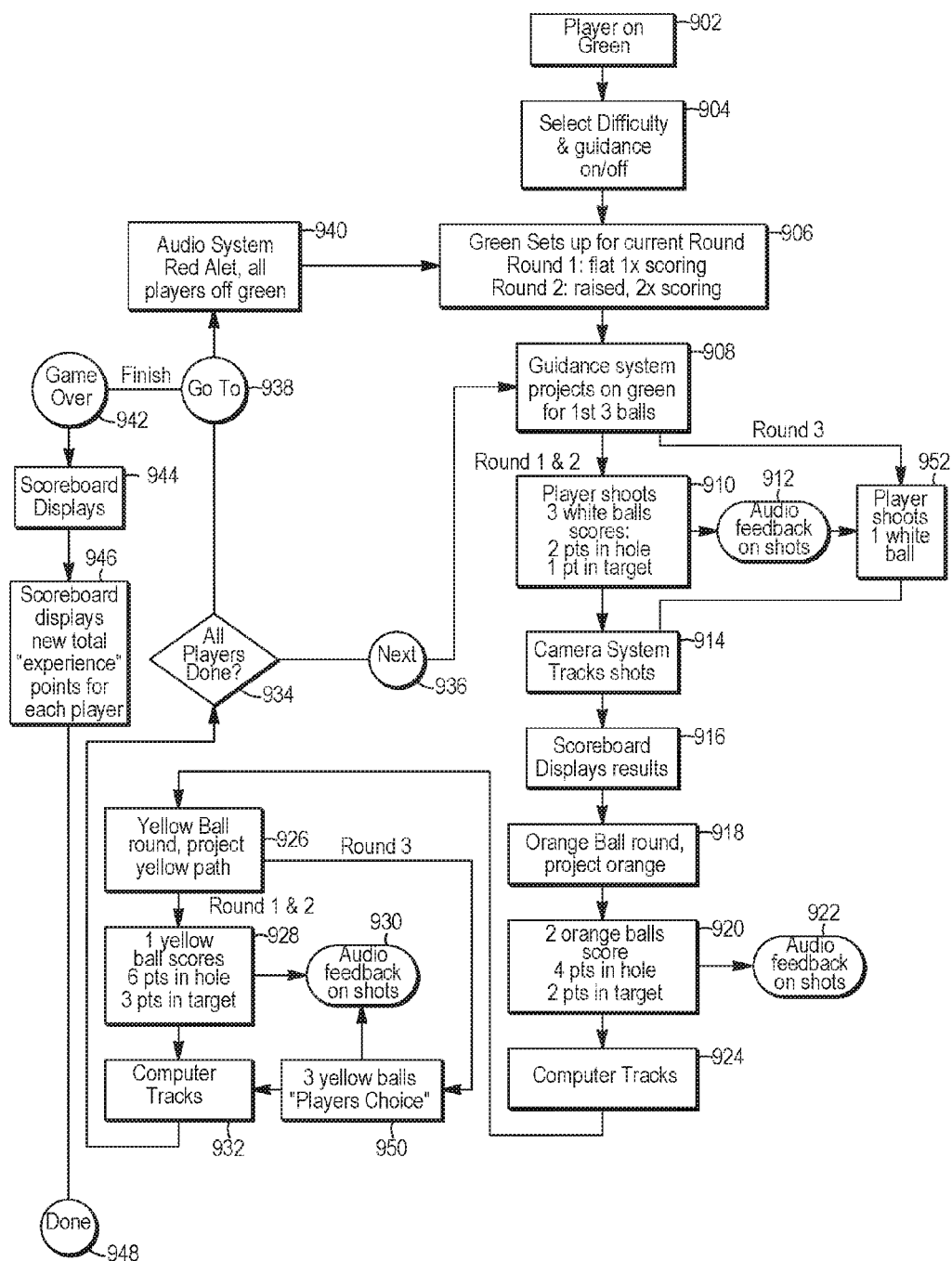
FIGS. 9A-9B are flowcharts of methods of playing a "6-Pack Challenge" game at a sport simulation system, in accordance with some embodiments.

Attention is now directed to FIG. 9A, illustrating another game available at the sport simulation system 100. More specifically, FIG. 9A is a flowchart of a method of managing a 6-pack putting challenge game at a sport simulation system, in accordance with some embodiments.

In some embodiments, a 6-pack putting challenge game play method 900 is performed by an electronic device (e.g., system controller 114, FIG. 1A) and/or one or more components of the electronic device (e.g., an I/O subsystem, an operating system, etc.). In some embodiments, the method 900 is governed by instructions that are stored in a non-transitory computer-readable storage medium and that are executed by one or more processors of a device, such as the one or more processors 202-1 of a management module 114-1 (FIG. 1C). For ease of explanation, the following description of method 900 is performed by the system controller 114 (also referred to simply as the device). In some embodiments, with reference to FIG. 1C, the operations of method 900 are performed by or use, at least in part, a surface modification module (e.g., surface modification module 222), a ball color detection module (e.g., ball color detection module 224), a ball path determining module (e.g., ball path determining module 226), a graphics rendering module (e.g., graphics rendering module 228), a game selection module (e.g., game selection module 230), a ball delivery module (e.g., ball delivery module 232), a ball retrieval module (e.g., ball retrieval module 234), user-specific putting data (e.g., user-specific putting data 218), and a leaderboard updating module (e.g., leaderboard updating module 220). Some operations in method 900 are, optionally, combined and/or the order of some operations is, optionally, changed.

The method 900 begins when a set of players from 1-8 walk onto a playing surface (e.g., playing surface 104, FIG. 1A) at 902 and touch a player interface control screen (e.g., one of the user interfaces shown in FIGS. 13A-13C) at 904. In some embodiments, the player interface control screen allows the player to select what type of game they would like to play (904), order beverages, evaluate their player statistics, view the golf merchandise and get prizes (see FIGS. 13A-13C for exemplary user interfaces), and select whether guidance should be provided or not (904). "6-pack challenge" is a fast-paced golf putting game (e.g., takes 2 players about 10 minutes to complete) with 3 rounds of 6 balls each, and can be selected using the provided user interfaces. In response to a selection of "6-pack challenge," the players are then able to select a difficulty level (Easy, Intermediate, Mission Impossible), a golf course, and if they would like putting guidance to be enabled or disabled (904). Each player has their putter and will take turns putting 6 balls at a time per round, with 3 rounds total. Depending on the round, the green is either flat, raised, or banked (using either a tilting surface, FIGS. 3A-3B, or a deformable surface, FIG. 3C) at 906.

In some embodiments, scoring for each round increases, thereby allowing for an "upset" (i.e. underdog reversal) as late as the final put. The scoring is 1×, 2×, 3× depending on the round. The projectors 105 (FIG. 1A) are instructed (by the system controller 114) to project a circular target around the hole and trajectories for each shot (908), if a player's ball winds up in the target area, they will score one point. If the ball goes in the hole, they will score 2 points. If they don't make the "Sally Line" (Never up, Never in), 1 point is subtracted from their score. The scoring is progressive based on the difficulty of the shot and the difficulty of the playing surface 104 (which changes with each round). Scores for each respective shot are determined at 910. An audio system (e.g., audio system 112, FIG. 1A) moves gameplay along and also conveys positive and negative feedback based on the success of the shots (912). The player may stand on the playing surface 104 and a ball delivery system (e.g., ball delivery system 108, FIG. 1A) delivers a first set of balls for a first part of round 1. The player will now begin to putt (952). The game flow is as follows for Round 1 with flat surface, 1x scoring:

a) First 3 balls (e.g., balls having a white color) are delivered and the shot is a straight line to the hole (e.g., playing surface 104 is configured to be flat) at 910. Depending on guidance settings, a white line is drawn on the green from the ball to the hole (e.g., a best fit line, as discussed in more detail in reference to FIGS. 15A-15K). In some embodiments, cameras 103 (FIG. 1A) track all shots (914) and a leaderboard is updated to display points for each participant (916). Points are provided as follows:
In hole: 2 pts
In target: 1 pt
Never-up Never in: −1 pt b) Next 2 balls (orange) are delivered, the shot is along a more challenging path to the hole, and shots are tracked using cameras 103 (918-922). Depending on the guidance settings, an orange line is drawn on the green from the ball to the hole for the optimal trajectory (e.g., a best fit line having a second color distinct from the first provided white color). Points are provided as follows (920):
In hole: 4 pts
In target: 2 pts
Never-up Never in: −2 pts c) Next 1 ball (yellow) is delivered (926) and a shot is along an even more challenging path to the hole (928, 930, 932). Depending on the guidance settings, a yellow line is drawn on the green from the ball to the hole for the optimal trajectory. Point values are provided as follows
In hole: 6 pts
In target: 3 pts
Never-up Never in: −3 pts The camera/tracking system will track each shot and compute the scoring (932, 924, 914). The score is displayed/updated on a large scoreboard after each shot (8). Once the first player has completed all 6 putts from round one, play will proceed to the next player until all players have completed round 1. After all players have completed round 1, the game will proceed to the next round (938-940). A Klaxxon (or "red alert") will sound for all players to exit the green (940). Once they have, the green will change shape for the next round (906).

The game play is as follows for Round 2 with a Raised Surface, 2× scoring:

a) First 3 balls (white) are delivered and the shot is a straight line to the hole (910). Depending on the guidance settings, a white line is drawn on the green from the ball to the hole.
In hole: 4 pts
In target: 2 pt
Never-up Never in: −2 pt b) Next 2 balls (orange) are delivered and the shot is along a more challenging path to the hole (918-922). Depending on the guidance settings, an orange line is drawn on the green from the ball to the hole for the optimal trajectory.
In hole: 8 pts
In target: 4 pts
Never-up Never in: −4 pts c) Next 1 ball (yellow) is delivered (926) and the shot is along an even more challenging path to the hole (928, 930, 932). Depending on the guidance settings, a yellow line is drawn on the green from the ball to the hole for the optimal trajectory.
In hole: 12 pts
In target: 6 pts
Never-up Never in: −6 pts Once Round 2 is complete, the play proceeds to Round 3. Round 3 has a slight variation at the end as described in the following outline, to keep the game exciting right to the last putt. Round 3 uses a Banked Surface, 3× score, and proceeds as follows:

a) One white ball is delivered and the participant putts one white ball (952). Depending on the guidance settings, a white line is drawn on the green from the ball to the hole (914).
In hole: 6 pts
In target: 3 pts
Never-up Never in: −3 pt b) Next 2 balls (orange) are delivered (920) and the shot is along a more challenging path to the hole (918-922).

Depending on the guidance settings, an orange line is drawn on the green from the ball to the hole for the optimal trajectory.

In hole: 12 pts
In target: 6 pts
Never-up Never in: −6 pts c) Next 3 yellow balls are delivered (926) for "players choice" (950). The more challenging shot the player chooses, the more he/she is rewarded for a successful putt. The choices are the same white, orange, and yellow shots and are scored accordingly:

In hole: 6, 12 or 18 pts
In target: 3, 6, or 9 pts
Never-up Never in: −3, −6, or −9 pts After the 3rd round, the game is over (934—Yes, 942). The leaderboard and audio system announce the winner in a flashy manner (944), displaying the winner's avatar and everyone's final score. Experience points and other incentives are displayed (946) and game is complete (948).

It should be understood that the particular order in which the operations in FIG. 9A have been described is merely exemplary and is not intended to indicate that the described order is the only order in which the operations could be performed. One of ordinary skill in the art would recognize various ways to reorder the operations described herein.

Figure 9B:
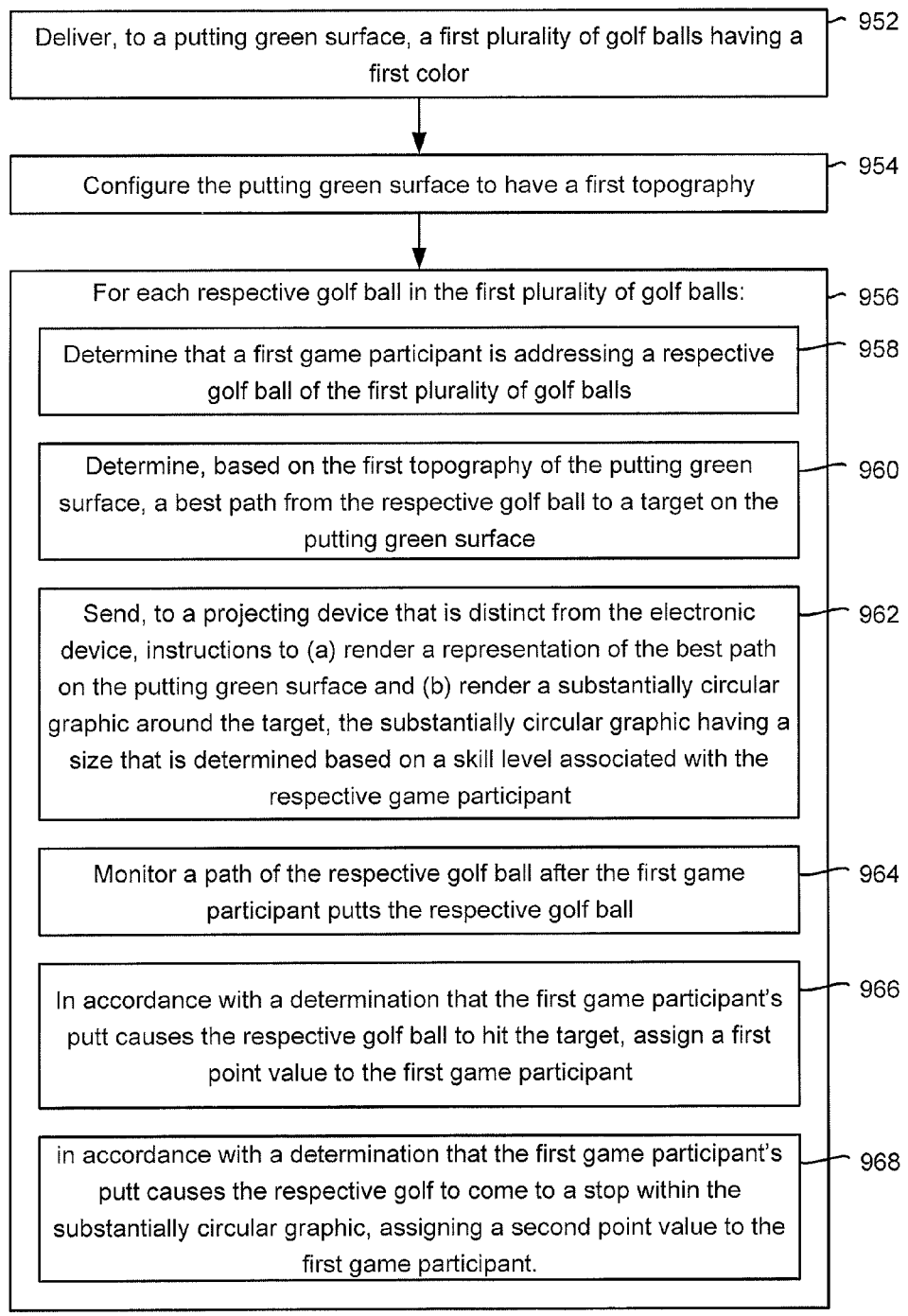

FIG. 9B is a flowchart of a method 950 of playing "6-Pack Challenge" game at a sport simulation system, in accordance with some embodiments.

In some embodiments, the method 950 is performed by an electronic device (e.g., system controller 114, FIG. 1A) and/or one or more components of the electronic device (e.g., an I/O subsystem, an operating system, etc.). In some embodiments, the method 950 is governed by instructions that are stored in a non-transitory computer-readable storage medium and that are executed by one or more processors of a device, such as the one or more processors 202-1 of a management module 114-1 (FIG. 1C). For ease of explanation, the following describes method 950 as performed by the system controller 114 (also referred to simply as the device). In some embodiments, with reference to FIG. 1C, the operations of method 950 are performed by or use, at least in part, a surface modification module (e.g., surface modification module 222), a ball color detection module (e.g., ball color detection module 224), a ball path determining module (e.g., ball path determining module 226), a graphics rendering module (e.g., graphics rendering module 228), a game selection module (e.g., game selection module 230), a ball delivery module (e.g., ball delivery module 232), a ball retrieval module (e.g., ball retrieval module 234), user-specific putting data (e.g., user-specific putting data 218), and a leaderboard updating module (e.g., leaderboard updating module 220). Some operations in method 950 are, optionally, combined and/or the order of some operations is, optionally, changed.

In some embodiments, a method 950 includes: delivering (902), to a putting green surface, a first plurality of golf balls having a first color. In some embodiments each golf ball is delivered to a predetermined position on the putting green surface (using ball delivery system 108, as explained above in reference to FIGS. 4 and 5). For example, when a game of "6-pack challenge" is played at a sport simulation system, the ball delivery system 108 is instructed, via ball delivery interface 210, to deliver the first plurality of golf balls to predetermined positions that are determined based on graphics projected on the putting green surface (e.g., circular graphics projected on the putting green surface by one or more projectors 105). In some embodiments, each golf ball in the first plurality of golf balls have a white color.

The method also includes: configuring (954) the putting green surface to have a first topography. In some embodiments, the first topography is a substantially flat topography, such that the putting green surface is initially configured in a substantially flat configuration (e.g., without any tilt or contouring of the surface). Topography of the putting green surface is configured by sending instructions (e.g., by system controller 114 using playing surface interface 212 and surface modification module 224, FIG. 1C) to one or more surface modification elements 106 (FIG. 1A).

For each respective golf ball in the first plurality of golf balls (956), the method includes at least five operations (e.g., operations 958-968).

The first operation includes determining (958) that a first game participant is addressing a respective golf ball of the first plurality of golf balls. In some embodiments, this determination is made by using one or more cameras 103 (FIG. 1A) to determine that a user has placed their feet within a feet placement graphic projected on the putting green surface. In some embodiments, this determination is made by using the one or more cameras 103 to determine that a user is within a predetermined distance of a respective golf ball and/or determine that the user has placed their putter behind the golf ball.

The second operation includes determining (960), based on the first topography of the putting green surface, a best path from the respective golf ball to a target on the putting green surface. In some embodiments, ball path determining module 226 (FIG. 1C) in conjunction with tracking system interface 204 are used to perform this operation. As discussed above, in some embodiments, the target is a hole extending through the putting green surface and the hole may be of varying sizes depending on skill level of the first game participant. In other embodiments, the target is a graphic project on the putting green surface (such as a gopher moving around the surface, a bulls-eye, and the like). Determining the best path is discussed in detail below in reference to FIGS. 15A-15K.

The third operation includes sending (962), to a projecting device that is distinct from the system controller 114 (the device performing the method 950), instructions to (a) render a representation of the best path on the putting green surface and (b) render a substantially circular graphic around the target, the substantially circular graphic having a size that is determined based on a skill level associated with the respective game participant. In some embodiments, instead of a substantially circular graphic a graphic of any suitable shape is rendered (e.g., a graphic shaped like a country, substantially rectangular shape, etc.) In some embodiments, the rendered graphics are smaller for more advanced players (since they are expected to be better players) and are larger for beginners, thus evening the playing field for beginner players at least slightly. In this way, beginners learn to enjoy the game of golf and are encouraged to continue practicing and playing games at sport simulation system 100.

The fourth operation includes monitoring (964) a path of the respective golf ball after the first game participant putts the respective golf ball (e.g., via information received from cameras 103 via the tracking system interface 204, FIG. 1C).

The fifth operation is based on whether the first game participant's putt causes the respective golf ball to hit the target (e.g., to fall through a hole on the putting green surface). In accordance with a determination that the first game participant's putt causes the respective golf ball to hit the target, the fifth operation includes assigning (966) a first point value to the first game participant. In accordance with a determination that the first game participant's putt causes the respective golf to come to a stop within the substantially circular graphic, assigning (968) a second point value to the first game participant (e.g., the second point value is smaller than the first point value but still awards points for getting close to the target). In accordance with a determination that the first game participant's putt does not cause the respective golf ball to come to a stop within the substantially circular graphic and does not cause the respective golf ball to hit the target, assigning a third point value to the first game participant (e.g., zero points or possibly negative points).

Additional operations of method 950 may be interchanged or added to include operations discussed above with respected to FIG. 9A. For example, topography of the putting green surface is re-configured to be more challenging and the method 950 outlined above is repeated for a second plurality of golf balls have a second color. As another example, a new plurality of golf balls having the first color are delivered and a second game participant interacts with the method 950 outlined above. As discussed above, some embodiments, allow for multiple players and multiple rounds of game play.

It should be understood that the particular order in which the operations in FIG. 9B have been described is merely exemplary and is not intended to indicate that the described order is the only order in which the operations could be performed. One of ordinary skill in the art would recognize various ways to reorder the operations described herein.

Figure 10:
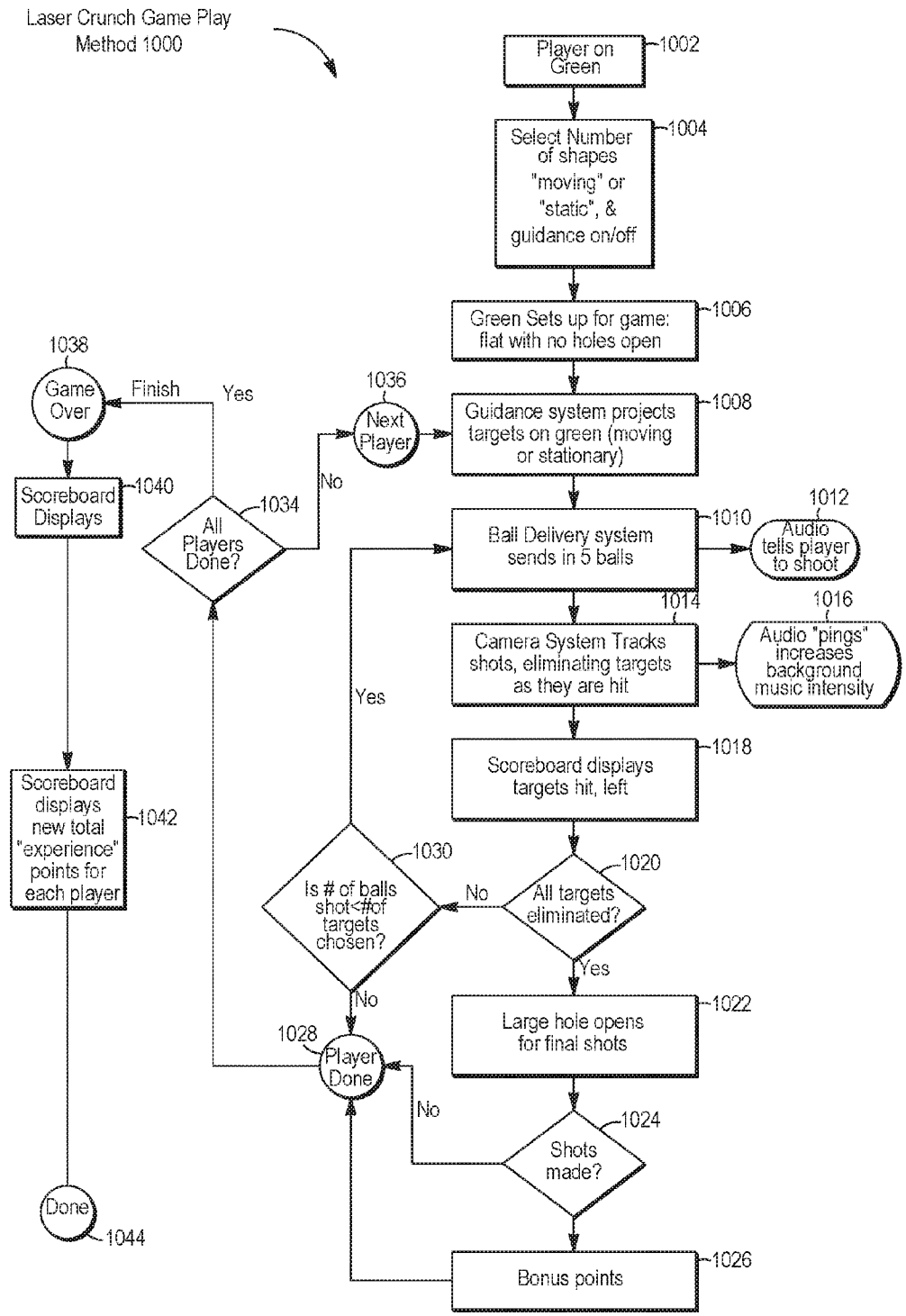
FIG. 10 is a flowchart of a method of managing a "Laser Crunch" game at a sport simulation system, in accordance with some embodiments.

Attention is now directed to FIG. 10, illustrating another game available at the sport simulation system 100. More specifically, FIG. 10 is a flowchart of a method of managing a laser crunch putting challenge game at a sport simulation system, in accordance with some embodiments.

In some embodiments, a laser crunch game play method 1000 is performed by an electronic device (e.g., system controller 114, FIG. 1A) and/or one or more components of the electronic device (e.g., an I/O subsystem, an operating system, etc.). In some embodiments, the method 1000 is governed by instructions that are stored in a non-transitory computer-readable storage medium and that are executed by one or more processors of a device, such as the one or more processors 202-1 of a management module 114-1 (FIG. 1C). For ease of explanation, the following description of method 1000 is performed by the system controller 114 (also referred to simply as the device). In some embodiments, with reference to FIG. 1C, the operations of method 1000 are performed by or use, at least in part, a surface modification module (e.g., surface modification module 222), a ball color detection module (e.g., ball color detection module 224), a ball path determining module (e.g., ball path determining module 226), a graphics rendering module (e.g., graphics rendering module 228), a game selection module (e.g., game selection module 230), a ball delivery module (e.g., ball delivery module 232), a ball retrieval module (e.g., ball retrieval module 234), user-specific putting data (e.g., user-specific putting data 218), and a leaderboard updating module (e.g., leaderboard updating module 220). Some operations in method 1000 are, optionally, combined and/or the order of some operations is, optionally, changed.

FIG. 10 is a flowchart of a method of managing a "Laser Crunch" (also referred to as "Odd Ball" and "Kids' Corner") game at a sport simulation system, in accordance with some embodiments. An exemplary game in a series of short games under the umbrella title "Odd Balls" is described in the foregoing paragraphs. "Odd Balls" is a collection of short, fast-paced, exciting games meant for children or people who are not entirely familiar with golf. In addition, some players may just want a fun, unique, video-game-like interface to experience the new technologies that have been developed with the laser guidance system, the undulating green, the scoring, game-flow and sound enhancements.

In Laser Crunch, the laser guidance system draws several small animals on the ground (e.g. ducks, also referred to as targets that are projected on the surface of a playing surface). The objective is for the player who is putting to shoot the golf balls and intersect the animals, thereby eliminating them. The sound system will indicated progress with "blips" for hitting the animals. A background sound/musical score will increase in intensity/speed as play progresses. The animals will disappear when "hit". The more the player "hits", the better they score. Multiple animals can be hit with a single stroke of the putter. The animals may be slowly moving, or may be static, depending on the game setting. If all animals are eliminated within the number of balls allowed, the large "children's hole" will open up on the green and they have a chance to score more points if they can hit the ball into the hole.

In some embodiments, method 1000 beings when a set of players from 1-8 will walk onto a dynamic green and touch the player interface control screen (1002). The player interface control screen will allow the player to select what type of game they would like to play, order beverages, evaluate their player statistics, or view the golf merchandise and get prizes (1004, see exemplary user interfaces shown in FIGS. 13A-13C). In this exemplary game, the players have selected "Odd Balls" under the "Games" menu, and then "Laser Crunch". They will also be asked to choose a number of shapes/animals to eliminate (5, 10, or 20), and whether they want the shapes/animals to be stationary or moving. The green will set itself up for the game: flat with no holes (1006). The guidance system is designed to display the animals for the user to "shoot" with the golf ball and they will either be moving slowly or stationary depending on the settings (1008). The automatic ball delivery system sets up 5 balls for the player to shoot (1010). The audio system tells the player to begin "shooting" (1012). The player shoots the balls towards the targets. As the targets are "hit" by the balls, they are eliminated (1014) and the audio system emits a "pinging" sound (1016).

As more targets are eliminated, the background music increases in intensity and speed to keep the game exciting and moving along (1016). The scoreboard is constantly updated, displaying the number and pictures of the targets that were eliminated. The number remaining is also displayed (1018). One shot can score multiple targets. After all 5 shots are taken, and there are still remaining targets, play will continue if the total number of balls shot so far is less than the number of targets chosen (1020—No and 1030—Yes) per the following schedule: 5 balls total for 5 targets, 10 balls total for 10 targets, 15 balls total for 20 targets. The 5 balls are eliminated from the game by the ball retrieval system. If the player has more shots, 5 more balls are delivered and play resumes. If all the targets are eliminated (1020-Yes), the large hole on the green will open up and be lit with arrows pointing to it by the guidance system. The player will score bonus points if they can shoot their remaining balls into the hole (1024—Yes). They also get bonus points if they do not require all the balls from the next round (e.g. they eliminate 10 targets with 5 balls or less). The player's turn is complete (1028) and play is passed on to the next player, who repeats the entire game play described above. This process is repeated until all players have completed the game, and the game is then over (1034—Yes, 1038). The Scoreboard and audio display will announce the winner in a flashy manner, displaying the winner's avatar (1040) and everyone's final score. Experience points and other incentives is displayed (1042) and game is complete (1044).

It should be understood that the particular order in which the operations in FIG. 10 have been described is merely exemplary and is not intended to indicate that the described order is the only order in which the operations could be performed. One of ordinary skill in the art would recognize various ways to reorder the operations described herein.

Figure 11:
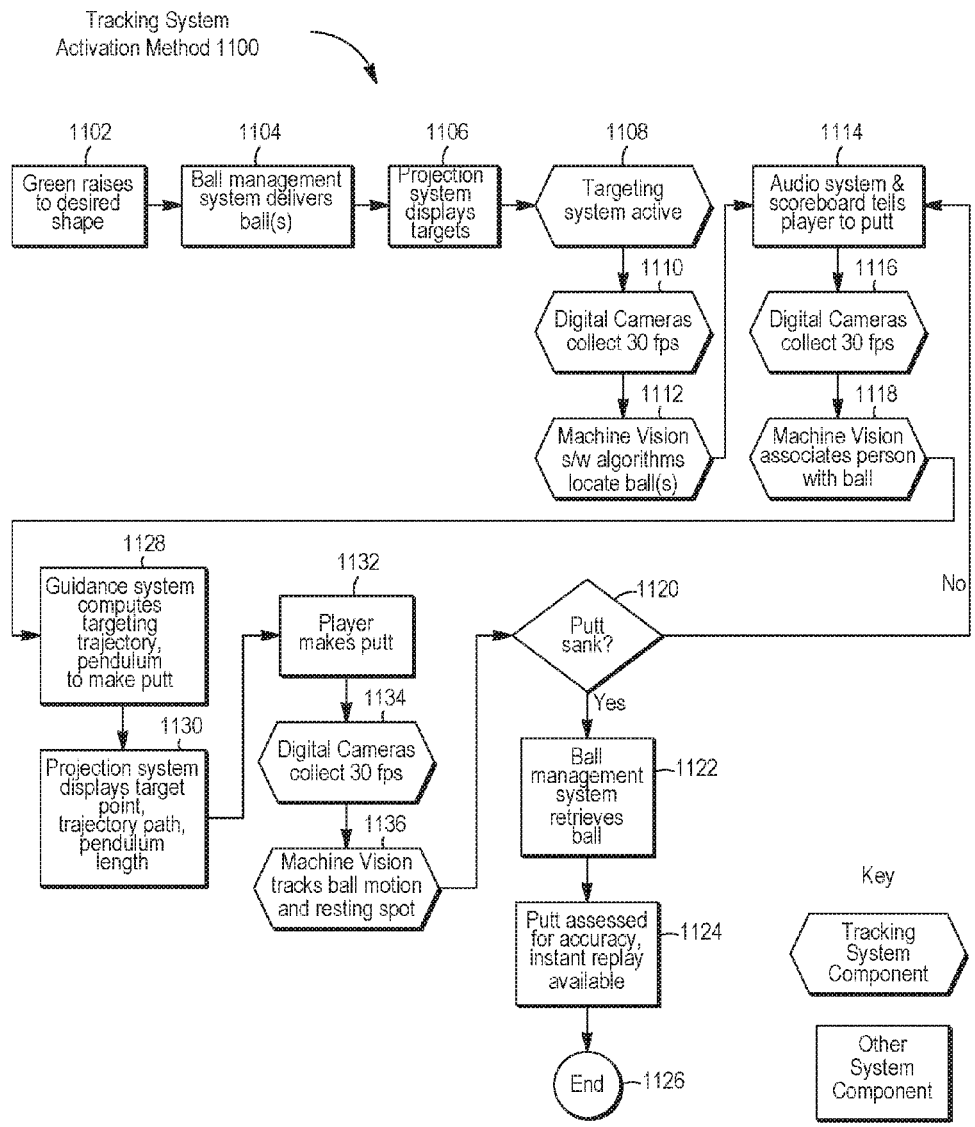
FIG. 11 is a flowchart that identifies the hardware and software process required for the tracking function during a typical game played at a sport simulation system, in accordance with some embodiments.

Attention is now directed to FIG. 11, depicting aspects of a tracking system (e.g., tracking system 102, FIG. 1A). In particular, FIG. 11 is a flowchart that illustrates a method of activating various components of a sport simulation system (e.g., sport simulation system 100, FIG. 1A) in order to use a tracking system with the sport simulation system, in accordance with some embodiments. Stated another way, FIG. 11 identifies the hardware and software process required for the tracking function during a typical game played at a sport simulation system.

In some embodiments, the tracking system utilizes several high resolution, high speed digital still frame cameras to track the ball position on the green. In some embodiments, the tracking system also has preset knowledge of all possible hole locations and sizes. In some embodiments, a purpose of the tracking system is to: 1) locate balls on the green, 2) track ball motion during each putt, 3) determine ball location over time relative to the hole or other objects (laser targets), 4) associate balls to different players, and 5) interface with other systems as required to support all required gaming modes. In some embodiments, each camera is directly connected to a computer, which contains state-of-the-art machine vision software (for simultaneous, precision tracking of multiple golf balls on a green). In some embodiments, the tracking system interfaces to the other system via a TCP/IP switch and communicates via network sockets.

In some embodiments, the tracking system requires multiple cameras (e.g., cameras 103, FIG. 1A) to handle situations in which any given single camera may not have an adequate field of view to locate and/or track moving balls as required. Examples of this include cameras being blocked by players, balls being too close to each other to allow for a single camera to separate them, and distance related effects that make closer balls appear larger while further balls appear smaller. In some embodiments, the tracking system also needs to be able to handle spurious objects detected that appear to be balls and filter them out, as well as handling cases where individual cameras do not see every ball in every frame.

In some embodiments, the tracking system needs to be able to determine the distance between any two points on the green with a fair degree of accuracy (~1"). As part of the camera and tracking system configuration, a 3-D pixel level mapping of the green is created for each camera using detailed models of the undulating green and its actuators. In some embodiments, the precise location of holes and their state (i.e. "open" or "closed") is known by the tracking system as well as any features being "drawn" on the green by the projection system. In addition to traditional playing modes, this also allows for virtual reality features to be incorporated into a game via the projection system (e.g. shooting at animal shapes in the Laser Crunch game). In some embodiments, for each camera, any given location on the green will appear in a different location on the image. The tracking system will then be able to understand that a ball that appears in different positions in each camera image is actually the same ball. The distance from any given ball center to any other object (ball, laser target, etc.) is determined using pixel locations in the camera images. In some embodiments, the pixel distance between objects from various camera locations will vary based on the camera distance from the objects. For example, a camera that is close to two adjacent ball might show 300 pixel separation, while a camera much further away at a different angle might only show a 100 pixel separation. Both of these then need to be able to compute the same physical distance of separation. In some embodiments, this information is provided to a system controller (e.g., system controller 114) during a camera integration process.

Several of the games described herein require the tracking system to maintain knowledge of the distance of the ball to the hole over the duration of the putt to facilitate scoring. And one of the games requires the tracking system to maintain distance knowledge of the ball to a set of moving targets during the putt. In order to accomplish this, in some embodiments, the tracking system takes multiple images per second of the green using each of the cameras. In some embodiments, the image processing software uses a ball discrimination algorithm to locate the balls in each frame. In order to be able to fulfill all requirements related to tracking balls, associating balls with players, and scoring based on ball position relative to various objects, the tracking system needs to have a high level "understanding" of what is taking place on the green.

In some embodiments, a state machine is used by the tracking system to monitor and keep track of the flow of the game while players are putting on the green. For example, while all the balls on the green are stationary, there is no scoring taking place, and the tracking system is just waiting for one of the players to initiate a putt. Once a player putts a ball, the tracking system detects this and enters a new state where ball motion is tracked, and required interaction with other systems (audio, guidance) takes place. When the ball comes to a stop, either due to missing the hole or the putt being sunk, the tracking system will perform any required scoring, ball distance computation, and then transition to a state where it is waiting for the next longest putt to take place.

In some embodiments, the tracking system interacts with almost all the other systems at one point or another during game play.

In some embodiments, the tracking system receive inputs from a virtual reality system and the ball management system when the players transition from the VR simulator to the putting green. A cue from the ball management system will inform the tracking system to capture and record initial ball locations. In some embodiments, the VR system will inform the tracking system which ball belongs to which player, and the total stroke count to that point in the hole play. In some embodiments, the tracking system will then compute the ball to hole distances for each players ball and determine which player is first to putt. During putting, the tracking system maintains ball to player association, and keeps track of total putts for scoring. When putting is complete, the tracking system checks for the green being clear. When the green is clear, the tracking system informs the VR simulator to proceed to the next hole.

In some embodiments, the tracking system will receive cues to begin tracking from the state machine, which is the driver that moves the game along sequentially. Player's progress in putting is sent to the state machine for updates as the play moves forward.

In some embodiments, the tracking system maintains knowledge of putt count during green putting, and communicates total putts to the control/display system so that player scores can be updated in real time after each putt. Each player is associated with a specific ball, so the tracking system informs the display system of who is putting so that players name can be displayed along with any other relevant information concerning the player.

In some embodiments, the tracking system is the primary source of information being provided to the audio system. Player name announcements and simulated crowd or other noises based on moving ball location or putt finish location are based on information that the tracking system sends to the audio system. Information concerning the hitting of guidance based targets are communicated from the guidance system directly to the audio system.

In some embodiments, the tracking system interface to the guidance system is primarily used to inform the guidance system of ball location, both when stationary and while the ball is moving. The tracking system cues the guidance system concerning the ball location when a player is about to initiate a putt. Based on this information, the guidance system knows where the ball is, and can begin the process of computing trajectory, speed and backstroke required to make the optimum putt and displaying the required guidance on the green.

If the guidance system is displaying stationary or moving laser targets, information from the tracking system concerning ball movement over time is passed to the guidance system to allow it to remove or further manipulate objects that the ball "hits" on its way to the hole. The guidance system will then need to forward that information to the audio system if any additional sound effects are required based on the projected objects being hit. Scoring based on these events also needs to be forwarded by the guidance system to the display system so real time scoring can be displayed.

In some embodiments, after configuring a playing surface with a desired shape (1102), delivering balls to desired locations (1104), and projecting any targets onto the playing surface (1106), a signal is sent to each camera control computer (e.g., controllers for each camera 103) via TCP/IP sockets to activate the targeting system (1108) by turning on the digital cameras and taking images at 30 frames per second (fps) (1110). Each computer uses machine vision software to locate balls on the green (1112). Once a player steps up to putt a respective ball (1114), the cameras (1116, 1118) associate a ball with that player. The guidance system computes the optimal trajectory path, target point, and pendulum swing for the player (1128) and the projection system displays results on the playing surface (1130). The player makes his putt based on the provided guidance information that was projected on the playing surface (1132). The tracking system cameras record (1134) and the machine vision algorithms track ball trajectory and where each ball comes to rest (1136). If the putt is not made, the process begins again (1120—No). If the putt is made (1120—Yes), then the shot is complete and the ball management system retrieves the balls from the hole (1122). Data collected during movement of the ball on the playing surface is used to assess the putt and give the player feedback (1124). An instant replay of the putt is also available for viewing, and extra-good putts are stored for the long-term into a player database which may be retrieved later. The tracking system activation method 1100 then ends (1126) and waits for an indication from a system controller (e.g., system controller 114) as to when activation is again required.

Additional details regarding guidance and tracking systems are also provided above in reference to FIG. 1A-1C.

Figure 12:
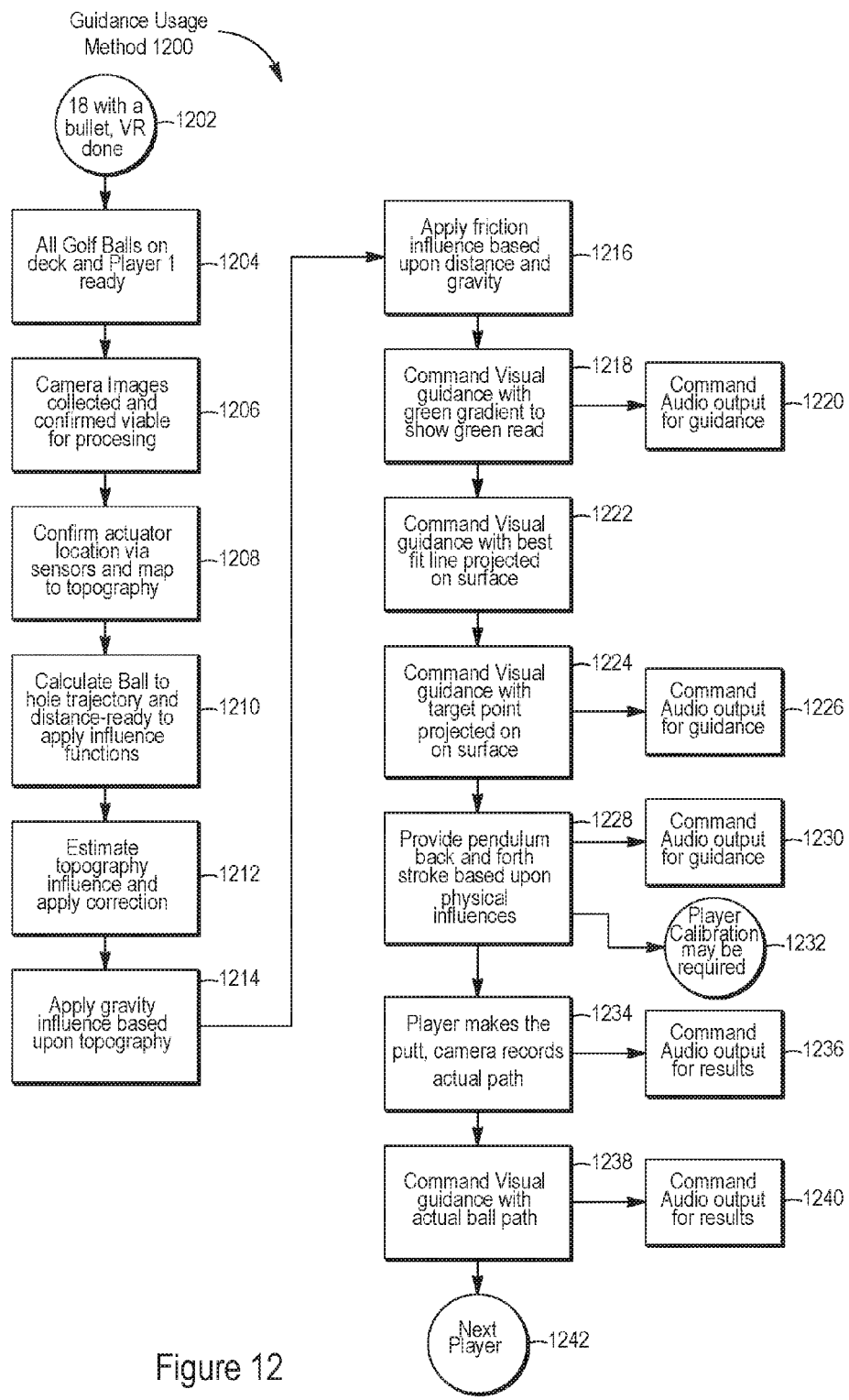
FIG. 12 is a flowchart of the hardware and software process required for the guidance function during the 18 with a bullet game mode selected, in accordance with some embodiments.

FIG. 12 is a flowchart of hardware and software processes required for using guidance functions during an 18 with a bullet game mode selected at a sport simulation system (e.g., sport simulation system 100, FIG. 1A), in accordance with some embodiments. In this example, players have completed shots at a VR simulator (1202) and all approach shots have ended up on the green at their locations and have been delivered to a playing surface via a ball management system (1204). The longest putt player is ready to start putting and ready for the guidance feedback (1204). The control software collects camera images from the deck with the players in place and determines the longest ball and the first player to putt. The software determines that the image is viable and can be used for future processing and commanding (1204). If it is not viable, then more images are taken from the second camera and then verified viable for use without obstructions. The control system will read all actuator positions from the sensors and confirm that the topography is correct for that hole on the specific course and that all actuators have reached the correct location (1208). In some embodiments, a tilt of the playing surface is verified (e.g., in embodiments in which a tilt-able playing surface is utilized, as discussed in reference to FIGS. 3A-3B. A calculation of ball to hole trajectory is then made and an estimation is ready to apply influence functions. The guidance usage method 1200 has distance factored in to also apply influence functions that have that as a variable (1210). The method reviews mechanical influence functions for a current topography of the playing surface and applies a correction based upon the ball location and the estimated trajectory to the hole (1212). These mechanical influence functions are determined based upon an elaborate calculation that takes into account actuator locations (or tilt of the playing surface) and the mechanical properties of the deck assembly (1212). Based upon the deck topography and the ball location with respect to the hole, there is a gravity influence function calculated and applied based upon the "peaks and valleys" over which the ball has to transverse (1214). The gravity influence is calibrated for every deck topography for every course on every green and applied based upon ball location with respect to the hole (1214). Based on the distance of the ball to the hole, the method 1200 has access to a green surface friction influence function that will take into account the surface roughness and will have to be calibrated also (1216).

In some embodiments, the system controller 114 sends instructions to the guidance system to output a gradient across the playing surface that will help a respective participant identify green topography and help that respective participant read the green as they proceed through the putt (1218). The visual guidance can be complemented with audio guidance to identify and point out specific putting/aiming or speed advice (1220). In some embodiments, the system controller 114 sends instructions to the guidance system to output a best fit line across the playing surface showing a respective participant, based upon all the surface conditions, that will allow the respective participant to hit the ball with a correct trajectory to the hole that will allow for making the putt (1222). In some embodiments, the visual guidance can be complemented with audio guidance to identify and point out additional guidance and instructional advice (1226, 1230). In some embodiments, the system controller 114 commands the guidance system to output a the target point on the playing surface (1224). The target point is the point on the green surface that if you hit the golf ball towards that location it would follow along the best fit line and sink the putt (1224).

All of the guidance commanding is based upon the player's ball location with respect to the hole, factoring all the physical and material influences on the ball as it would proceed. The system controller 114 commands the guidance system to output a putting pendulum back and forth putter motion graphic (1228). The system will accept a calibration for each player to identify an influence that has a factor related to how hard the individual hits with the selected putter (1232) for that game (1228). The player makes the putt and the camera system records the whole time the actual motion of the ball (1234). In some embodiments, the system controller 114 commands audio output based upon the progress as the put is taking place (1236). The system controller 114 commands the guidance system to output an actual ball path on the playing surface so that the player can see where the ball went with respect to the best fit line so that putting adjustments can be done in the future (1238 and in some embodiments, audio is also provided 1240 that indicates how the player could improve their short in order to more closely follow the best fit line). In some embodiments, player putting statistics are recorded and sent to a scoreboard and retained over the entire game. In some embodiments, the player putting experience is recorded during the entire game and can be retrieved any time and sent to remote computing device for future playback. The system controller 114 then identifies the next longest putt (i.e., furthest away from the hole) and the visual and audio guidance will proceed as described above for method 1200 with respect to the next longest putt.

In some embodiments, the guidance system also includes a large touch-sensitive display that the game and guidance systems can use to display video capture of the putt, video display of a proper motion, scores from either games or putting evaluations. The information in the large display is captured and recorded using the data from the camera images (e.g., data captured by the cameras 103, FIG. 1A).

FIGS. 13A-13C show exemplary user interfaces for selecting various games or modes. As shown in FIGS. 13A-13C, gaming user interfaces 1302, 1304, and 1306 allow participants of games at a sport simulation system (e.g., sport simulation system 100, FIG. 1A) to make game selections, order food and beverages, and view player cards and other user-specific information. In some embodiments, the gaming interfaces 1302, 1304, and 1306 are available using devices that are provided with the sport simulation system 100, while in other embodiments, the gaming interfaces are accessible through any mobile device.

Figure 14:
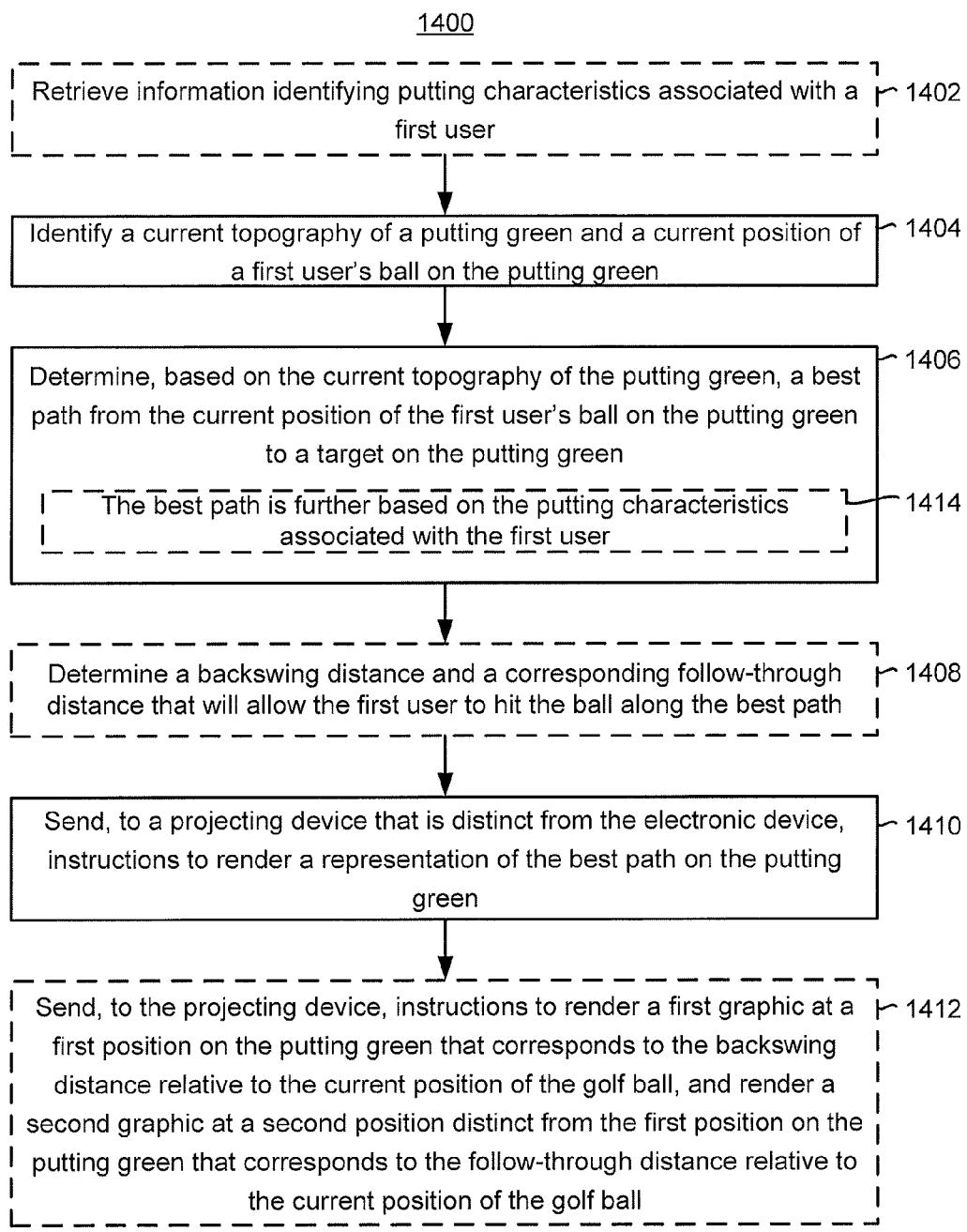
FIG. 14 is a flowchart of a method of projecting guidance lines onto a playing surface, in accordance with some embodiments.

FIG. 14 is a flowchart of a method 1400 of projecting guidance lines onto a playing surface, in accordance with some embodiments.

In some embodiments, the method 1400 is performed by an electronic device (e.g., system controller 114, FIG. 1A) and/or one or more components of the electronic device (e.g., an I/O subsystem, an operating system, etc.). In some embodiments, the method 1400 is governed by instructions that are stored in a non-transitory computer-readable storage medium and that are executed by one or more processors of a device, such as the one or more processors 202-1 of a management module 114-1 (FIG. 1C). For ease of explanation, the following describes method 1400 as performed by the system controller 114 (also referred to simply as the device). In some embodiments, with reference to FIG. 1C, the operations of method 1400 are performed by or use, at least in part, a surface modification module (e.g., surface modification module 222), a ball color detection module (e.g., ball color detection module 224), a ball path determining module (e.g., ball path determining module 226), a graphics rendering module (e.g., graphics rendering module 228), a game selection module (e.g., game selection module 230), a ball delivery module (e.g., ball delivery module 232), a ball retrieval module (e.g., ball retrieval module 234), user-specific putting data (e.g., user-specific putting data 218), and a leaderboard updating module (e.g., leaderboard updating module 220). Some operations in method 1400 are, optionally, combined and/or the order of some operations is, optionally, changed.

In some embodiments, a method 1400 optionally includes: retrieving (1402) information identifying putting characteristics associated with a first user. In some embodiments, this information is stored in a data structure on the system controller 114 (or could be stored at a server remotely location from the system controller 114), such as user-specific putting data 218 (FIG. 1C). In some embodiments, the user-specific putting data 218 includes information about swing data associated with a plurality of users of a sport simulation system, the plurality include the first user. The swing data includes impact speed, impact angle, backswing distance, follow-through distance, difficulty levels for each shot, and the like.

The method 1400 includes identifying (1404) a current topography of a putting green and a current position of a ball on the putting green, the ball being associated with the first user. In some embodiments, a tracking/guidance system 102 provides information to system controller 114 in order to allow the system controller 114 to identify the current topography and the current position of the ball.

The method 1400 also includes: determining (1406), based on the current topography of the putting green, a best path from the current position of the first user's ball on the putting green to a target on the putting green. In some embodiments, the best path is further based on the putting characteristics associated with the first user (1414). Best paths are discussed in more detail in reference to FIGS. 15A-15K.

In some embodiments, the method 1400 optionally includes determining (1408) a backswing distance and a corresponding follow-through distance that will allow the first user to hit the ball along the best path. Backswing and follow-through distance determinations are also discussed below in reference to FIGS. 15A-15K.

The method 1400 additionally includes sending (1410), to a projecting device that is distinct from the electronic device, instructions to render a representation of the best path on the putting green. In some embodiments, the method 1400 optionally includes: sending (1412), to the projecting device, instructions to render a first graphic at a first position on the putting green that corresponds to the backswing distance relative to the current position of the golf ball, and render a second graphic at a second position distinct from the first position on the putting green that corresponds to the follow-through distance relative to the current position of the golf ball.

It should be understood that the particular order in which the operations in FIG. 14 have been described is merely exemplary and is not intended to indicate that the described order is the only order in which the operations could be performed. One of ordinary skill in the art would recognize various ways to reorder the operations described herein.

Figure 15A:
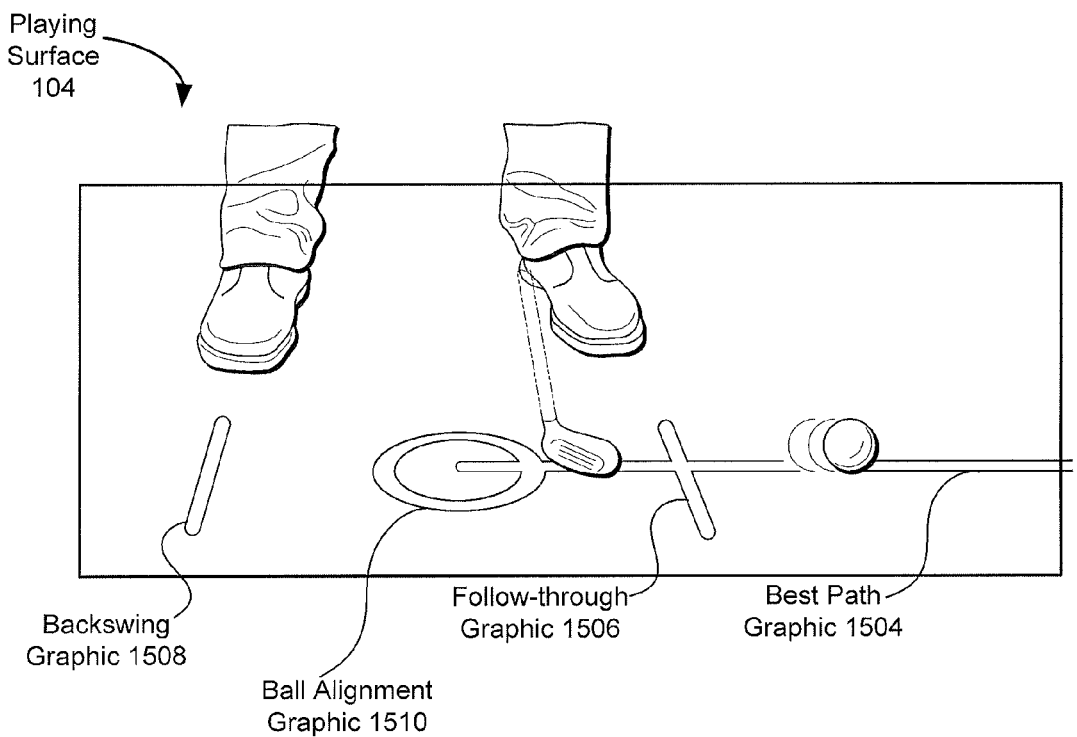
FIGS. 15A-15B are schematics of a best fit line projected onto a playing surface of a sport simulation system, in accordance with some embodiments.
Figure 15B:
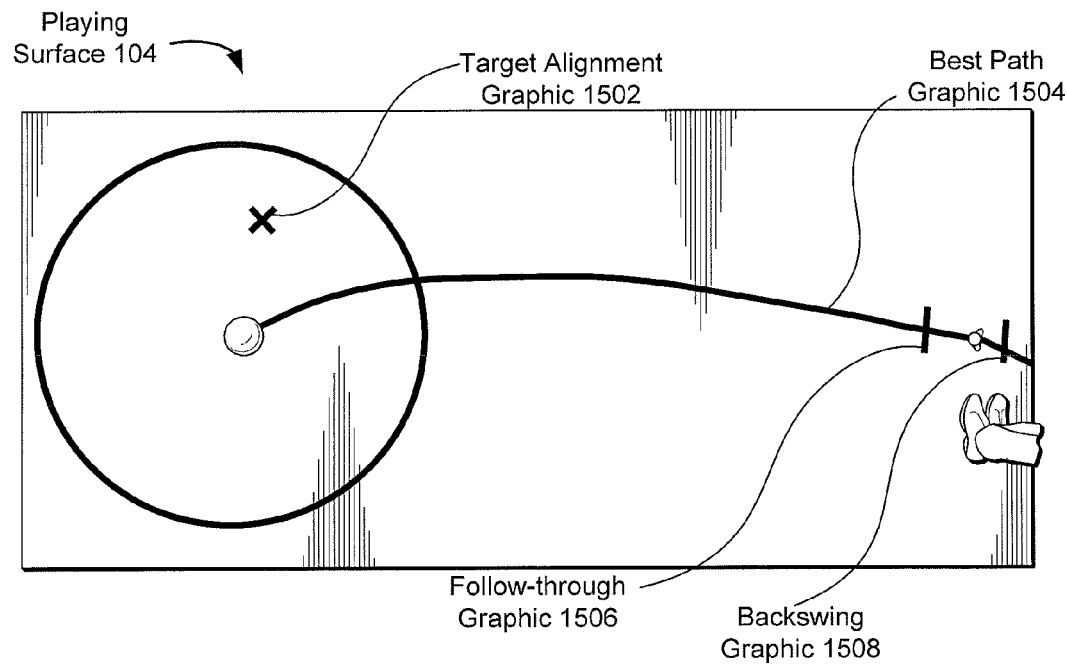

FIGS. 15A-15B are schematics of a best fit line and associated guidance graphics projected onto a playing surface of a sport simulation system, in accordance with some embodiments. As shown in FIG. 15A, the best fit line and associated guidance graphics may include a backswing graphic 1518, a ball alignment graphic 1510, a follow-through graphic 1506, and a best path graphic 1504 (FIGS. 15A and 15B). The backswing graphic 1518 and follow-through graphic 1506 instruct a respective game participant as to the appropriate speed at which to strike a ball in order to allow the ball to follow the best fit line and make a respective putt. In some embodiments, the associated guidance graphics also include a target alignment graphic 1502 (FIG. 15B) that provides the respective game participant with a visual indication as to where they should target their putt in order to make it into the hole (or to hit some other suitable target). Additional details regarding determining appropriate guidance graphics are provided throughout this description and, in particular, in reference to FIGS. 15C-15K below.

FIGS. 15C-15K are coordinate frame diagrams of a playing surface used to illustrate proper determination of a best fit line, in accordance with some embodiments.

In some embodiments, a physics-based computation is utilized to determine a best path to a hole. In some embodiments, the optimal trajectory for a successful golf putt depends on the shape and speed of the green, the initial interaction between the ball and putter, and the properties of the ball. Assuming a standard golf ball and ignoring the nuances introduced by various ball manufacturers, as these are more relevant to driving than putting, we focus on the green and the putt. Our goal is to determine the best path for an arbitrarily shaped green of known speed with a player who putts using a pendulum swing of known arc length and timing. This is accomplished using a physics model for the motion of a ball on a putting green of arbitrary shape. In some embodiments, the determination of the best path breaks down as follows: (1) Determine the shape of the green; (2) Find the initial velocity vector for the ball that will produce a successful putt; (3) Map this onto a specific swing direction and pendulum arc for the player.

In some embodiments, surface modeling techniques are utilized to determine a best path for any arbitrary green surface with the ball located at any point with respect to the hole. This first requires computing the shape of the surface with sufficiently high fidelity to model the physics interaction between the moving ball and the undulated green. In some embodiments, cameras and stereoscopic vision are utilized. A stereo camera rig will be located above the green surface and will estimate its shape every time it changes. The cameras are calibrated into a common coordinate frame with the green. This allows the recovered surface information to be transformed into a uniformly gridded height map. Thus, topographic data consists of an elevation model with respect to the zero position of a playing surface (lowest and flattest). In some embodiments, stereo algorithms are utilized that are able to use either these or commercial off-the-shelf stereo packages, provided the off-the-shelf packages produce a point cloud in some standard format.

Figure 15C:
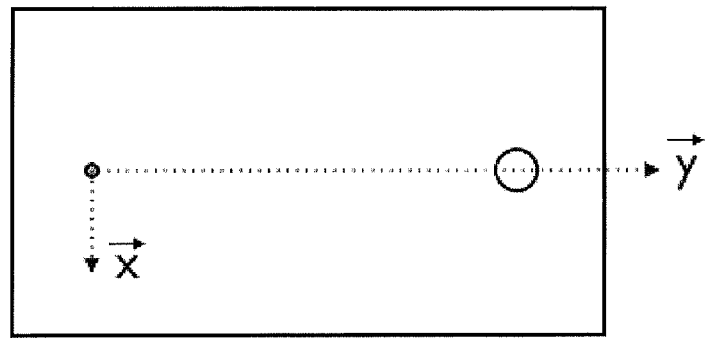
FIGS. 15C-15K are coordinate frame diagrams of a playing surface used to illustrate proper determination of a best fit line, in accordance with some embodiments.
Figure 15D:
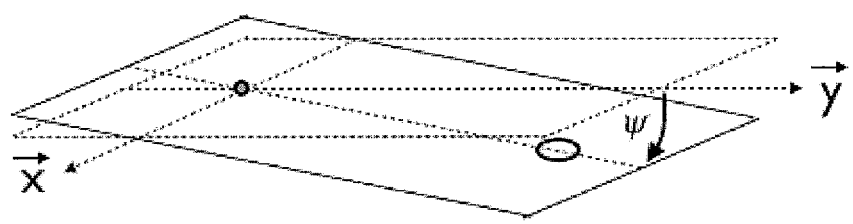
Figure 15E:
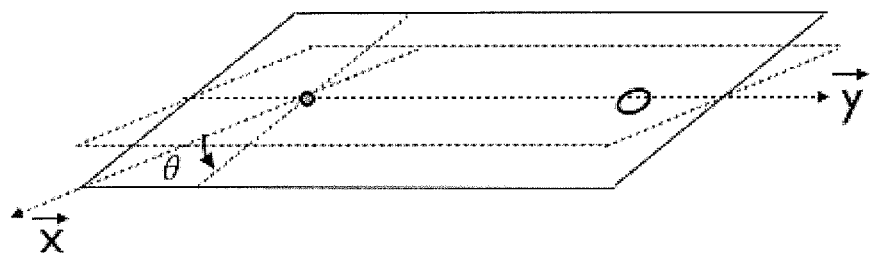
Figure 15F:
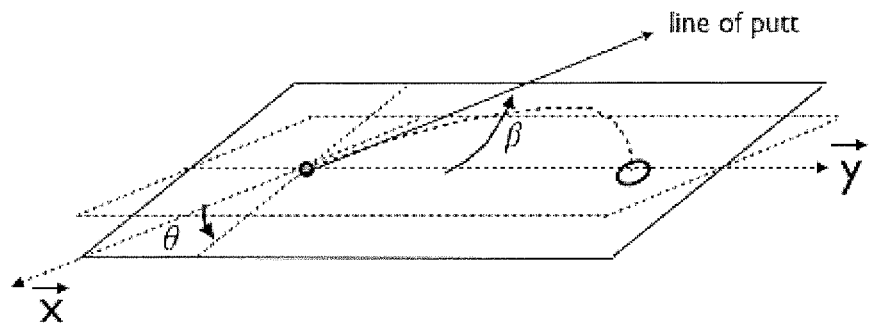

For a flat, tilted green, the acceleration profile for a ball is determined to first order by the velocity imparted by the putt, the tilt of the green, and the speed of the green. In some embodiments, the ball is assumed to be a uniform solid sphere. An initial coordinate frame is established with y defined by the line from the ball to the hole and x by its perpendicular (as shown in FIG. 15C). Let ($\theta$, $\psi$) be the tilt angles of the plane with respect to x and y, i.e., the pitch and the roll of the green (as shown in FIGS. 15D-15E) with respect to the instantaneous direction of travel of the ball. Then the acceleration vector $a=(a_x, a_y)$ for a ball in motion is given by the following:

$a_x = -g \cdot \sin(\theta) - f/m \cdot \sin(\phi)$ $a_y = -g \cdot \cos(\theta)\sin(\psi) - f/m \cdot \cos(\phi)$ where,
g=acceleration due to gravity
$\phi = a\tan 2(r_g \cdot \cos(\theta)\cos(\psi)\sin(\beta) - I_b \cdot \sin(\theta), r_g \cdot \cos(\theta)\cos(\psi)\cos(\beta) - I_b \cdot \cos(\theta)\sin(\psi))$
$m \cdot f = (r_g \cdot \cos(\theta)\cos(\psi)\cos(\beta) - I_b \cdot \cos(\theta)\sin(\psi))/((1+I_b)\cos(\phi)) \cdot g$ with $r_g$=speed of green, $I_b$=moment of inertia of ball normalized by (m $R^2$)=⅖ for a solid sphere, $\beta$=yaw angle between line of putt and line to hole (as shown in FIG. 15F), and m=mass of ball.

Given the above retarding acceleration and an initial position and velocity, the path of the ball can be predicted. However, this applies only to a flat green. For an arbitrary surface, the above set of equations are applied locally, in a piecewise fashion. For any instant in time, the surface model described above gives ($\theta$, $\psi$) for the plane tangent to the surface at its point of contact with the ball. If the ball's velocity at that time is known, the acceleration profile above can be applied for a short extent over which the green is nearly planar. This extent is a tunable parameter in our system. Once the ball has traveled beyond this planar patch, the process is repeated with its new velocity determined from the previous patch and the local tilt of the green determined from the surface model. Observe that at every patch, (x, y, $\theta$, $\psi$, $\beta$) all change. In other words, there is a moving coordinate frame defined by the location of the ball and it's line to the hole. Integrating the ball's motion is continued in this manner until one of three conditions is met: (1) the ball's velocity and acceleration drop beyond a threshold, at which points it is declared to have stopped, (2) the ball is captured by the hole, or (3) the ball leaves the green area.

If the ball's path crosses the hole, a decision must be made as to whether it is captured by the hole. If $R_h$ is the radius of the hole and R is the radius of the ball, the first requirement for capture is that the distance from the center of the ball to the hole is less than $R_h$ somewhere along its trajectory. However, this is not sufficient for capture as the ball may skip over the hole or skirt it. This is captured as follows:

vel_$\psi$=1/sqrt(1−cos($\beta$)sin($\psi$))·(sqrt($R_h^2-\delta^2$)+sqrt(($R_h$−R$)^2-\delta^2$))·sqrt(g/(2R))

vel_$\theta$=1/sqrt(1+sin($\beta$)sin($\theta$))·(sqrt($R_h^2-\delta^2$)+sqrt(($R_h$−R$)^2-\delta^2$))·sqrt(g/(2R))

If the ball's velocity v has norm less than vel_$\psi$ and vel_$\theta$, it will be captured. In the above, $\delta$ the component of the ball's straight-line trajectory not in line with the direction to the hole.

The physics model described thus far can predict a path and a capture condition given the initial position and velocity of the ball. However, velocity is not a concept that can easily be presented to a player. Instead, a player is shown an arc length for a pendulum swing that will result in a given velocity. It is the case that the initial velocity of the ball depends not only on the length of the arc but on the speed of the swing and the weight of the club. However, averages are assumed for a new player and data can be collected on individual players to better determine specific mappings between swing and ball velocity. This amounts to generating a lookup table for each player/club combination. The table starts with a pre-defined default for new players and adapts as the player's data becomes known to the system.

The above has described a forward modeling problem. Given the shape and properties of the surface and an initial velocity (i.e. known pendulum swing), a determination of the path of the ball and the capture condition can be approximated. In some embodiments, what is desired is to suggest a swing that will result in a captured ball. In some embodiments, a combination of good initialization through heuristics and a non-differential optimization via the Nelder-Mead algorithm is utilized. The Nelder-Mead approach mitigates the complexity of the physics model, since it is a search strategy rather than a gradient based algorithm. However, such approaches benefit tremendously from good initialization.

Figure 15G:
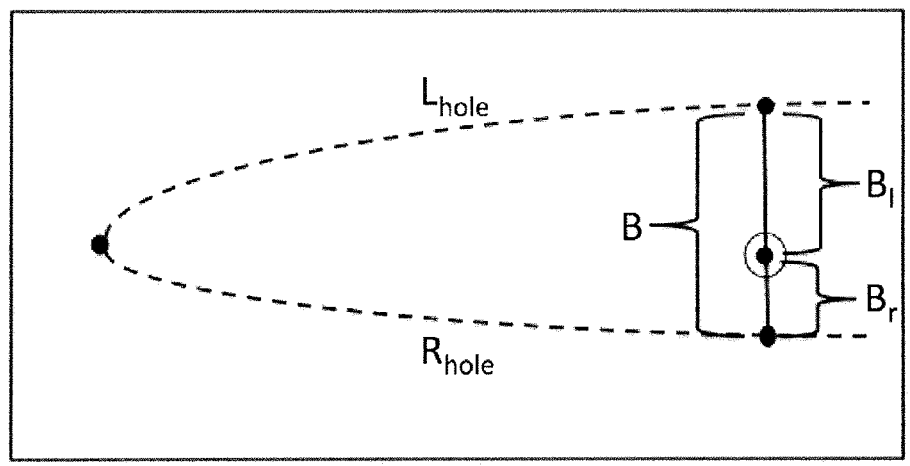
Figure 15H:
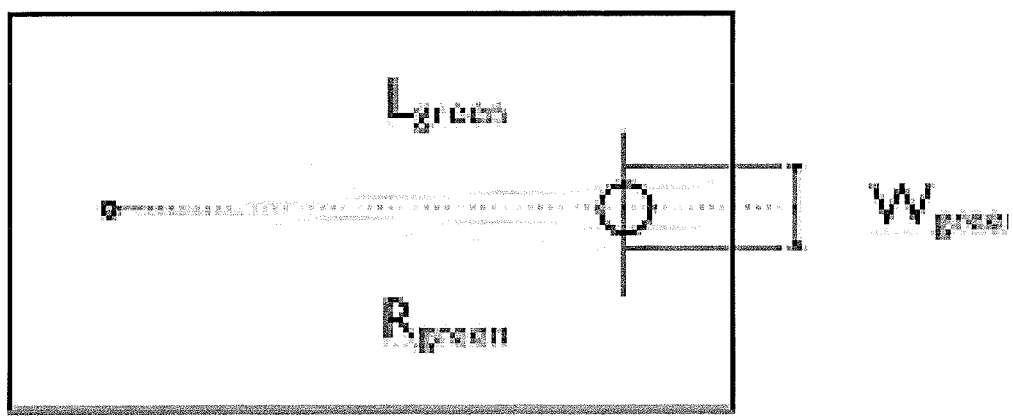

In some embodiments, initialization is as follows: Given, a green shape and the ball and hole location, we will determine a set of putts at some standard ball velocity and a set of angles sweeping the approximate direction to the hole. We will then determine the two paths $L_{hole}$ and $R_{hole}$ that pass the hole closest to either side. Let B be the line segment from $L_{hole}$ to $R_{hole}$ passing through the hole that is perpendicular to both $L_{hole}$ and $R_{hole}$. Let $B_l$ be the vector from the hole to $L_{hole}$ along B and let $B_r$ be the vector from the hole to $R_{hole}$ along B (as shown in FIG. 15G). Then $w_l=|Bl|/|B|$ and $w_r=|Br|/|B|$ are weighted distances between the hole and $L_{hole}$ and $R_{hole}$, respectively. If the velocity vectors associated with the putts resulting in $L_{hole}$ and $R_{hole}$ are $v_l$ and $v_r$, respectively, we set the initial velocity for the optimizer at;

$$v_{init}=w_l \cdot v_l + w_r \cdot v_r$$

The more finely sampled the initial sweeping angles, the better the approximation vinit will be at the expense of more computational time.

The model described thus far of a ball as a solid uniform sphere with a mass m and a moment of inertia $I_b$ is an approximation that holds because it has little impact on the putting game. However, a golf ball is not a uniform sphere but consists of a sequence of layers, usually with a dense metallic inner core and a soft lighter outer layer. The materials and layers of the ball, and thus m and $I_b$, vary depending on the ball manufacturer, but these are minor effects for the moderate speed rolling motion that occurs during a putt. Likewise, in reality the speed of the green $r_g$ is affected by environmental conditions such as heat and humidity. Indoors, on an artificial surface, these effects are expected to be minimal as well. Finally, the physics model holds for a ball in motion but is not valid at the moment of impact with the putter or when the ball approaches zero velocity. The former is not an issue because our mapping from swing to velocity just after impact amounts to a lookup table rather than a physics model. The low velocity case is only relevant if the velocity approaches zero just as the ball approaches the hole. However, this is of little concern, since the typical predicted best path will not have near-zero velocity near the hole.

To project a best-fit guidance line on a playing surface, the software system must compute the shape of the green surface, iteratively execute the physics model until a path to the hole is found, fit a curve that passes through the set of x,y coordinates along this path, and project this curve onto the green. Additionally, these activities should be completed within a sufficiently short period of time as to not negatively impact player experience. This performance goal is met by parallelizing both the surface topology and iterative physics model computation through calls to a general-purpose computing on graphics processing units (GPGPU) API. In some embodiments, a physics model is implemented in Numerical Python (NumPy) and uses NVIDIA Compute Unified Device Architecture (CUDA) extensions to achieve GPGPU parallelization. The guidance path is drawn in the Unity game engine, which finds a spline that passes through each x,y coordinate pair that is returned from the physics model when a path to the hole is found. Unity also stitches the light fields of multiple projectors together and draws this spline curve onto the green.

During gameplay at a sport simulation system, player data is collected in real time and sent to a cloud-based distributed database through a Representational State Transfer (REST) API. These metrics consist of, but are not limited to, initial putt velocity, width of pendulum swing, and putt angle. A server-side streaming analytics layer leverages this data to compute derived statistics such as a guidance line tailored to a player's swing speed, putter choice, and handedness. As with the physics model output, derived statistics directly affect player experience. Therefore, the time between acquisition of player data and delivery of derived statistics must be sufficiently short as to avoid noticeable delays in gameplay. The query component of this timeliness requirement is met by defining all query types when the database is created. This design guarantees that data is optimally indexed for each query. The streaming analytics layer gracefully handles various levels of load by claiming and relinquishing compute nodes as needed—a property that ensures a consistent level of performance.

The trajectory of the ball along an arbitrary surface depends on the initial velocity and direction of the ball. When the ball is on the green the trajectory is initiated by a pendulum swing that transfers energy from the player to the ball, exerting a force that drives the ball in a given direction at a given velocity. The energy imparted to the ball is a function of the amplitude of the pendulum swing and of the strength of the stroke. Although there is a relationship between these two quantities, this relationship is not fixed, unless the player adds no strength to the swing. This leads to two different techniques of putting a ball: 1) Adding no force to the putting swing and letting the width of the pendulum determine the force to the ball. This technique is consequent with the tendency of experienced players to hit the ball with the same swing and adjusting the desired reach distance by varying the club instead of the swing. In this case, the initial velocity of the ball is mainly determined by the width of the pendulum swing; and 2) Keeping the pendulum swing constant and varying the reach distance by adding force to the swing. In this case, the initial velocity of the ball is mainly determined by the force added to the swing, not by the width of the pendulum swing.

In practice, some players consistently prefer to vary the width of the pendulum swings while others prefer to always use tight swings, regardless of the distance to the hole. Players that do not add force to the swing do 'muscle' the stroke but simply adjust the width of the pendulum to add force to the stroke; this is advantageous to strike the ball a given distance since there is only one variable to control: the width of the swing; however, wider swings give opportunity to the face of the putter to open or close, with increase the error in the initial direction of the ball. On the other hand, players with a consistently tight swing need to compensate for the lack of amplitude of the pendulum by adding force to the stroke; however, a tight stroke gives little opportunity to the face of the putter to open or close so there is little error in the initial direction of the ball. The actual putting game of a player usually lies between these two extremes.

In some embodiments, both the force of the stroke and the initial direction of motion of a stroke is measured. The length of the pendulum swing as a function to the distance to the hole is determined from the imagery, while the strength of the stroke is determined from the initial velocity of the ball, which is proportional to its kinetic energy, which in turn is proportional to the contact force. The second factor in the determination of the trajectory of the ball, the initial direction of motion, is also determined from the imagery.

Figure 15I:
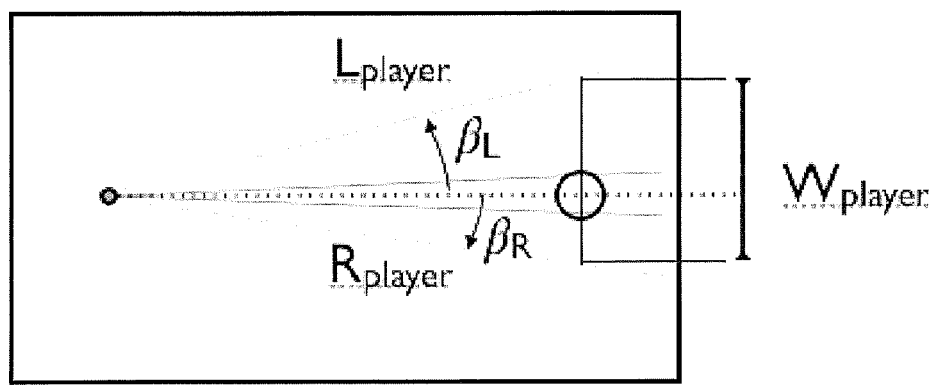

The statistical data that describes the initial direction of motion of the ball and its initial velocity is used to determine the characteristics of the putting game of the player. These characteristics are stored in a database. From this statistical data we can determine variations in the initial velocity and in the initial direction of motion. Integrating the initial velocity we obtain the initial acceleration ($a_x$, $a_y$), which is proportional to the force F used to strike the ball. Hence, variations on the initial velocity yield variations $\Delta F$. Likewise, variations in the initial direction of motion lead to left and right variations of the yaw angle, i.e., $\Delta \beta_L$ and $\Delta \beta_R$. These variations add uncertainty to the path that the ball will follow so the cone widens (as shown in FIG. 15I). The width of the cone of a player at the height of the hole, $W_{player}$, is a measure of goodness of the player; inexperienced players will have a large $W_{player}$ while experienced ones will have one that approaches $W_{green}$, which is the smallest possible width at the height of the hole.

Figure 15J:
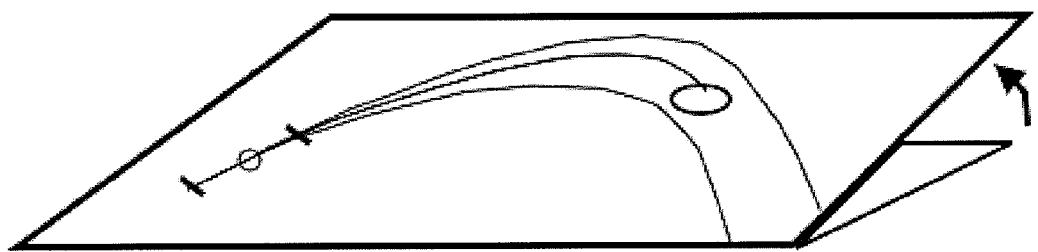

The system displays a trajectory consistent with the statistical length of the pendulum swing for putts of the given distance tailored for each particular player. Trajectories of players that tend to strike the ball well, with appropriate contact forces and hit the ball true have narrow cones, while those of players who hit the ball with incorrect contact forces, or that hit the ball opening or closing the face of the putter, will have wide error cone (as shown in FIG. 15J).

Figure 15K:
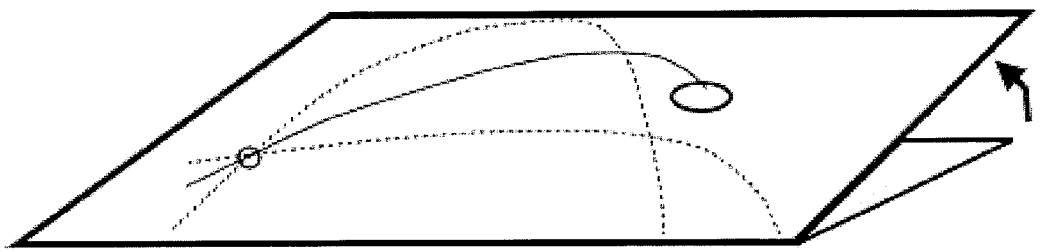

Independent of the player, the minimum width of the cone is defined by the uncertainties of the green and the ball, i.e., trajectories over an ideal smooth surface with an ideal ball have an cone with a width of $W_{hole}$ at the height of the hole; any non-ideal terrain has a roughness that creates an uncertainty over the trajectory that increases with distance. The characteristics of the game of a player always add uncertainty to the ideal trajectories, never subtract from them. The best line is modified to fit the particular game preferences of the player. For example, consider a player that hits the ball with a consistent contact force. For this player, a modification is made to the best line that minimizes the width of the cone at the hole among the trajectories produced by this particular contact force (as shown in FIG. 15K). Although the generated trajectory with this particular contact force is not an ideal trajectory (in the sense that there exist trajectories with narrower cones), it is generated with a stoke with which the player feels comfortable as it follows that statistical way in which the player putts. A similar adjustment can be done considering the length of the pendulum swing instead of the strike force.

In some embodiments, learning is also based on other inputs (e.g., cameras and 3D sensors). The selection of the trajectory is used as a pedagogical tool that instead of adapting the suggested stroke to the style of the player, it instead indicates ways in which the player can minimize the cone by modifying his/her game. The system can purposefully display a trajectory with a small error cone that the player can follow by altering one or more of his putting characteristics. For example, if the system determines that a source of inconsistency of the player putts is that the initial direction of motion is erratic, then the likely cause is that the player is opening and/or closing the face of the putt at the moment of contact with the ball. In this case, the system will display a trajectory with a tight pendulum swing that minimizes the opportunity of the face of the putt to open or close. To compensate for the tight pendulum swing, the player is forced to increase the strength of his/her stroke.

In some embodiments, length of the pendulum swing and the initial direction of the ball can be determined by imagery of the ball. Additional information about the swing, that also affects the ball trajectory, is obtained by analyzing the player instead of the ball. Imagery of the player can show errors in the putt that explain wider cones in the trajectory. For example, bobbing of the head, incorrect shoulder height, and body motion, can all be detected directly from images of the player and are used to suggest courses of action that are likely to reduce the cones of his/her trajectories. Hence, the $W_{player}$ of the resulting trajectories becomes the measure against which we verify whether the suggestions to the player are taking effect, and their change over time is displayed as guidance and motivation. The statistically obtained $W_{player}$ value is a measure that summarizes the quality of the putting game of a player at any given time.

Figure 16:
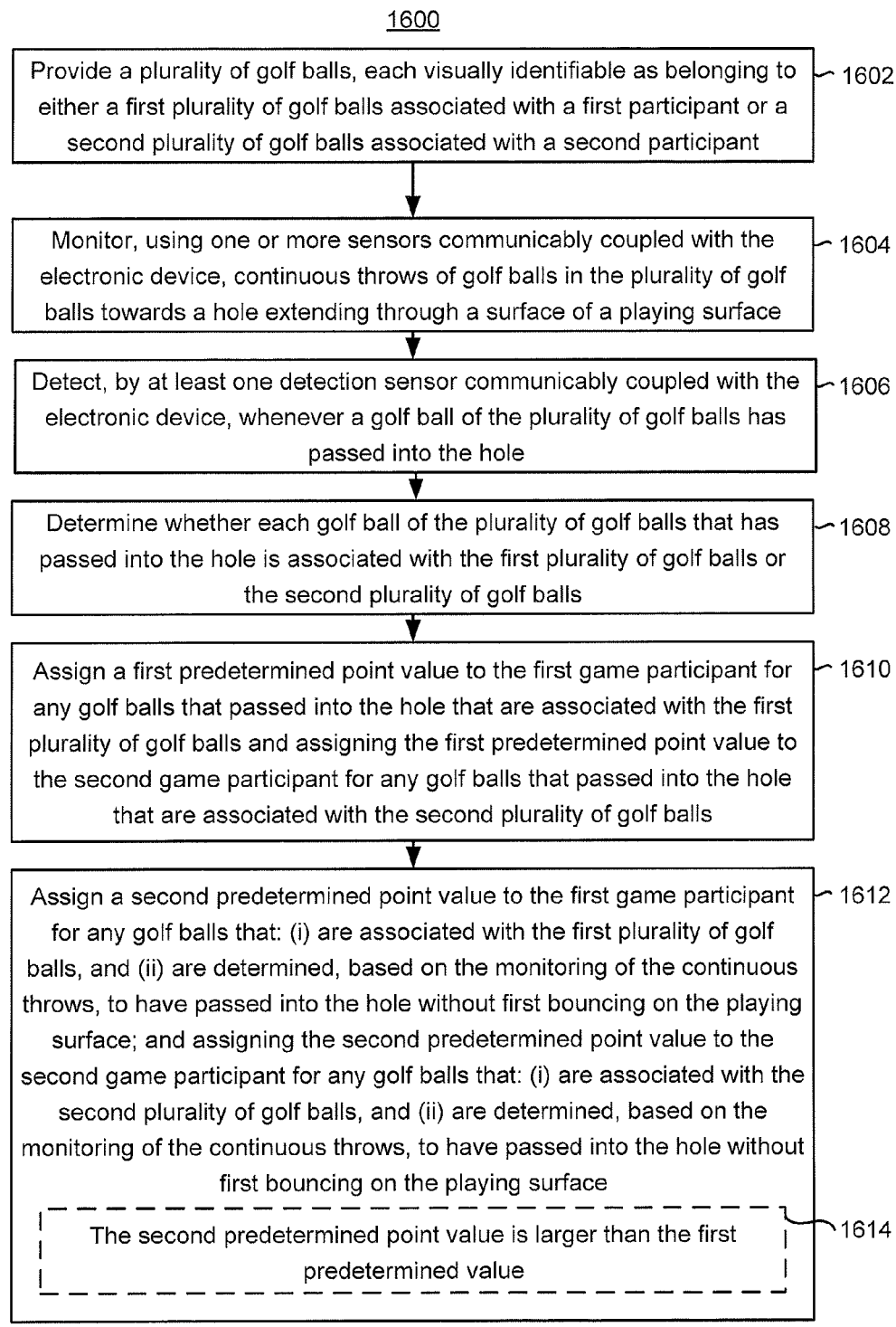
FIG. 16 is a flowchart of a method of managing a game of hand golf at a sport simulation system, in accordance with some embodiments.

FIG. 16 is a flowchart of a method of managing a game of hand golf at a sport simulation system, in accordance with some embodiments.

In some embodiments, the method 1600 is performed by an electronic device (e.g., system controller 114, FIG. 1A) and/or one or more components of the electronic device (e.g., an I/O subsystem, an operating system, etc.). In some embodiments, the method 1600 is governed by instructions that are stored in a non-transitory computer-readable storage medium and that are executed by one or more processors of a device, such as the one or more processors 202-1 of a management module 114-1 (FIG. 1C). For ease of explanation, the following describes method 1600 as performed by the system controller 114 (also referred to simply as the device). In some embodiments, with reference to FIG. 1C, the operations of method 1600 are performed by or use, at least in part, a surface modification module (e.g., surface modification module 222), a ball color detection module (e.g., ball color detection module 224), a ball path determining module (e.g., ball path determining module 226), a graphics rendering module (e.g., graphics rendering module 228), a game selection module (e.g., game selection module 230), a ball delivery module (e.g., ball delivery module 232), a ball retrieval module (e.g., ball retrieval module 234), user-specific putting data (e.g., user-specific putting data 218), and a leaderboard updating module (e.g., leaderboard updating module 220). Some operations in method 1600 are, optionally, combined and/or the order of some operations is, optionally, changed.

In some embodiments, a method 1600 includes: providing (1602) a plurality of golf balls, each visually identifiable as belonging to either a first plurality of golf balls associated with a first participant or a second plurality of golf balls associated with a second participant. Each golf ball may be identifiable based on color, shape, size, hash-shading, or some other distinguishing characteristics. In other embodiments, golf balls are associated with participants using only data obtained from visual sensors and without requiring the golf balls to have distinguishing characteristics.

The method 1600 further includes: monitoring (1604), using one or more sensors communicably coupled with the electronic device (e.g., one or more cameras 103, FIG. 1A), continuous throws of golf balls in the plurality of golf balls towards a hole extending through a surface of a playing surface.

The method 1600 also includes: detecting (1606), by at least one detection sensor communicably coupled with the electronic device (e.g., one or more color detection sensors, whenever a golf ball of the plurality of golf balls has passed into the hole. In other embodiments, targets are instead utilized and holes are not utilized. For example, one target is a gopher or bulls-eye moving around a playing surface. In some embodiments, a combination of targets and holes are utilized to provide an exciting game with various scoring values depending on the target or hole that is hit.

The method 1608 additionally includes: determining (1608) whether each golf ball of the plurality of golf balls that has passed into the hole is associated with the first plurality of golf balls or the second plurality of golf balls.

In some embodiments, the method 1600 further includes: assigning (1610) a first predetermined point value to the first game participant for any golf balls that passed into the hole that are associated with the first plurality of golf balls and assigning the first predetermined point value to the second game participant for any golf balls that passed into the hole (or, in other embodiments, golf balls that hit some other suitable target) that are associated with the second plurality of golf balls.

In some embodiments, the method 1600 also includes: assigning (1612) a second predetermined point value to the first game participant for any golf balls that: (i) are associated with the first plurality of golf balls, and (ii) are determined, based on the monitoring of the continuous throws, to have passed into the hole without first bouncing on the playing surface and assigning the second predetermined point value to the second game participant for any golf balls that: (i) are associated with the second plurality of golf balls, and (ii) are determined, based on the monitoring of the continuous throws, to have passed into the hole without first bouncing on the playing surface. In this way, additional points are provided to users for hitting the target or getting a ball into the hole without having to bounce or roll the ball.

In some embodiments, the second predetermined point value is optionally larger than the first predetermined point value (1614). In other embodiments, the second predetermined point value is a bonus point value that is added on to the first predetermined point value that provides additional points for more difficult balls that hit a target or make it into a hole.

In some embodiments, after throwing all balls in the first and second pluralities, the system controller 114 also determines which balls are within a predetermine distance of the target or hole (e.g., within 1 foot) and then assigns additional points based on distance from the target or hole.

It should be understood that the particular order in which the operations in FIG. 16 have been described is merely exemplary and is not intended to indicate that the described order is the only order in which the operations could be performed. One of ordinary skill in the art would recognize various ways to reorder the operations described herein.

Figure 17:
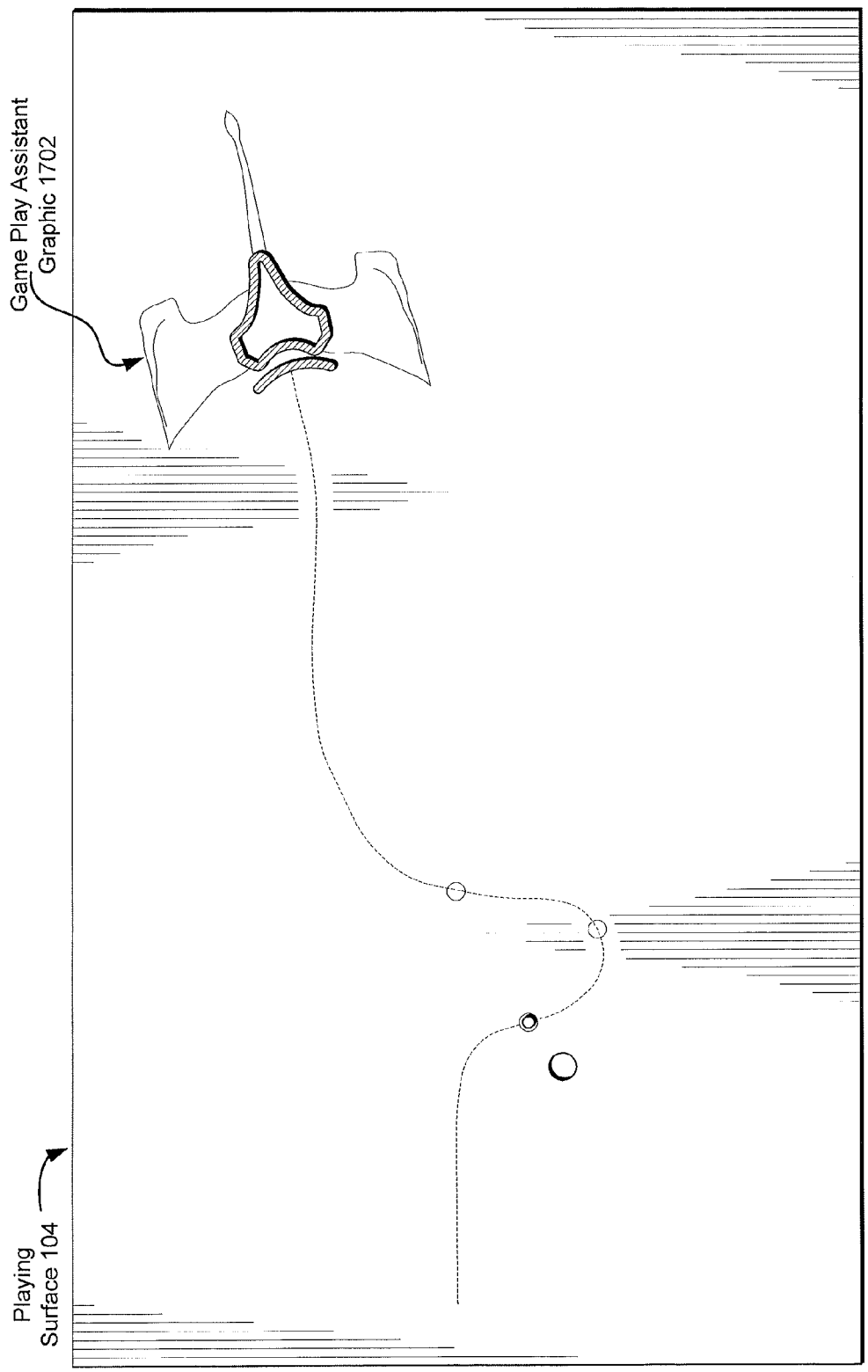
FIG. 17 is a schematic of a putting green surface used to illustrate a robotic assistant projected on the putting green surface, in accordance with some embodiments.

FIG. 17 is a schematic of a putting green surface used to illustrate a robotic assistant (e.g., game play assistant graphic 1702) projected on the putting green surface, in accordance with some embodiments. In some embodiments, after a particular game is completed (or a respective round of a particular game), the system controller 114 sends instructions to the tracking/guidance system 102 (FIG. 1A) that allow the system 102 to render the game play assistant graphic 1702 and to render a line that corresponds to a path followed by a particular user's golf shot. In some embodiments, the graphic 1702 is coordinated with the ball delivery system 108 (FIG. 1A) so that balls are cleared from the playing surface 104 at the same time that the graphic 1702 passes the balls.

Figure 18A:
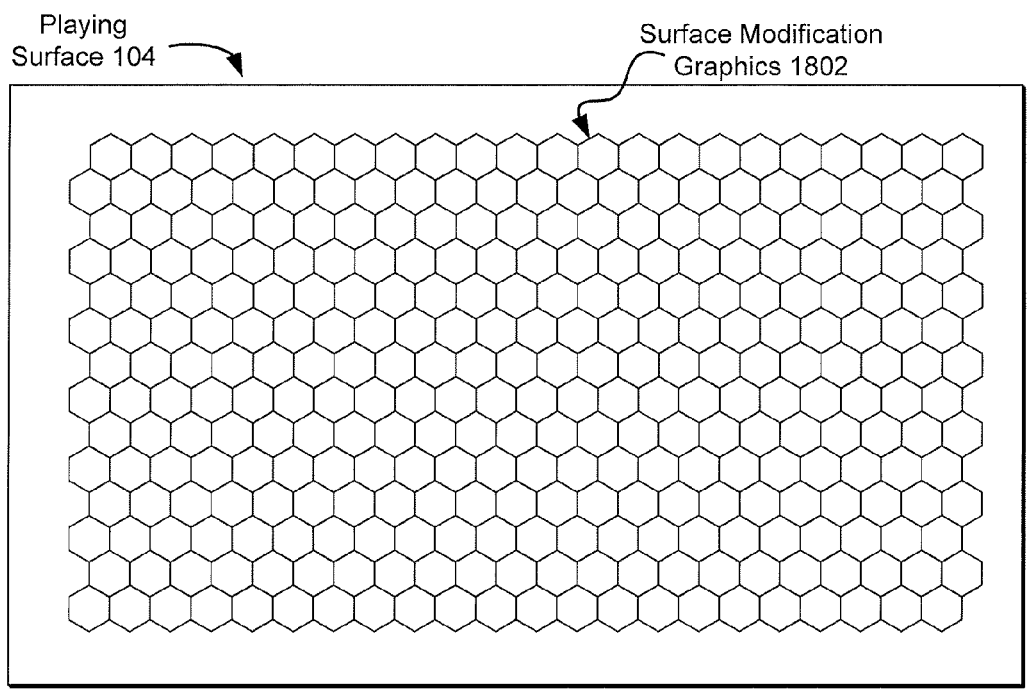
FIGS. 18A-18B are schematics of a putting green surface used to illustrate a graphic projected on the surface of the putting green surface that illustrates changing height positions for linear actuators, in accordance with some embodiments.
Figure 18B:
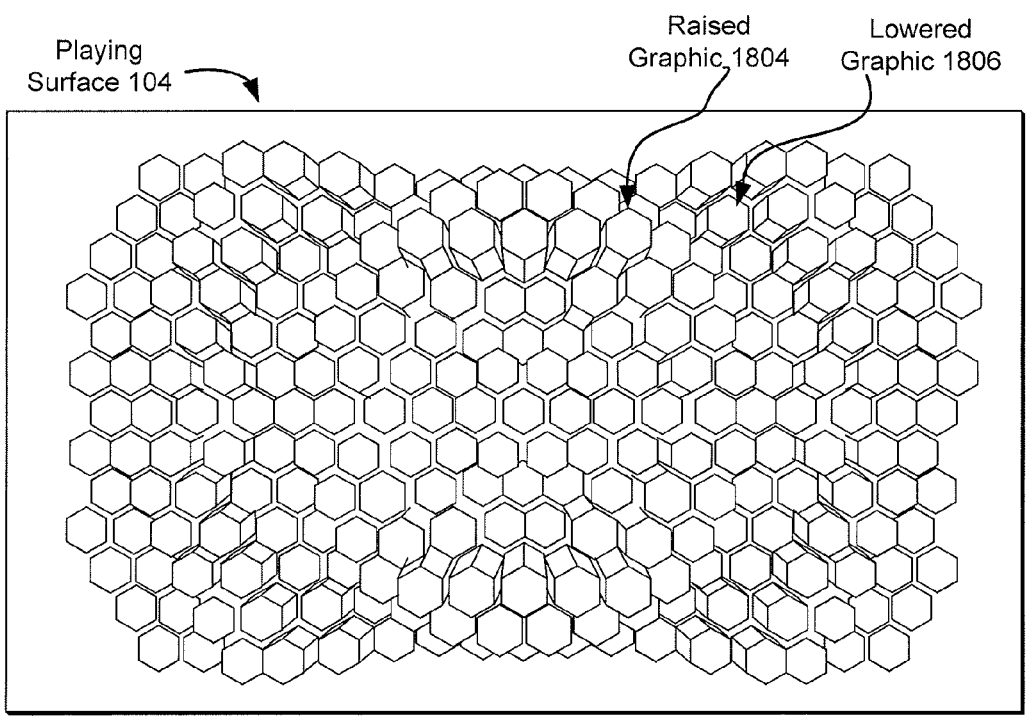

FIGS. 18A-18B are schematics of a putting green surface used to illustrate a graphic projected on the surface of the putting green surface that illustrates changing height positions for linear actuators, in accordance with some embodiments. As shown in FIG. 18A, representations of surface modification elements 106 (FIG. 1A) are projected on to a playing surface 104 as surface modification graphics 1802. In some embodiments, as the playing surface 104 is configured to have a different contour or a different tilt (see discussed in FIGS. 3A-3B and 3C), the surface modification graphics 1802 are lowered or raised to provide an indication that the surface modification elements 106 beneath the surface are being actuated. Initially, the surface modification graphics 1802 may be positioned at uniform height levels (FIG. 18A) and then each individual surface modification graphic 1806 is modified during contouring/tilting of the playing surface 104 to raise and lower height of the graphics (as shown with exemplary raised graphic 1804 and lowered graphic 1806).

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

For situations in which the systems discussed throughout this description collect information about users, the users may be provided with an opportunity to opt in/out of programs or features that may collect personal information (e.g., information about a user's preferences or usage of a smart device). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    at an electronic device with one or more processors:
        identifying a current topography of a putting green and a current position of a first user's ball on the putting green;
        determining, based on the current topography of the putting green, a best path from the current position of the first user's ball on the putting green to a target on the putting green;

determining a backswing distance and a corresponding follow-through distance that will allow the first user to hit the ball along the best path; and
sending, to a projecting device that is distinct from the electronic device, instructions to (i) render a representation of the best path on the putting green, (ii) render a first graphic at a first position on the putting green that corresponds to the backswing distance relative to the current position of the ball, (iii) render a second graphic at a second position distinct from the first position on the putting green that corresponds to the follow-through distance relative to the current position of the ball, and (iv) render an animation that appears between the first position and the second position.

2. The method of claim 1, further comprising:
monitoring a path followed by the ball after the first user has putted the ball;
in accordance with a determination that the ball has come to rest on the putting green, comparing the path followed by the ball to the best path; and
providing feedback, to the first user, based on the comparing of the path followed by the ball to the best path.

3. The method of claim 2, wherein the feedback includes auditory feedback instructing the first user how to improve their putting stroke in order to more closely follow the best path.

4. The method of claim 2, wherein the feedback includes visual feedback that provides a representation of the path followed by the ball relative to the best path.

5. The method of claim 1, further comprising:
retrieving information identifying putting characteristics associated with a first user,
wherein the best path is determined further based on the putting characteristics associated with the first user.

6. The method of claim 1, wherein the current topography and the current position are determined based on information received from at least one visual sensor that is communicably coupled with the electronic device.

7. The method of claim 5, wherein the animation moves between the first position and the second position at a speed that is based on the putting characteristics associated with the first user.

8. The method of claim 7, wherein the animation is a representation of a putter that is shown swinging between the first and the second positions at the speed.

9. The method of claim 5, further comprising, before retrieving the putting characteristics associated with the first user, determining that a second ball, distinct from the first user's ball, is present on the putting green and is closer to the target than the first user's ball.

10. The method of claim 1, further comprising:
receiving an indication that the first user's ball has moved to a different position on the putting green, distinct from the current position;
in accordance with a determination the first user's ball is now closer to the target than the second ball:
retrieving information identifying putting characteristics associated with a second user that is associated with the second ball;
identifying a current position of the second ball on the putting green;
determining, based on the putting characteristics associated with the second user and based on the current topography of the putting green, (i) a new best path from the current position of the second ball on the putting green to the target on the putting green and (ii) a backswing distance and a corresponding follow-through distance that will allow the second user to hit the second ball along the new best path; and
sending, to a projecting device that is distinct from the electronic device, instructions to (i) render a representation of the new best path on the putting green and (ii) render the first graphic at a third position on the putting green that corresponds to the backswing distance relative to the current position of the second ball, and (iii) render the second graphic at a fourth position distinct from the third position on the putting green that corresponds to the follow-through distance relative to the current position of the second ball.

11. The method of claim 1, wherein the first graphic and the second graphic are the same.

12. The method of claim 1, wherein the first graphic and the second graphic intersect the representation of the best path at substantially right angles.

13. An electronic device, comprising:
one or more processors; and
memory storing one or more programs, which when executed by the one or more processors, cause the electronic device to:
retrieve information identifying putting characteristics associated with a first user;
identify a current topography of a putting green and a current position of the first user's ball on the putting green;
determine, based on the putting characteristics associated with the first user and based on the current topography of the putting green, (i) a best path from the current position of the first user's ball on the putting green to a target on the putting green and (ii) a backswing distance and a corresponding follow-through distance that will allow the first user to hit the ball along the best path; and
send, to a projecting device that is distinct from the electronic device, instructions to (i) render a representation of the best path on the putting green and (ii) render a first graphic at a first position on the putting green that corresponds to the backswing distance relative to the current position of the golf ball, (iii) render a second graphic at a second position distinct from the first position on the putting green that corresponds to the follow-through distance relative to the current position of the ball, and (iv) render an animation that appears between the first position and the second position.

14. The electronic device of claim 13, wherein the animation moves between the first position and the second position at a speed that is based on the putting characteristics associated with the first user.

15. The electronic device of claim 13, wherein the one or more programs further cause the electronic device to: before retrieving the putting characteristics associated with the first user, determine that a second ball, distinct from the first user's ball, is present on the putting green and is closer to the target than the first user's ball.

16. The electronic device of claim 15, wherein the one or more programs further cause the electronic device to:
receive an indication that the first user's ball has moved to a different position on the putting green, distinct from the current position;
in accordance with a determination the first user's ball is now closer to the target than the second ball:

retrieve information identifying putting characteristics associated with a second user that is associated with the second ball;
identify a current position of the second ball on the putting green;
determine, based on the putting characteristics associated with the second user and based on the current topography of the putting green, (i) a new best path from the current position of the second ball on the putting green to the target on the putting green and (ii) a backswing distance and a corresponding follow-through distance that will allow the first user to hit the second ball along the new best path; and
send, to a projecting device that is distinct from the electronic device, instructions to (i) render a representation of the new best path on the putting green and (ii) render the first graphic at a third position on the putting green that corresponds to the backswing distance relative to the current position of the second ball, and (iii) render the second graphic at a fourth position distinct from the first position on the putting green that corresponds to the follow-through distance relative to the current position of the second ball.

17. A non-transitory computer-readable storage medium, storing one or more programs configured for execution by one or more processors of an electronic device, the one or more programs comprising instructions for:

retrieving information identifying putting characteristics associated with a first user;
identifying a current topography of a putting green and a current position of the first user's ball on the putting green;
determining, based on the putting characteristics associated with the first user and based on the current topography of the putting green, (i) a best path from the current position of the first user's ball on the putting green to a target on the putting green and (ii) a backswing distance and a corresponding follow-through distance that will allow the first user to hit the ball along the best path; and
sending, to a projecting device that is distinct from the electronic device, instructions to (i) render a representation of the best path on the putting green and (ii) render a first graphic at a first position on the putting green that corresponds to the backswing distance relative to the current position of the golf ball, (iii) render a second graphic at a second position distinct from the first position on the putting green that corresponds to the follow-through distance relative to the current position of the ball, and (iv) render an animation that appears between the first position and the second position.

* * * * *